(12) United States Patent
Mazza et al.

(10) Patent No.: US 9,084,948 B2
(45) Date of Patent: Jul. 21, 2015

(54) PRESSURIZED LOW POLARITY WATER EXTRACTION APPARATUS AND METHODS OF USE

(71) Applicant: MAZZA INNOVATION, LTD., Summerland (CA)

(72) Inventors: Giuseppe Mazza, Summerland (CA); Carl Pronyk, Summerland (CA)

(73) Assignee: Mazza Innovation, Ltd., Summerland, British Columbia (CA)

( * ) Notice: Subject to any disclaimer, the term of this patent is extended or adjusted under 35 U.S.C. 154(b) by 0 days.

(21) Appl. No.: 14/303,640

(22) Filed: Jun. 13, 2014

(65) Prior Publication Data

US 2015/0157958 A1 Jun. 11, 2015

(30) Foreign Application Priority Data

Dec. 6, 2013 (CA) .................................... 2836200

(51) Int. Cl.
*B01D 11/02* (2006.01)
*B01D 47/00* (2006.01)
*A23B 4/08* (2006.01)
*C02F 103/36* (2006.01)

(52) U.S. Cl.
CPC ........ *B01D 11/0219* (2013.01); *B01D 11/0207* (2013.01); *C02F 2103/36* (2013.01)

(58) Field of Classification Search
CPC .................................... A23L 1/00; A23L 1/28
USPC ........... 422/261, 285; 426/109, 113; 261/150, 261/24, 34.1, 97, 119.1; 99/470, 516
See application file for complete search history.

(56) References Cited

U.S. PATENT DOCUMENTS 7,419,692 B1 * 9/2008 Kalenian ....................... 426/433
7,943,190 B2   5/2011 Mazza et al.

OTHER PUBLICATIONS

Lui et al., The Effect of Flow Rate of Compressed Hot Water on Xylan, Lignin, and Total Mass Removal from Corn Stover. Ind. Eng. Chem. Res. 42:5409-5416, 2003.
Hyman et al., Determination of Acid Soluble Lignin Concentration Curve by UV-Vis Spectroscopy; Laboratory Analytical Procedure (LAP). NREL/TP-510-42617; National Renewable Laboratory: Golden, CO, USA, 2007.
Sluiter et al., Determination of Structural Carbohydrates and Lignin in Biomass; Laboratory Analytical Procedure (LAP) NREL/TP-510-42618; National Renewable Laboratory: Golden, CO, USA, 2008.
Scott, Colorimetric determination of hexuronic acids in plant materials. Anal. Chem. 51:936-941, 1979.
AOAC Official Method 997.09 , Nitrogen in beer, wort, and brewing grains, protein (total) by calculation. AOAC International, 2008.

(Continued)

*Primary Examiner* — Monzer R Chorbaji
(74) *Attorney, Agent, or Firm* — Alchemy-Partners, PC

(57) ABSTRACT

An apparatus for extraction and recovery of components from biomass feedstocks with pressurized low polarity water. The apparatus is configured with two or more reaction columns, each separately communicating with sources of pressurized water, pressurized heated water, and pressurized cooling water. Components are extracted from the biomass by separately flooding the column with pressurized water, heating the column and its contents to the point where the water becomes pressurized low polarity (PLP) water, recovering the PLP water comprising the extracted components, cooling the column with PLP water, and removing the spent biomass material from the column.

14 Claims, 27 Drawing Sheets

(56) References Cited

OTHER PUBLICATIONS

Mok et al., Uncatalysed solvolysis of whole biomass hemicellulose by hot compressed liquid water. Ind. Eng. Chem. Res. 31:1157-1161, 1992.

Porter et al., The conversion of procyanidins and prodelphinidins to cyanidin and delphinidin. Phytochem. 25:223-230, 1985.

Luthria et al., A systematic approach for extraction of phenolic compounds using parsley (Petroselinum crispum) flakes as a model substrate. J. Sci. Food Agric. 86:1350-1358, 2006.

Mao et al., Simultaneous determination of salidroside and tyrosol in extracts of Rhodiola L. by microwave assisted extraction and high-performance liquid chromatography. J. Pharm. Biomed. Anal. 45:510-515; Ganzera et al., 2001, Analysis of the Marker Compounds of Rhodiola rosea L.(Golden Root)by Reversed Phase High Performance Liquid Chromatography. Chem Pharm Bull. 49:465-467, 2007.

Ganzera et al., Analysis of the Marker Compounds of Rhodiola rosea L.(Golden Root)by Reversed Phase High Performance Liquid Chromatography. Chem Pharm Bull. 49:465-467, 2001.

* cited by examiner (A)

(B)

(A)

(B)

PRESSURIZED LOW POLARITY WATER EXTRACTION APPARATUS AND METHODS OF USE

Various embodiments disclosed herein generally relate to equipment, apparatus, and systems for extraction of components from biomass feedstocks. More specifically, this disclosure pertains to equipment, apparatus, and systems for generation and use of pressurized low polarity water as solvents for extractions of components from biomass feedstocks.

BACKGROUND

Phytochemicals are chemical compounds that occur naturally in plants and are among other things, responsible for color such as exemplified by the deep purple of blueberries and organoleptic properties such as exemplified by the smell of garlic. Some phytochemicals are used in nutraceutical products that are generally sold in medicinal forms not usually associated with food.

There are three classes of phytochemicals that are of particular interest i.e., polyphenols, specialty carbohydrates, and glycosides. Polyphenols, also referred to as phenolics, are compounds that function mainly as antioxidants and anti-inflammatories when ingested by humans. An antioxidant is a molecule that inhibits the oxidation of other molecules. Oxidation in living cells can cause damage or death to the cell. Antioxidants prevent this damage by being oxidized themselves, instead of the cell components. Antioxidants are widely used in dietary supplements and have been investigated for the prevention of diseases exemplified by cancer, coronary heart disease, altitude sickness, among others. They are also used as preservatives in food and cosmetics. As antioxidants are present in food consumed in human diets and in plants used in traditional medicine of several cultures, their roles in human health and disease are subjects of much research. Polyphenols can be synthesized industrially, but they are mainly made available from plants and microorganisms.

Carbohydrates are saccharides that perform numerous roles in living organisms. Carbohydrates serve as the body's source of energy (e.g., starch and glycogen), and as structural components (e.g., cellulose in plants and chitin in fungi and arthropods). Short-chain carbohydrates are also called sugars, while long-chain or complex carbohydrates are known as polysaccharides or oligosaccharides. Carbohydrates and other compounds derived from them can play key roles in mammalian immune systems, fertilization, preventing disease or infection, blood clotting, among others.

A sugar bound to another functional molecule (e.g., a sugar bonded to a phenolic) is known as a glycoside. Glycosides play numerous important roles in living organisms. Many plants store chemicals in the form of inactive glycosides. These can be activated by a hydrolysis reaction, which causes the sugar part to be broken off, making the chemical available for use. Many such plant glycosides are used as medications.

The current approach to the extraction of plant components is through use of either organic solvents or unpressurized hot water to solubilise and remove these components from plant biomass. The organic solvent systems commonly use one or more of ethanol, methanol, ethyl acetate and acetone. However, organic solvents are generally toxic and their commercial use requires explosion-proof facilities provided with storage and handling equipment certified for use with toxic and flammable chemicals. Furthermore, solvents may remain in final products as unhealthy trace compounds and their toxic properties raise safety concerns for human consumption.

It is well-known that hot-water systems tend to be less efficient than organic solvent-based systems and are able to only extract a portion of the potentially available phytochemicals from plant biomass.

In addition to nutraceuticals, biomass can be a valuable source of chemical products. Lignocellulosic biomass is one of the most abundant materials in the world and considerable attention has been given to its use as a raw material for the production of energy and chemicals. Fractionation of lignocellulosic biomass to improve utilization of its constituent components of cellulose, hemicellulose, and lignin can be accomplished using various physical, biological, thermal, or chemical methods. Hydrothermal treatments (also known as autohydrolysis, hydrothermolysis) include steam explosion, pressurized low polarity water (PLPW; also commonly referred to as superheated water, subcritical water, pressurized hot water, compressed hot water), which uses the catalytic action of hydronium ions from water ionization due to the processing conditions, and the production of in situ acids (such as acetic acid generated from acetyl groups), to hydrolyse the carbohydrates within the biomass. Heating water under pressure to temperatures above its boiling point results in alteration of its key properties such as pH and polarity and decreases its dielectric constant to values that approximate those of solvents such as those exemplified by ethanol and methanol.

Batch processing and continuous flow-through systems using hydrothermal water treatments have used to process, in very small-volume systems, a wide range of lignocellulosic feed stocks including hardwood chips from eucalyptus, poplar, *Luecaena* sp., maple, sweet gum, vegetative material and straws from annual plants including wheat straw, barley straw, rye straw, oat straw, *Brassica* sp. straws, flax shives, sorghum, switch grass, sugarcane among others. It is known that product yields from flow-through hydrothermal treatments are vastly different from those produced with batch systems. Flow-through reactors have been shown to remove more hemicellulose and lignin, with fewer degradation products forming than in a batch system. Nearly complete hemicellulose removal is possible with flow-through systems, whereas only 60% removal has been achieved in batch systems (Lui et al., 2003, *The Effect of Flow Rate of Compressed Hot Water on Xylan, Lignin, and Total Mass Removal from Corn Stover*. Ind. Eng. Chem. Res. 42:5409-5416). Furthermore, lignin removal is less than 30% in batch reactors, but up to 75% lignin removal is possible in flow-through systems at high flow rates (Lui et al., 2003). Additionally, hemicelluloses in flow-through reactors are recovered mostly as oligosaccharides (Lui et al., 2003).

However, successful scale-up of the small laboratory systems to large throughput commercial volume systems has not yet been achieved because of the problems associated with the attaining and maintenance of high pressures in large extraction vessels to provide constant pressures and temperatures while maintaining a constant throughput of feedstock materials. Problems commonly encountered in such scale-up attempts include material agglomeration, development of fluid channelling, blockages in feedstock material throughputs, and back mixing resulting in heterogeneous extractions and significantly reduced extraction efficiencies when compared to the results achieved with small laboratory-scale equipment.

SUMMARY

The present disclosure pertains to apparatus for generating pressurized low polarity (PLP) water and use thereof for extraction and recovery of components from biomass feedstocks. The exemplary pressurized low polarity water (PLPW) extraction apparatus is configured with two or more reaction columns, with each column separately communicating with sources of pressurized water, pressurized heated water, and pressurized cooling water. After loading a biomass feedstock into the reaction columns, components comprising the biomass materials are extracted and recovered from the biomass material in each column with a five-step process comprising sequentially flowing four separate circuits of water through each column. Initially the first column is loaded with fresh biomass feedstock and the apparatus is energized. After energizing is completed, the process comprises a first step of flooding the column with pressurized water, a second step of warming the column and its contents, a third step of processing the biomass materials within the column with PLP water, a fourth step of cooling the column with pressurized cool water, and a fifth step of draining the column and removing the spent biomass material. The column may then be refilled with fresh biomass feedstock. The water comprising the extracted components, i.e., a liquids product flow, is collected from the column during the third step in one or more aliquots.

BRIEF DESCRIPTION OF THE DRAWINGS

The present invention will be described in conjunction with reference to the following drawings in which:

FIG. 12(A) is a chart comparing recovery of carbohydrate extractives from wheat straw with PLPW processing in a bench-scale reaction column, a scale-up reaction column, and a pilot-scale reaction column, while FIG. 12(B) is a chart comparing recovery of non-carbohydrate extractives during the same processing runs through the three columns;

(FIG. 19A)), 120° C. FIG. 19(C)), and 130° C. (FIG. 19(C));

DETAILED DESCRIPTION

The exemplary embodiments of present disclosure pertain to apparatus for generating pressurized low polarity (PLP) water and use thereof for extraction and recovery of components from biomass feedstocks.

Figure 1:
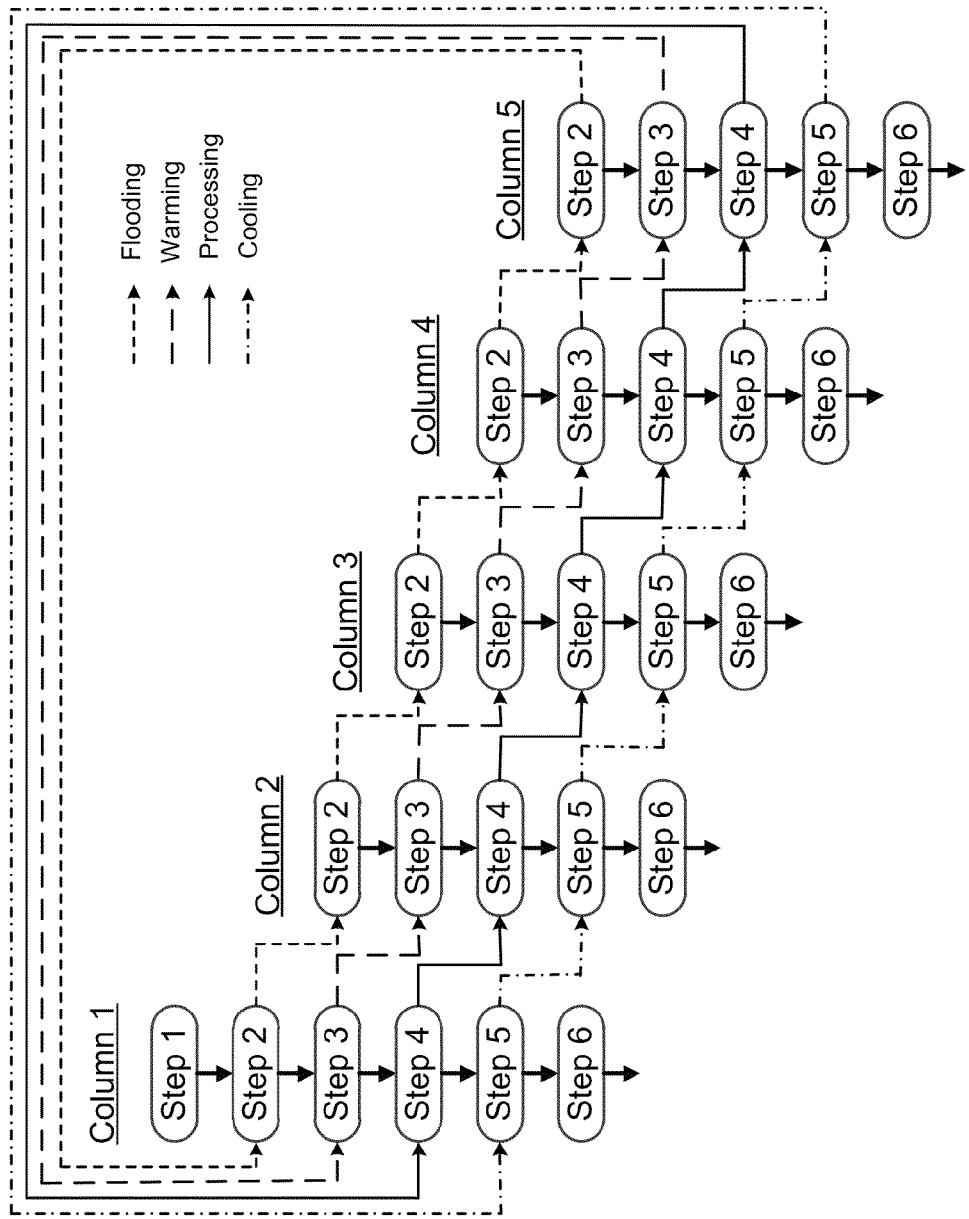
FIG. 1 is a schematic flowchart showing the operation of an exemplary pressurized low polarity water (PLPW) extraction system of the present disclosure using a five-column system with four independent process circuits.

An exemplary semi-continuous process for pressurized low polarity water (PLPW) extraction and recovery of components from biomass feedstocks is shown in FIG. 1 using the exemplary PLPW apparatus shown in FIGS. 2, 2A, 3-6 wherein the PLPW apparatus comprises five extraction/reaction columns set up in parallel. Generally, the PLPW process pressurizes preconditioned water to approximately 750 psi, and then raises the temperature of the pressurized water to approximately 180° C. before passing the heated and pressurized water through a selected reaction column to extract components from a feedstock. The capacity of the exemplary PLPW apparatus is in terms of a flow rate from the range of about 2 L/min to about 30 L/min, about 4 L/min to about 20 L/min, about 6 L/min to about 15 L/min, about 8 L/min to about 12 L/min, about 10 L/min. To facilitate economical operation, the exemplary PLPW apparatus may be operated as a semi-continuous process wherein one reaction column is always being processed and there is a continuous flow of PLPW extract from the system.

The control scheme for the PLPW process shown in FIG. 1 and the PLPW apparatus shown in FIGS. 2, 2A, 3-6 may be partially automated, and may include manual control of the processing sequence. In one embodiment, the operator must use a manual push button to activate each process stage. Once activated, the system may automatically enable/disable equipment, complete valve actuations, and monitor critical instruments as required for the selected stage. The control scheme can be automated based on timed sequencing of each processing step and error checking of measurement instrumentation to ensure safe operation of the apparatus.

Figure 2:
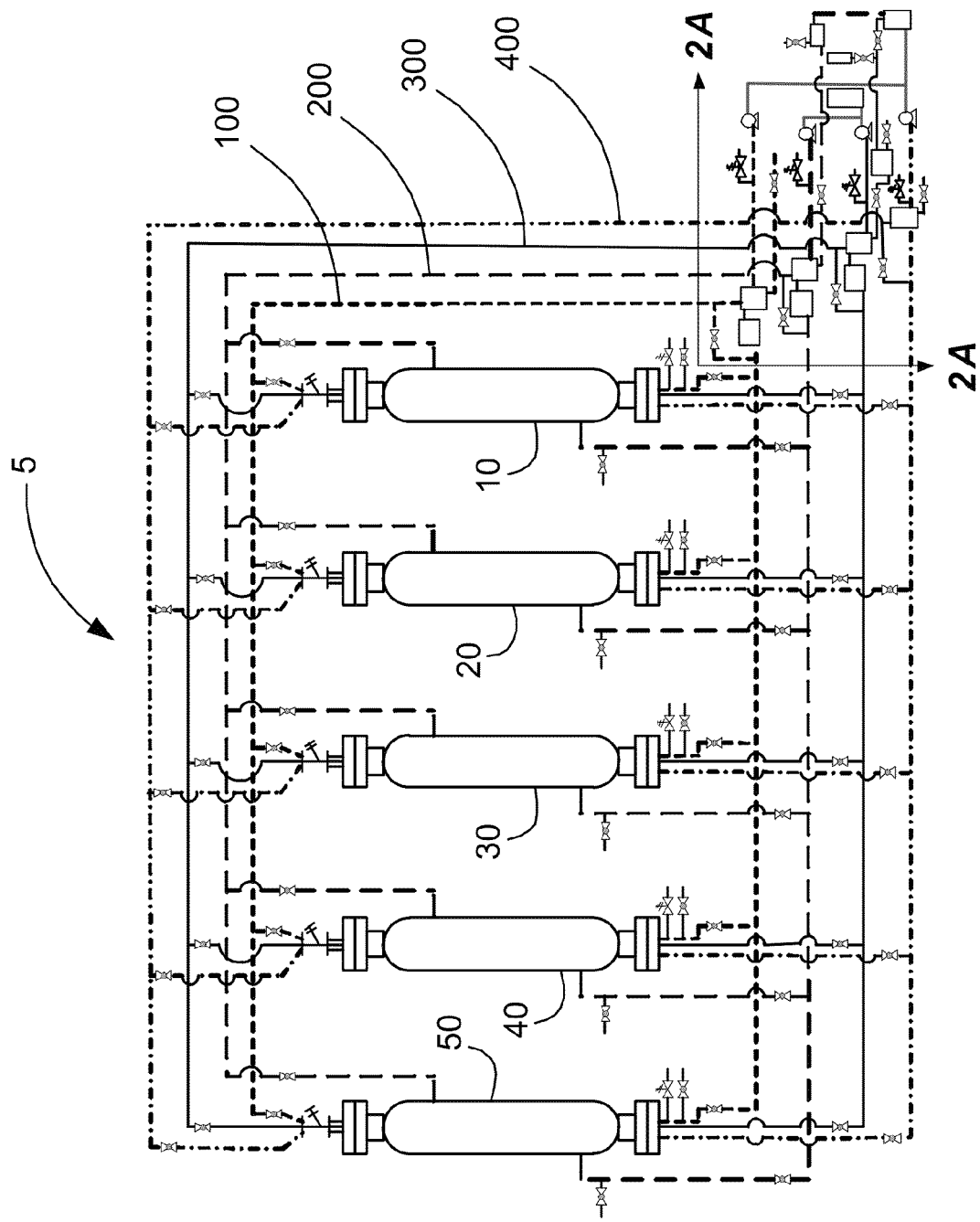
FIG. 2 is schematic diagram of the exemplary five-column PLPW system from FIG. 1.
Figure 2A:
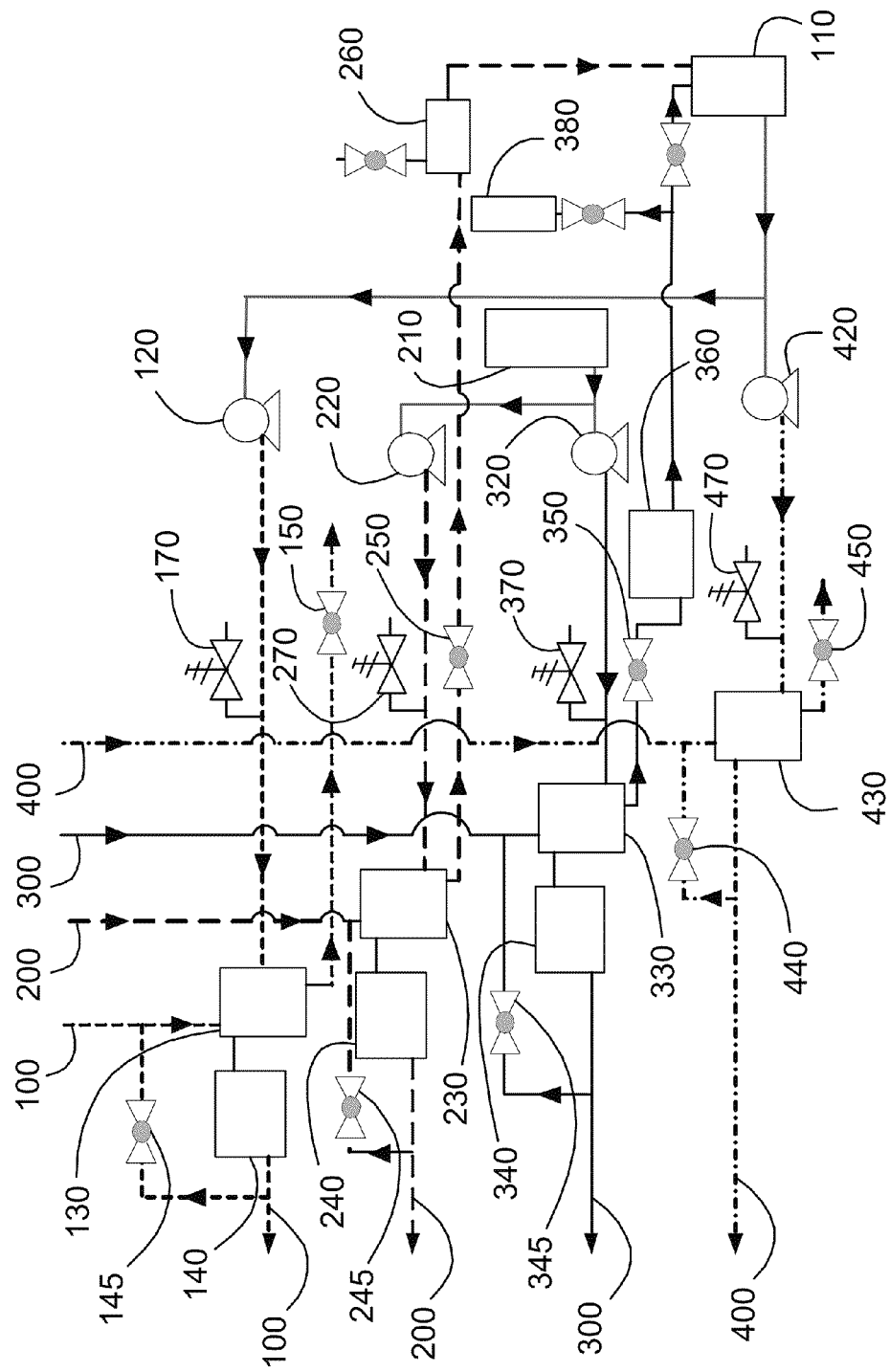
FIG. 2A is a close-up view of section 2A from FIG. 2.
Figure 3:
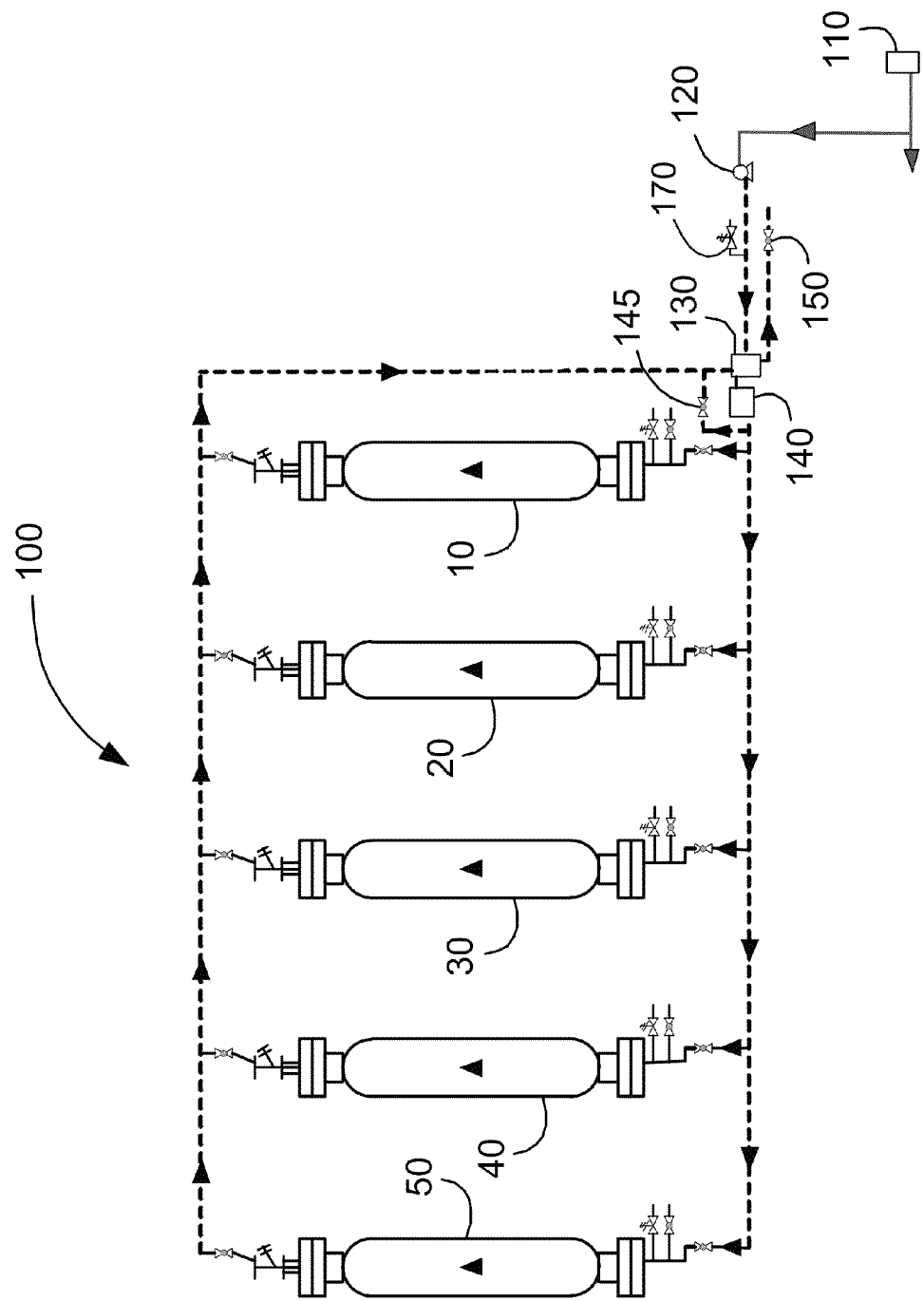
FIG. 3 is a schematic diagram of an exemplary flooding circuit for the five-column PLPW system shown in FIG. 2.
Figure 4:
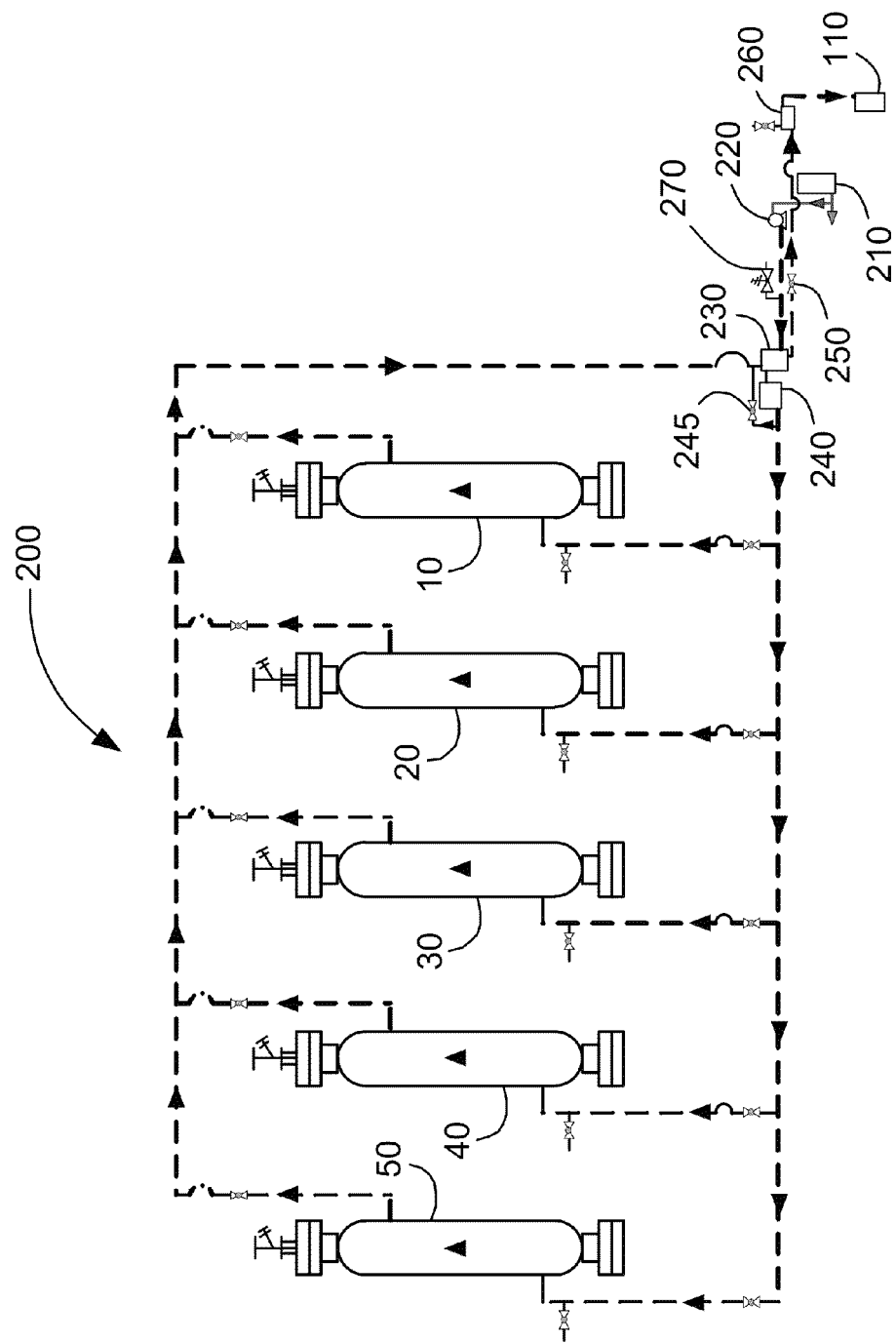
FIG. 4 is a schematic diagram of an exemplary warming circuit for the five-column PLPW.
Figure 5:
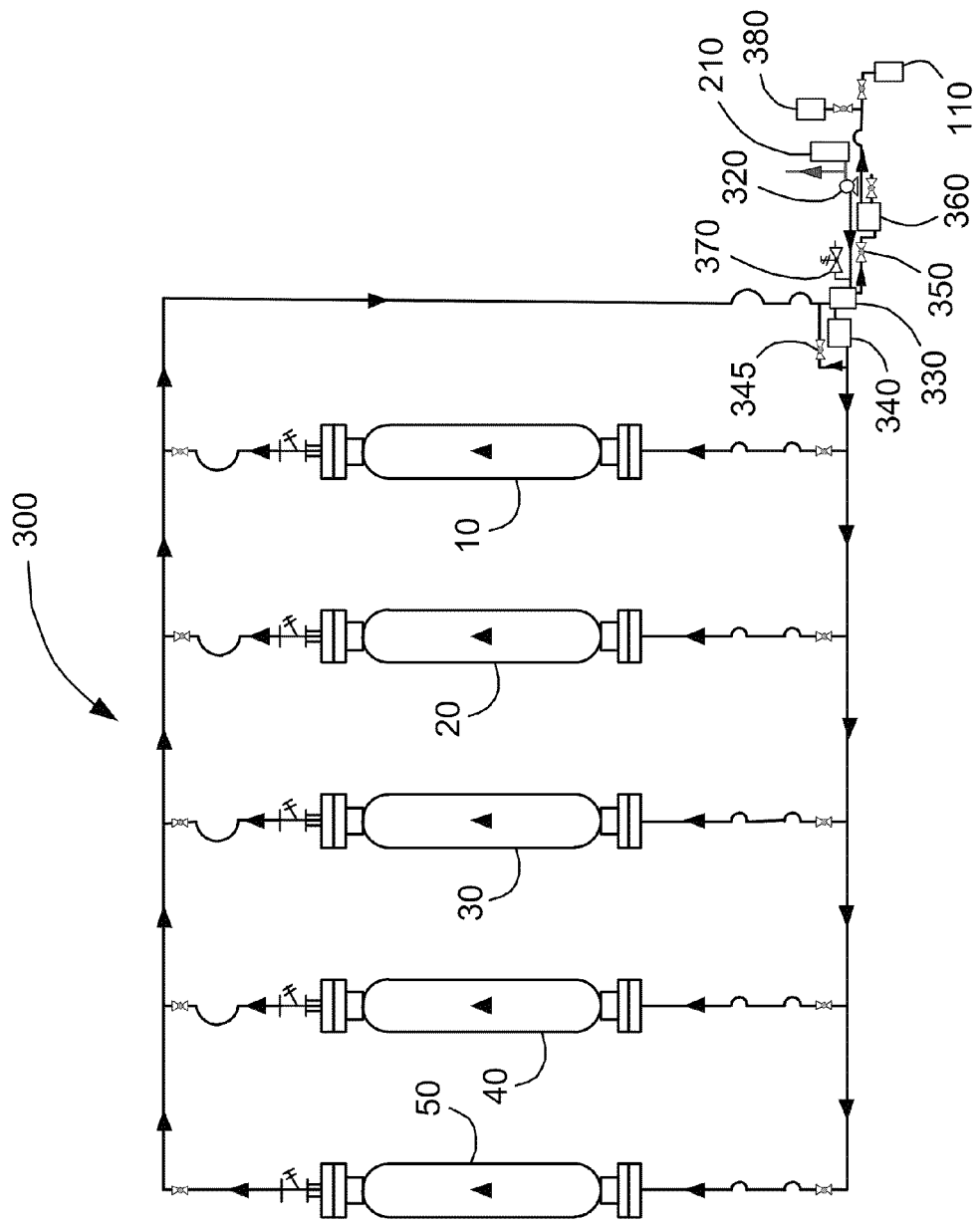
FIG. 5 is a schematic diagram of an exemplary processing circuit for the five-column PLPW system shown in FIG. 2.
Figure 6:
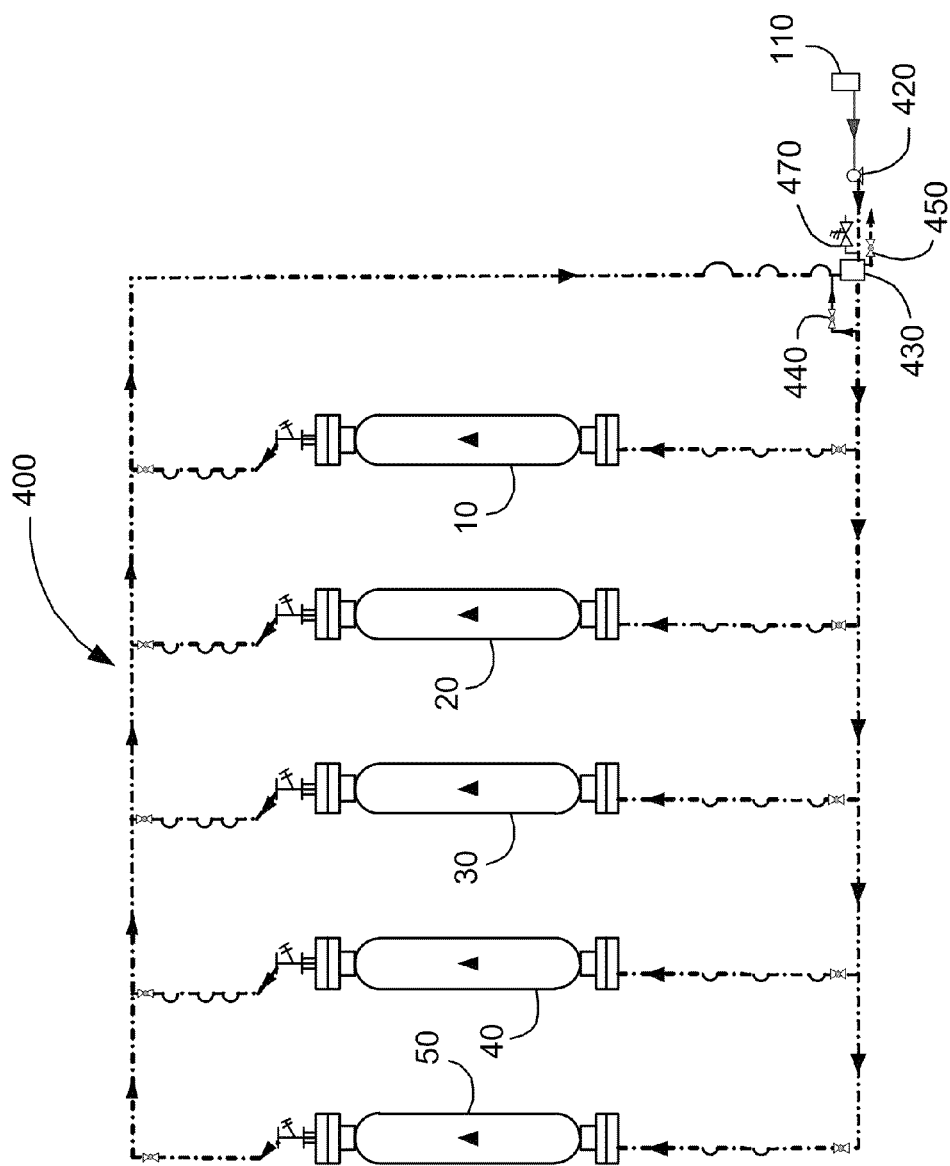
FIG. 6 is a schematic diagram of an exemplary cooling circuit for the five-column PLPW system shown in FIG. 2.

Process and Apparatus Description:

The PLPW apparatus 5 shown in FIGS. 2, 2A comprises four independent process circuits 100 (FIGS. 2A, 3), 200 (FIGS. 2A, 4), 300 (FIGS. 2A, 5), 400 (FIGS. 2A, 6) that control the flow of PLPW through each reactor column 10, 20, 30, 40, 50. The flow circuit for each reactor column 10, 20, 30, 40, 50 is selected by an automated control system that controls the sequencing of valve operation within each reactor column circuit. The term "heater" is used to identify the equipment used to heat the process water and encompasses an "immersion heater" or a "shell and tube heat exchanger" that may be connected to a plant steam system.

Circuit Bypass Mode:

The PLPW apparatus 5 is provided with a circuit bypass mode (FIGS. 2, 2A) which enables isolation of one or more or all of the individual reactor column circuits from the rest of the PLPW apparatus. Any one of the circuit pumps 120, 220, 320, 420 flows water from a reservoir 110, 210 through: (i) the input side of a heat exchanger 130, 230, 330, 430, (ii) a heater 140, 240, 340, (iii) the output side of the heat exchanger 130, 230, 330, 430, (iv) the back pressure regulator 150, 250, 350, 450, (v) a secondary heat exchanger 260, 360, and then to (vi) the reservoir 110 or to a waste water drain. Each of the water lines egressing from the circuit pumps 120, 220, 320, 420 is provided with a pressure relief valve 170, 270, 370, 470. The purpose of the circuit bypass mode is to pressurize and maintain the system pressure, and to adjust the pressurized low polarity (PLP) water temperature before the PLP water is introduced into the other circuits.

Flooding Circuit 100:

A selected reactor column filled with a biomass feedstock to be extracted, is flooded with hot water below 100° C. and then pressurized. This task can be accomplished in one of at least two ways. A first method utilizes an independent flooding circuit 100 (FIG. 3) wherein a pump 120 pushes water from a first water reservoir 110 through the input side of a heat exchanger 130, then through a heater 140, through one of the columns 10, 20, 30, 40, 50, through the output side of the heat exchanger 130, a back pressure regulator 150 and out of the system to a waste water drain. This option allows greater control of the flood water temperature. The flooding circuit 100 additionally comprises a bypass valve 145 to isolate the columns 10, 20, 30, 40, 50 from the flooding circuit.

A second method utilizes the cooling circuit (FIG. 6) which is described in more detail below. The second method comprises diversion of the PLP water from the back pressure regulator into the reaction column to be flooded. A second back pressure regulator allows the column to be pressurized. The benefit of the second flooding method is reduction in equipment necessary to accomplish column pressurization task (additional pump and heater), thereby allowing: (i) more water to be recycled, and (ii) recovery of additional product extracts. The drawback is that the flooding water temperature would be lower than an independent circuit (60° C. or less potentially) and multiple columns would have to be filled with biomass feedstock at the start of the processing day before processing.

Warming Circuit:

During the warming circuit 200 (FIG. 4), a pump 220 pushes water from a second water reservoir 210 through the input side of a heat exchanger 230, then through a heater 240, the jackets of columns 10, 20, 30, 40, 50, through the output side of the heat exchanger 230, a back pressure regulator 250, a secondary heat exchanger 260, and out of the system to the first water reservoir 110. The warming circuit 200 additionally comprises a bypass valve 245 to isolate the columns 10, 20, 30, 40, 50 from the warming circuit.

The purpose of the warming circuit is to warm the column to a selected desired processing temperature to minimize the loss of heat from the PLP water to the equipment during extraction. It is optional to separate the warming circuit from the other circuits, so that it can be run independently, by adding a pump, a heat exchanger, and a heater dedicated to the warming circuit. Alternatively, the reaction column jackets may be configured to use steam from a processing facility either with steam as the heating medium within the jacket, or through the use of a heat exchanger and water pump to use steam to indirectly heat water for the column jackets.

Processing Circuit:

During the processing circuit 300 (FIG. 5), a pump 320 pushes water from the second water reservoir 210 through the input side of a heat exchanger 330, then through a heater 340, after which the PLP water flows (under pressure from pump 320) through one of columns 10, 20, 30, 40, 50, that is packed with biomass feedstock to be extracted. The PLP water flows out of the column through the output side of the heat exchanger 330, through a back pressure regulator 350, a secondary heat exchanger 360, and out of the system to the collection vessel 380. The processing circuit 300 additionally comprises a bypass valve 345 to isolate the columns 10, 20, 30, 40, 50 from the processing circuit. The purpose of the processing circuit (FIG. 5) is to solubilise and extract the compounds of interest from the feedstock material. The PLP water travels through the reaction column from bottom to the top in a single pass. The least concentrated water first passes through the most extracted feedstock material, thus maximizing the amount of product extracted. Additionally, due to the continuous flow-through nature of the extraction system, product is constantly removed from the system with low residence times while exposed to the operating conditions, thus reducing the amount of potential product degradation.

Cooling Circuit:

The last processing circuit, the cooling circuit 400 (FIG. 6) cools down the reaction columns after the feedstock material has been fully extracted in two stages. In the cooling circuit 400, the PLP water flows through the reaction column packed with the extracted feedstock material whereby the pump 420 pushes water through the input side of the heat exchanger 430, through one of columns 10, 20, 30, 40, 50, then out of the column into the product side of the heat exchanger 430, through the back pressure regulator 450, and out of the system to the drain. The purpose of the cooling circuit is to lower the temperature of the extracted feedstock material and the reaction column to a level below the saturation temperature to enable safe removal of the extracted feedstock. Once the temperature is low enough, the system can be switched back to the first cooling circuit and the column can be drained of water, the extracted feedstock removed, and fresh material added for the next extraction run.

Empty/Reload:

After the extraction process is complete, the pressurized reaction column must be depressurized and the water evacuated before the reaction column is opened for unloading of the processed biomass feedstock. It is optional to load the biomass feedstock into one or more sleeves that are inserted into the reaction column for processing after which, the sleeves are removed from the reaction column, and the biomass is removed from the sleeves. Alternatively, the biomass may be loaded directly into the reaction column and recovered therefrom after processing. It is optional to provide a compressed air supply or a water supply or a steam supply to push spent biomass feedstock out of the reaction column to facilitate its unloading.

Figure 7:
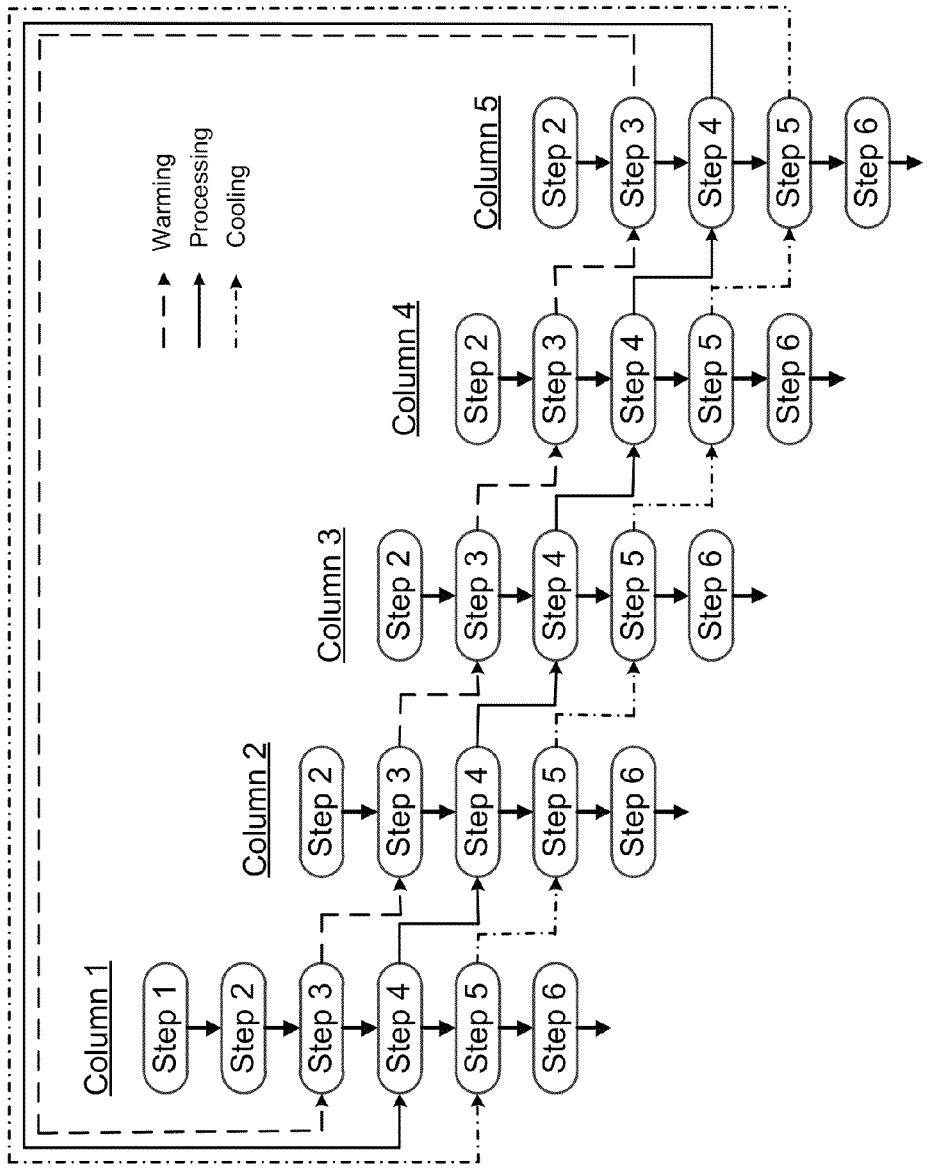
FIG. 7 is a schematic flowchart for another exemplary PLPW process of the present disclosure using a five-column system with three independent process circuits.

It is to be noted that it is optional, if so desired, for the five reaction column apparatus to comprise four independent circuits i.e., flooding (FIG. 3), warming (FIG. 4), processing (FIG. 5) cooling (FIG. 6), can be reduced to three independent circuits by (i) eliminating the flooding circuit and (ii) using the cooling circuit to provide the flooding circuit as well as the cooling circuit as shown in FIG. 7.

Figure 8:
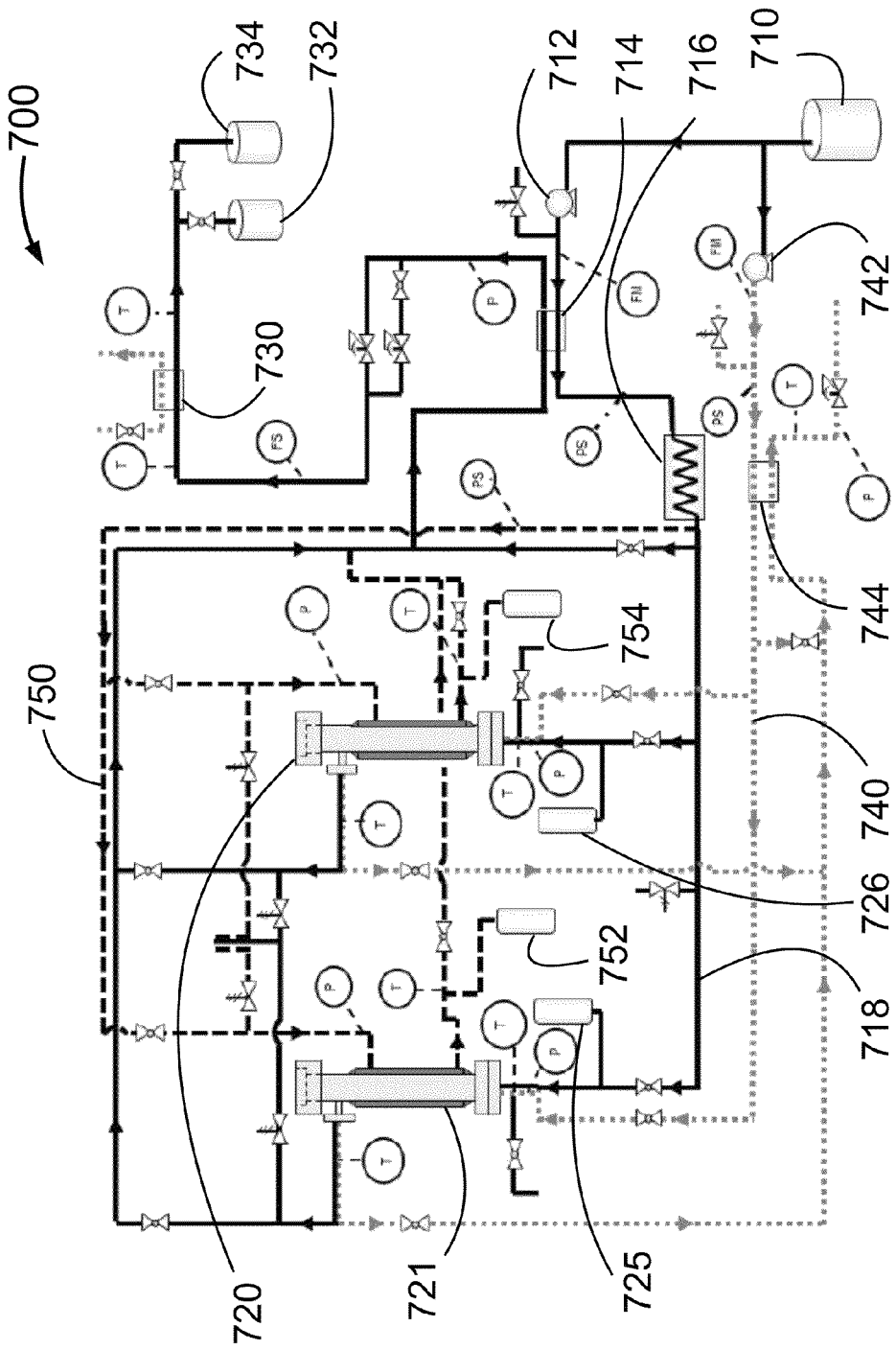
FIG. 8 is schematic diagram of an exemplary 2-column pilot-scale PLPW system.

Another exemplary PLPW apparatus 700 comprising two reaction columns is shown in FIG. 8, wherein the columns 720, 721 have a maximum operating pressure of 6200 kPa (900 psi) at an operating temperature of 204° C. The column jackets are designed for a lower maximum operating pressure of 2,580 kPa (375 psi) at an operating temperature of 204° C. to prevent crushing of the column if the jacket is pressurized and the column is not. However, because several other pieces of equipment, such as the accumulators 725, 726 have been certified for temperatures and pressures less than those of the columns 720, 721, the maximum operating pressure and temperature of this two-column system, as a whole, is set at 5500 kPa (800 psi) and 180° C., and the maximum operating pressure of the jacket circuit 750 is 2400 kPa (350 psi). The specifications and descriptions for the major parts of the PLPW system shown in FIG. 8 are listed in Tables 1 to 6.

The process flow 718 for the pressurized low polarity water extraction system is shown in FIG. 8. Process water is drawn from the water reservoir 710 with a positive displacement pump 712 (i.e., process pump) and passed through heat exchanger 714 where the process water is first used to cool and recover heat from the liquid extract exiting the system. The partially heated water then enters the immersion heater 716, where it is heated to the desired process temperature. The system is controlled to direct the heated water either through the column jackets to warm the equipment, or through the column 720 packed with the feedstock to be extracted. The exiting liquid extract/process water flows back through heat exchanger 714 where energy is recovered and the product temperature is lowered to below the boiling point before reaching back pressure regulator 751. The purpose of the back pressure regulator 751 is to maintain the system pressure at a point above the saturation pressure at the operating processing temperature to prevent the formation of steam.

TABLE 1

| Characteristic | Biomass capacity (35 kg; 46% MC) |
|---|---|
| Inner diameter | 20 cm |
| Length | 203 cm |
| Column volume | 65,700 cm$^3$ |

TABLE 1-continued

| Characteristic | Biomass capacity (35 kg; 46% MC) |
|---|---|
| Sample mass (dry matter) | 18,900 g |
| Bed depth | 162 cm |
| Sample volume | 52,400 cm$^3$ |
| Sample bulk density | 0.33 g/cm$^3$ |
| Length to diameter ratio* | 5.4:1 |
| Solvent:solid ratio | 7.5 mL/g |
| Volume collected | 142,000 mL |
| Flow rate | 4,000 mL/min |
| Superficial velocity | 13.4 cm/min |
| Residence time** | 12.1 min |
| Extraction time*** | 30.0 min |

*where length = bed depth
**residence time = bed depth/superficial velocity
***extraction time = volume collected/flow rate

TABLE 2

Electrical equipment for a two-column PLPW apparatus.

| Name | Power | Voltage/Phase/Freq | Specification |
|---|---|---|---|
| Process Pump | 2 HP | 208 V/3φ/60 Hz | Hydra-Cell M03 with 2 hp Baldor motor, Baldor VFD, Hydra-Cell C62 pulsation dampener |
| Cooling Pump | 2 HP | 208 V/3φ/60 Hz | Hydra-Cell M03 with 2 hp Baldor motor, Baldor VFD, Hydra-Cell C62 pulsation dampener |
| Immersion Heater w/ Panel | 123 kW | 600 V/3φ/60 Hz | Wattco model # MFLS15123X1050-TM |
| Actuators (QTY 18) | 24 VDC | TBD/TBD/TBD | Promation P1-24N4 |
| System Control Panel | N/A | 120/208 V/3φ/60 Hz | Harlok/Cedarcore custom panel, includes parts and labour |

TABLE 3

Valves for a two-column PLPW apparatus.

| Name | Description | Specification |
|---|---|---|
| BVH | Heating Circuit Bypass Valve | MAS G-3-HD-FS |
| BVC | Cooling Circuit Bypass Valve | MAS G-3-HD-FS |
| ICV1 | Cooling Circuit Inlet Valve, Column 1 | MAS G-3-HD-FS |
| ICV2 | Cooling Curcuit Inlet Valve, Column 2 | MAS G-3-HD-FS |
| IHV1 | Heating Circuit Inlet Valve, Column 1 | MAS G-3-HD-FS |
| IHV2 | Heating Circuit Inlet Valve, Column 2 | MAS G-3-HD-FS |
| OCV1 | Cooling Circuit Outlet Valve, Column 1 | MAS G-3-HD-FS |
| OCV2 | Cooling Circuit Outlet Valve, Column 2 | MAS G-3-HD-FS |
| OHV1 | Heating Circuit Outlet Valve, Column 1 | MAS G-3-HD-FS |
| OHV2 | Heating Circuit Outlet Valve, Column 2 | MAS G-3-HD-FS |
| JIV1 | Jacket Inlet Valve, Column 1 | MAS G-3-HD-FS |
| JOV1 | Jacket Outlet Valve, Column 1 | MAS G-3-HD-FS |
| JIV2 | Jacket Inlet Valve, Column 2 | MAS G-3-HD-FS |
| JOV2 | Jacket Outlet Valve, Column 2 | MAS G-3-HD-FS |
| CWV | Cooling Water Valve | MAS G-3-HD-FS |
| CVV | Collection Vessel Valve | MAS G-3-HD-FS |
| WWV | Waste Water Valve | MAS G-3-HD-FS |
| LPV | Low Pressure Valve (Jacket Operating) | MAS G-3-HD-FS |
| DV1 | Drain Valve, Column 1 | MAS G-3-HD-FS |
| DV2 | Drain Valve, Column 2 | MAS G-3-HD-FS |

TABLE 4

Heat exchangers for a two-column PLPW apparatus.

| Name | Description | Specification |
|---|---|---|
| Heat Exchanger 1 | Warming Circuit (recovery) | Sentry model # WSW8221U Special |
| Heat Exchanger 2 | City Water (safety) | Sentry model # DTC-SSB/SSD-8-1-1 |
| Heat Exchanger 3 | Cooling Circuit (recovery) | Sentry model # WSW8221U Special |

TABLE 5

Mechanical regulators and safety valves for a two-column PLPW apparatus.

| Name | Specification | Pressure Setting |
|---|---|---|
| Back Pressure Regulator A | Equilibar EB2NL2 | <750 psi (from nitrogen reference) |
| Back Pressure Regulator B | Equilibar EB2NL2 | <750 psi (from nitrogen reference) |
| Back Pressure Regulator C | Equilibar EB2NL2 | <350 psi (from nitrogen reference) |
| Pressure Regulating Valve PP | Hydra-Cell C62 | 750 psi <Set Point> 800 psi |
| Pressure Regulating Valve CP | Hydra-Cell C62 | 750 psi <Set Point> 800 psi |
| Pressure Relief Valve R1 | Consolidated 19000 Series | 850 psi |
| Pressure Relief Valve R2 | Consolidated 19000 Series | 850 psi |
| Pressure Relief Valve J1 | Consolidated 19000 Series | 350 psi |
| Pressure Relief Valve J2 | Consolidated 19000 Series | 350 psi |
| Pressure Relief Valve IH | Consolidated 19000 Series | 850 psi |
| Accumulator A | Blacoh H2420A | 750 psi |
| Accumulator B | Blacoh H2420A | 750 psi |
| Accumulator C | Blacoh H2420A | 350 psi |
| Accumulator D | Blacoh H2420A | 350 psi |

TABLE 6

Instrumentation for a two-column PLPW apparatus.

| Name | Description | Specification |
|---|---|---|
| FM(H) | Process Flowmeter, Process Circuit | Burkert 8619 controller, SE30 sensor and gear fitting |
| FM(C) | Process Flowmeter, Cooling Circuit | Burkert 8619 controller, SE30 sensor and gear fitting |
| FS(H) | Flow Switch, Process Circuit | Burkert tuning fork 560986 |
| PCO(J) | Pressure Switch, Warming (Jackets) Circuit | United Electric H100 |
| PCO(H) | Pressure Switch, Processing Circuit | United Electric H100 |
| PCO(C) | Pressure Switch, Cooling Circuit | United Electric H100 |
| P(C1) | Pressure, Column 1 | Wika, 233.53 gauge, 2½" |
| IT(C1) | Inlet Temperature, Column 1 | Trident PD743 meter, WESC12C29-3E03.00C1A RTD |
| OT(C1) | Outlet Temperature, Column 1 | Trident PD743 meter, WESC12C29-3E03.00C1A RTD |
| P(J1) | Pressure, Jacket 1 | Wika, 233.53 gauge, 2½" |
| T(J1) | Temperature, Jacket 1 | Trident PD743 meter, WESC12C29-3E03.00C1A RTD |
| P(C2) | Pressure, Column 2 | Wika, 233.53 gauge, 2½" |
| IT(C2) | Inlet Temperature, Column 2 | Trident PD743 meter, WESC12C29-3E03.00C1A RTD |
| OT(C2) | Outlet Temperature, Column 2 | Trident PD743 meter, WESC12C29-3E03.00C1A RTD |
| P(J2) | Pressure, Jacket 2 | Wika, 233.53 gauge, 2½" |
| T(J2) | Temperature, Jacket 2 | Trident PD743 meter, WESC12C29-3E03.00C1A RTD |
| ET(C) | Outlet Temperature, Cooling Circuit | Trident PD743 meter, WESC12C29-3E03.00C1A RTD |
| BP(H) | Back Pressure, Process Circuit | Wika, 233.53 gauge, 2½" |
| BP(C) | Back Pressure, Cooling Circuit | Wika, 233.53 gauge, 2½" |
| IT(HE2) | Inlet Temperature, Heat Exchanger 2 | Trident PD765 meter, WESC12C29-3E03.00C1A RTD |
| OT(HE2) | Outlet Temperature, Heat Exchanger 2 | Trident PD743 meter, WESC12C29-3E03.00C1A RTD | within the system. After back pressure regulator 751 there is an additional heat exchanger 730 that may be used to control the final temperature of the outgoing liquid extract/process water. This heat exchanger 730 is connected to another water source, whereby the flow can be adjusted by a valve to cool the exiting liquid to the desired temperature. The liquid extract/process water is directed to either the collection vessel 732 or waste water vessel 734 for use elsewhere in the process.

There are several flow circuits within the extraction system. The flow circuit is selected with the automated control system, which controls the valve sequencing to operate each circuit.

Hot Bypass Circuit:

The hot bypass circuit isolates the reaction columns 720, 721 and jackets from the rest of the PLPW apparatus. The process pump 712 passes water from the water reservoir 710 through heat exchanger 714 (input side), the immersion heater 716, through the bypass valve BVH, heat exchanger 714 (product side), back pressure regulator 751, heat exchanger 730, and out of the system to the waste water vessel 734. The purpose of the hot bypass circuit is to pressurize and maintain the system pressure, and to adjust the process water temperature before the water is introduced into the other circuits.

Warming Circuit:

The warming circuit pushes process water through the reaction column jackets. The process pump 712 passes water through the input side of heat exchanger 714, the immersion heater 716, the column jacket, the output side out heat exchanger 714, through LPV and back pressure regulator 753, heat exchanger 730, and out of the system to the waste water vessel 734. The purpose of this circuit is to warm the column 720 to the desired processing temperature in order to minimize the loss of heat from the processing water to the equipment during extraction. It is to be noted that this circuit could be separated from the other circuits and run independently. This is accomplished by adding another pump (not shown), heat exchanger (not shown), and immersion heater (not shown). Alternatively, the jackets may be converted to use steam from a utilities facility either with steam as the heating medium within the jacket, or through the use of a heat exchanger and water pump to indirectly heat water for the jacket.

Processing:

During the processing circuit, the process water flows through the reaction column (e.g., 720 or 721) packed with a biomass feedstock. The process pump 712 pushes water through the input side of heat exchanger 714, the immersion heater 716, the column 720 or 721, the product side of heat exchanger 714, back pressure regulator 731, heat exchanger 730, and out of the PLPW apparatus to the collection vessel 732. The purpose of the processing circuit is to solubilise and extract components comprising the biomass feedstock. The PLP water travels through the reaction column 720 or 721 from its bottom to its top in a single pass. The least concentrated water first passes through the most extracted feedstock material, thus maximizing the amount of product extracted. In addition, due to the continuous flow-through nature of the extraction system, product is constantly removed from the system with low residence times while exposed to the operating conditions, thus reducing the amount of potential product degradation.

Cooling Circuit:

The cooling circuit cools the reaction columns 720, 721 down after the biomass feedstock has been fully extracted. Water in the first cooling circuit 740 is taken from the water reservoir 710 or waste water vessel 734 and pumped by the cooling pump 742 through the input side of heat exchanger 744, the bypass valve BVC, and back through the product side of heat exchanger 744, back pressure Regulator 745 and out of the PLPW apparatus to a drain. The purpose of first cooling circuit 740 is to pressurize and maintain the system pressure in the cooling circuit equal to the column pressure from the extraction.

In the second cooling circuit, the PLP water flows through the column 720 or 721 packed with the spent (i.e., extracted) biomass feedstock whereby the cooling pump 742 flows water through the input side of heat exchanger 744, the reaction column 720 or 721, the product side of heat exchanger 744, back pressure regulator 755, and out of the PLPW apparatus into the drain. The purpose of the second cooling circuit is to lower the temperatures of the extracted biomass feedstock material and the reaction column 720 or 721 below the saturation temperature to allow for safe removal of the extracted biomass feedstock. Once the temperature is low enough, the PLPW apparatus can be switched back to the first cooling circuit, the reaction column can be drained of water, the extracted biomass feedstock removed, and fresh biomass feedstock material loaded for the next extraction.

It is to be noted that those skilled in these arts will be able to adjust and/or modify the various equipment options disclosed herein for producing a PLPW apparatus that comprises at least two reaction columns wherein each column is provided with piping infrastructures communicating with at least a water supply, one or more heaters or heat exchangers for heating the water, and pumps for pressurizing the water to a temperature in the range of about 50° C. to about 65° C., from about 50° C. to about 85° C., from about 50° C. to about 100° C., from about 50° C. to about 125° C., from about 55° C. to about 150° C., from about 55° C. to about 175° C., from about 55° C. to about 185° C., from about 55° C. to about 195° C., from about 55° C. to about 205° C., from about 55° C. to about 225° C., from about 55° C. to about 250° C., from about 55° C. to about 275° C., from about 55° C. to about 300° C., from about 55° C. to about 325° C., from about 55° C. to about 350° C., from about 55° C. to about 375° C., from about 55° C. to about 400° C., and therebetween, and a pressure from the range of about 100 psi to about 500 psi, from about 125 psi to about 450 psi, from about 150 psi to about 400 psi, from about 165 psi to about 375 psi, from about 175 psi to about 350 psi, from about 175 psi to about 325 psi, from about 175 psi to about 300 psi, from about 175 psi to about 275 psi, from about 175 psi to about 250 psi, from about 175 psi to about 225 psi, and therebetween.

The PLPW apparatus disclosed herein may be configured with two reaction columns, each separately communicating with a single source of pressurized water, pressurized heated water, and pressurized cooling water as shown in FIG. 8. Alternatively, the PLPW apparatus may be configured with three reaction columns, four reaction columns, five reaction columns, six reaction columns, seven reaction columns, eight reaction columns, nine reaction columns, ten reaction columns. It is within the scope of the present disclosure to provide backup supplies of pressurized water, pressurized heated water, and pressurized cooling water.

The PLPW apparatus may additionally comprise water purification equipment for receiving and processing therein the waste water stream egressing from the reaction columns during each initial warm-up circuit, flooding circuit, warming circuit, and cooling circuit, and then recycling the processed water back into one or more of the flooding circuit, warming circuit, and cooling circuit.

The exemplary PLPW apparatus disclosed herein are suitable for extraction and recovery of components from biomass feedstocks exemplified by lignocellulosic materials such as fruit pulps, vegetable pulps, pomaces, root materials, vegetative materials, woody materials, straws, herbaceous materials, seeds, nuts, meals, bagasse, and the like. The exemplary PLPW apparatus are also suitable for extraction and recovery of components from non-plant biomass materials exemplified by algal biomass, fish meals, and the like.

EXAMPLES

Example 1

PLPW Processing of Wheat Straw

Two different PLPW flow-through reactor systems and three different scale reaction columns were used in the studies disclosed in this example. All connections, fittings, tubing, valves and vessels were constructed of stainless steel to resist corrosion and designed for a maximum operating pressure of 13.1 MPa (1900 psi) at 250° C.

A laboratory-bench scale PLPW reaction system 800 (FIG. 9) was constructed in-house and comprised: a water supply 805, a high-performance liquid chromatography (HPLC) pump 810 (Waters 515 model, Milford, Mass.), a temperature-controlled oven 815 (Model 851F, Fisher Scientific, Pittsburgh, Pa.), a 2.0 m [stainless steel tubing with 3.2 mm (⅛") o.d.] preheating coil 820, a reactor column 825, a 1.0 m cooling coil 830 (stainless steel tubing with 3.2 mm (⅛") o.d.), a back pressure regulator 835 with a cartridge of 5.2 MPa (750 psi) (Upchurch Scientific, Oak Harbor, Wash.) to maintain pressure in the system, and a collection vessel 840. A pressure relief valve 822 was also provided interposed the preheating coil 820 and the reactor column 825. Stainless steel tubing (3.2 mm (⅛") o.d.) and connectors were used to connect the equipment pieces (i.e., the HPLC pump, reaction column, and back pressure regulator).

Figure 9:
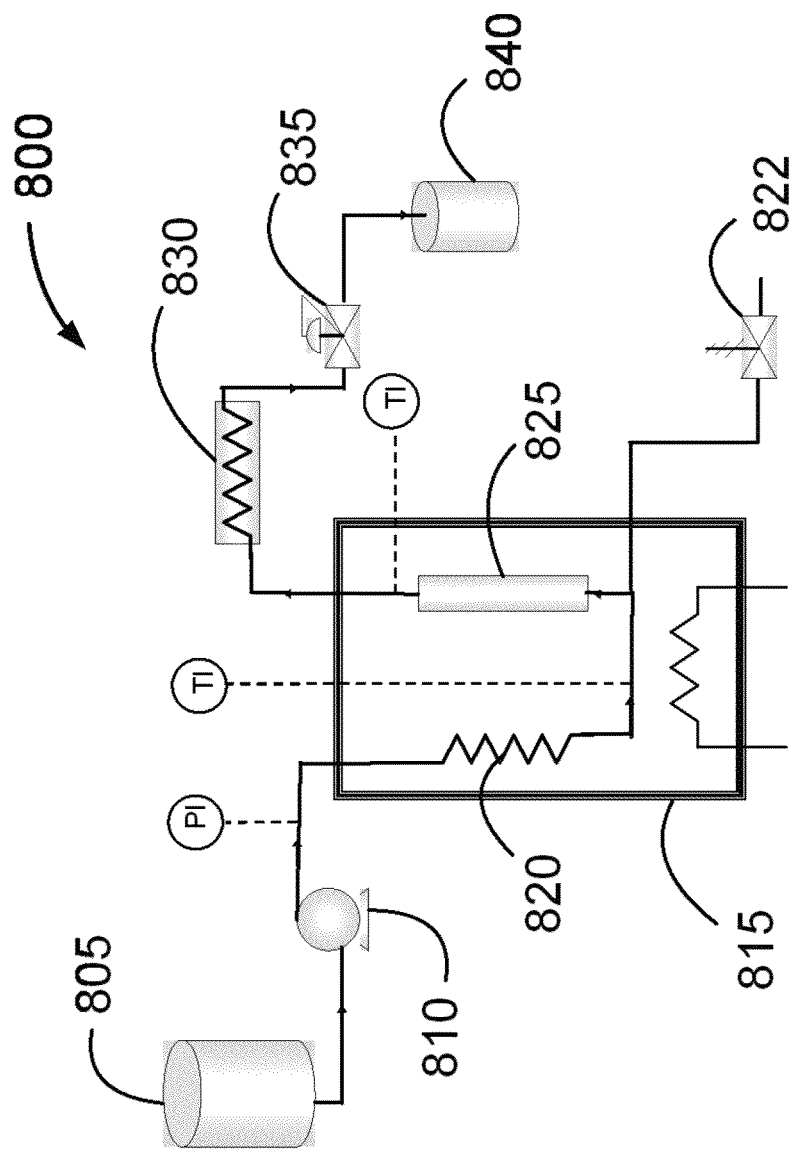
FIG. 9 is a schematic diagram of an exemplary bench-scale PLPW system.

The PLPW reaction system 900 (FIG. 10) used to run the scale-up reaction column and the pilot-scale reaction column was constructed in-house and was based on the design of the bench-scale system (FIG. 9). Pressure in the systems was maintained at 11 MPa (1500 psi) for all experiments by adjusting the back pressure regulator 950 (Tescom, Elk River, Minn.). Distilled water from a water reservoir 910 was pressurized and pumped at a constant flow rate using a metering pump 915 (Model P300, Wanner Engineering Inc., Minneapolis, Minn.) with a pulsation dampener 920 (Wanner Engineering Inc., Minneapolis, Minn., USA) installed after the pump 915 to ensure steady flow in the system. A tube-in-tube heat exchanger 925 (Exergy LLC, Garden City, N.Y., USA)

performed two duties within the system: (i) first, the heat exchanger 925 cooled the solvent after the reactor column 935 before exhausting to the collection vessel 955; (ii) second, the heat removed from the exhaust solvent was transferred to the incoming solvent before entering the immersion heater 930 (ASB Heating Elements Ltd., Bethridge, ON, CA). In this way, the heat exchanger 925 preheated the water and reduced the energy requirements of the system. A pressure relief valve 945 was provided in between the heat exchanger 925 and the immersion heater 930. Stainless steel tubing (12.7 mm (½") o.d.) and connectors were used to connect the equipment pieces together, except for the scale-up reaction column, which was connected to the system with 6.35 mm (¼") o.d. tubing.

The bench-scale reaction column 825 (FIG. 9) was constructed out of stainless steel tubing (1.27 cm (½") o.d., 1.0 cm i.d.×10 cm length) and capped with chromatography-column end fittings (Chromatographic Specialties Inc, Brockville, ON, CA). The scale-up reaction column 935 was scaled up by a factor of 5 from the bench-scale unit (Table 7). The unit was a stainless steel flanged reaction column of 5 cm i.d.×50 cm length (MODcol, Mandel Scientific Company Inc., Guelph, ON, CA) sealed with graphite o-ring gaskets and stainless steel end plates, which were tapped and treaded to allow connection to the PLPW reaction system. The pilot-scale reaction column was a custom-built stainless steel flanged column (Enterprise Steel Fabricators Ltd., Kelowna, BC, CA) and was been scaled up by a factor of 3.56 over the scale-up unit (Table 7). The ends were capped and sealed with stainless steel plates and o-ring gaskets and were tapped and treaded to allow connection to the PLPW reaction system. Valves isolated the scale-up and pilot-scale units from the rest of the PLPW reaction system when not in use. Due to the increased mass of the scale-up and pilot-scale reaction columns, they were equipped with band heaters 940 (ASB Heating Elements Ltd., Bethridge, ON, CA) to aid in heating and maintaining the column temperature.

The hydrolysis reaction procedure was initiated by first flooding the reaction column with water and then warming the system to the experimental temperature and then holding the temperature for sufficient time to allow the temperature of the sample to equilibrate within the column before commencing flow through the reaction column. Upon commencement of flow through the reaction column the first portion of solution, which contained no analyte (corresponding to the dead volume in the system from the top of the reaction column to the collection vessel), was discarded and the predetermined volume of solution based on the chosen solvent-to-solid ratio was collected. A portion (approximately 60 mL) of the liquid extracts was collected from each experiment and stored at 4° C. for analysis, the rest of the liquid extracts were freeze dried along with the solid residues and stored at −20° C. until they were analyzed.

Solid residues and freeze-dried liquid extracts were analysed for structural carbohydrates, lignin, acetyl groups, and ash content following NREL standard analytical procedures (Hyman et al., 2007, *Determination of Acid Soluble Lignin Concentration Curve by UV-Vis Spectroscopy; Laboratory Analytical Procedure* (LAP). NREL/TP-510-42617; National Renewable Laboratory: Golden, Colo., USA; Sluiter et al., 2008, *Determination of Structural Carbohydrates and Lignin in Biomass; Laboratory Analytical Procedure* (LAP) NREL/TP-510-42618; National Renewable Laboratory: Golden, Colo., USA). Acid insoluble lignin (AIL) and acid soluble lignin (ASL) were determined by first hydrolysing samples with 72% sulphuric acid for 1 hr at 30° C. in a water bath and then diluting to 4% sulphuric acid and autoclaving at 121° C. for 1 h in sealed glass pressure tubes. AIL was analysed gravimetrically after the hydrolysis of the cellulose and hemicellulose. ASL in the hydrolysate was determined by the spectrophotometric method at 320 nm (Sluiter et al., 2008). An absorptivity of 30 L g−1 cm−1 was used to convert absorbance readings to mass values. The results for

TABLE 7

| Characteristic | Bench Scale | Small Scale | Pilot Scale |
| --- | --- | --- | --- |
| Inner Diameter | 1.0 cm | 5 cm | 17.8 cm |
| Length | 10 cm | 50 cm | 178 cm |
| Flow Rate$^a$ | 6.0 mL/min | 150 mL/min | 1900 mL/min |
| Column Volume | 7.85 cm$^3$ | 981.7 cm$^3$ | 44300 cm$^3$ |
| Sample Mass (dry matter) | 0.96 g | 120 g | 5400 g |
| Bed Depth | 8.0 cm | 40 cm | 142 cm |
| Sample Bulk Density | 0.15 g/cm$^3$ | 0.15 g/cm$^3$ | 0.15 g/cm$^3$ |
| Length to Diameter Ratio$^b$ | 8:1 | 8:1 | 8:1 |

$^a$Equivalent superficial velocity in the column of $1.27 \times 10^{-3}$ m/s
$^b$Where length is the bed depth In addition to scaling up the reaction column dimensions, the appropriate scaling of the experimental conditions was conducted (Table 7). A temperature of 165° C. and a solvent-to-solid ratio of 60 mL/g were chosen for these experiments. A flow rate comprising the superficial velocity of 1.27×10−3 m/s, corresponding to flow rates of 6, 150, and 1900 mL/min for the bench-scale, the scale-up, and pilot-scale reaction columns respectively, was chosen. The same bed depth to diameter ratio was retained and the sample mass was adjusted to maintain the identical bulk density (and porosity) within each scale of column. To keep the straw sample inside of the reaction column, and to help promote dispersion of the PLPW, the empty volume at each end of the columns were packed with stainless steel wool and capped with a 20 μm and 100 μm stainless steel frit at the inlet and outlet respectively; except for the pilot scale unit, which did not use frits.

lignin content of the samples are reported as the sum of the AIL and ASL and are corrected for protein content.

Structural carbohydrates, cellulose (glucose) and hemicellulose (xylose, galactose, arabinose, and mannose) were determined quantitatively from the hydrolysate by HPLC using an Agilent 1100 equipped with a refractive index detector (Agilent Technologies, Palo Alto, Calif.). The HPLC analysis was carried out using an AMINEX® HPX-87P column (300×7.8 mm) (AMINEX is a registered trademark of Bio-Rad Laboratories Corp., Hercules, Calif., USA) with a deashing guard cartridge (Bio-Rad Laboratories, Hercules, Calif.) operating at 75° C. The HPLC system consisted of a G1329A autosampler and G1312A delivery system that were controlled by Agilent CHEMSTATION® Plus software (CHEMSTATION is a registered trademark of Agilent Technologies Inc., Santa Clara, Calif., USA). HPLC-grade filtered water was used as the mobile phase at a flow rate of 0.5 mL/min and, for each sample, 50 μL of prefiltered aliquot was injected automatically. The carbohydrate concentrations were determined by comparison against a set of known sugar standards and the application of a sugar recovery factor following the methods taught by Sluiter et al. (2008).

Acetyl groups, formic and levulinic acids were quantitatively measured from the hydrolysate with HPLC using an Agilent 1100 equipped with a refractive index detector (Agilent Technologies, Palo Alto, Calif.) following the methods taught by Sluiter et al. (2008). The HPLC analyses were conducted using a Bio-rad AMINEX® HPX-87H column (300×7.8 mm, Bio-Rad Laboratories, Hercules, Ca) with a Cation H refill Cartridge guard column (30×4.6 mm, Bio-Rad Laboratories, Hercules, Calif.) operating at 55° C. with a 0.005M H2SO4 mobile-phase at a flow rate of 0.6 mL/min.

Uronic acids in the hydrolysate were quantified following the method taught by Scott (1979, *Colorimetric determination of hexuronic acids in plant materials*. Anal. Chem. 51:936-941). An aliquot (0.125 mL) of the hydrolysate was added to 0.125 mL of 2% NaCl-3% $H_3BO_3$ solution in a test tube. Concentrated $H_2SO_4$ was added to the test tube in an ice bath and mixed. The test tube was then heated for 40 min at 70° C. in a water bath. The test tubes were then removed and allowed to cool to room temperature before 0.1 mL of 0.1% 3,5-dimethylphenol in glacial acetic acid was added to the reactant. After 10 min, the uronic acids concentration was determined by averaging the absorbance at 400 and 450 nm and comparing it to a standard curve of D-glucuronic acid (Sigma-Aldrich Co., St. Louis, Mo.).

The ash content of the solids was determined by complete combustion of the samples in a muffle furnace (Model F-A1730, Thermolyne Corporation, Dubuque, Iowa) equipped with a temperature controller (Furnatrol II series 413, Thermolyne Corporation, Dubuque, Iowa). The temperature controller was set to ramp up to 105° C. from room temperature, held for 12 min, ramped up to 250° C. at 10° C./min, held for 30 min, ramped up to 575° C. at 20° C./min, held for 180 min, and dropped to 105° C. and held until the sample was removed. The remaining residue in the crucible was taken as the ash content.

Protein contents were estimated from the nitrogen content with the method disclosed in AOAC Official Method 997.09 (2008, *Nitrogen in beer, wort, and brewing grains, protein (total) by calculation*. AOAC International). Prior to analysis the solid residues were ground in a hammer mill (MF 10, IKA-Werke GmbH & Co. KG, Staufen, Germany) to pass through a 0.5 mm discharge screen. Samples were dried overnight in a vacuum oven at 60° C. prior to analysis. Nitrogen content was determined by combusting the dried samples at 850° C. using a Leco FP-528 nitrogen analyser (Leco Corporation, St. Joseph, Mich.). A standard curve for nitrogen was produced using ethylenediaminetetraacetic acid (EDTA) and corn flour (Leco Corporation, St. Joseph, Mich.). Protein contents were estimated by multiplying the nitrogen content (%) by a factor of 6.25.

Liquid extracts were neutralised with calcium carbonate, filtered through a 0.20 μm syringe filter, and used for direct HPLC determination of carbohydrate monomers. The concentration of carbohydrate oligomers was then calculated by taking the difference between the hydrolysed total carbohydrate content determined from the freeze dried extracts and the monomer content determined from the liquid samples. The degradation products 5-hydroxy-2-methylfurfural (HMF) and furfural were determined from the same sample by direct HPLC determination using DAD detection.

Data were analysed using SigmaStat30 (Version 3.5, Systat Software, Inc., Point Richmond, Calif., USA). The ANOVA procedure was used to analyse the effects of reactor scale and a means comparison by Tukey's test was performed when differences were found. Differences with p≤0.05 were considered significant.

Before performing the hydrothermal treatment, the composition of the native straw was first determined (Table 8). Compositional analysis was performed using native straw material, not material extracted with water and ethanol to remove the extractives as specified by the NREL laboratory procedure.

TABLE 8

| Constituents | Content (%)* |
|---|---|
| Glucan | 40.15 ± 1.00 |
| Xylan | 20.38 ± 0.18 |
| Galactan | 1.17 ± 0.11 |
| Arabinan | 1.85 ± 0.08 |
| Mannan | 0.52 ± 0.10 |
| Lignin[†] | 17.32 ± 0.23 |
| Acetyl groups | 1.60 ± 0.07 |
| Uronic acid | 1.40 ± 0.07 |
| Protein | 4.54 ± 0.49 |
| Ash | 5.15 ± 0.42 |

*average ± standard deviation, n = 4
[†]Corrected for protein

Mass Balance:

The mass balance for the wheat straw after hydrothermal treatment was in good agreement for all scales of reaction column (Table 9). Losses were the highest for the scale-up unit at 7.67%, and lowest for the bench scale. The total dissolved mass of 26 to 40% and solid residue remaining of 57 to 72% are in the range reported in literature for other crops undergoing flow-through hydrothermal treatment with PLPW (13 to 56% total dissolved mass and 40 to 77% solid residue remaining) (Mok et al., 1992, *Uncatalysed solvolysis of whole biomass hemicellulose by hot compressed liquid water*. Ind. Eng. Chem. Res. 31:1157-1161).

TABLE 9

| | Reactor* | | |
|---|---|---|---|
| | Bench Scale | Small Scale | Pilot Scale |
| Solid Residue (%) | 71.88[a] | 56.57[b] | 56.78[b] |
| Dissolved Mass (%) | 26.04[b] | 35.77[ab] | 39.91[a] |
| Total (%) | 97.92 | 92.33 | 96.69 |
| Unaccounted Material (losses)[†] (%) | 2.08 | 7.67 | 3.31 |

*Mean values in a row with different superscript letters are significantly different (p < 0.05).
[†]Calculated as Starting Material - Solid Residue - Dissolved Mass There was no significant difference (p>0.05) in the amount of material that was hydrolysed and extracted, or in the amount of residue left in the reaction column from the scale-up or pilot-scale systems. In the bench scale system, less material was hydrolysed and extracted, leaving a much larger amount of residue in the reaction column. In theory if a unit is properly scaled, there should not be a difference in extraction due to the size of the reaction column. However, hydrothermal treatment is not only a solubilization and extraction phenomena, there is also an aspect of chemical reaction involved in the form of a hydrolysis of the carbohydrates in the biomass. The hydrolysis proceeds whereby the carbohydrate polymer is broken down by the addition of a molecule of water. The reaction is time dependent and subject to the amount of ions present for water ionization and acid generation, and may additionally be affected by any solubility limitations from the released compounds. Of these three factors, residence time for the hydrothermal treatment is the only one that will change for the different column scales in these experiments. At an equivalent solvent-to-solid ratio and superficial velocity within the reaction columns, the time to collect the required amount of solvent is less than 10 min for the bench scale, 48 min for the scale-up, and 170 min for the pilot scale. The 10 min treatment time in the bench scale column is probably not sufficient to allow for the hydrolysis to be fully completed.

Figure 11:
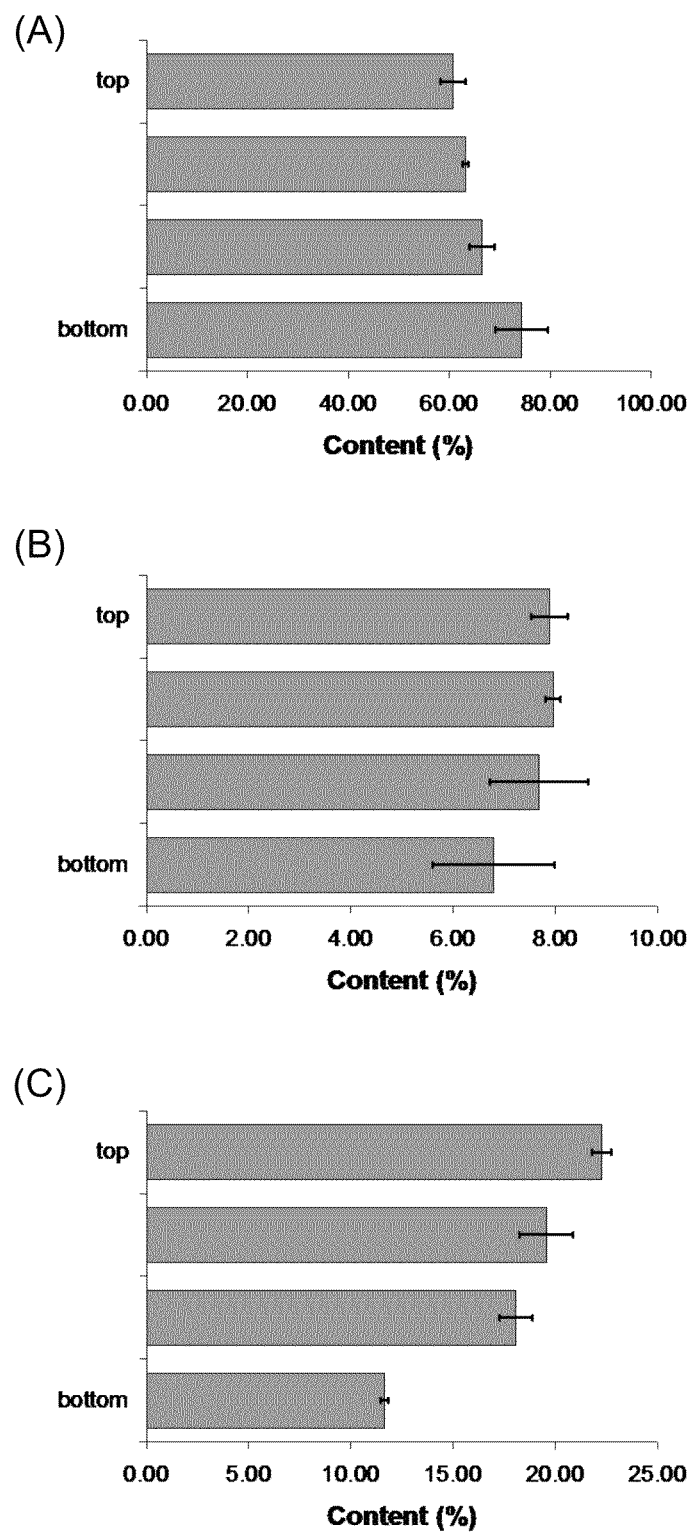
FIGS. 11(A)-11(C) are charts showing the distribution of cellulose (11(A)), hemicelluloses (11(B)), and lignin (11(C)) in the reaction column after PLPW processing of wheat straw in the pilot plant-scale PLPW system shown in FIG. 10.

Composition of Solid Residues and Liquid Fractions:

Compositions of the solid residue and liquid fractions from the hydrothermal treatment of CPS wheat straw with PLPW in three scales of reaction column are presented in Table 10. Solid residues at the pilot scale were analyzed for differences in composition with bed depth (FIGS. 11(A), 11(B), 11(C)). Results for the composition of the solid residue for the pilot scale reaction column at various bed depths were averaged (Table 10).

There were almost no differences in solid residue and liquid fraction composition between the scale-up and pilot scale systems (Table 10). The only constituents that differed between the two scales were the xylan content of the solid residue and lignin content of the liquid fraction. Xylan content was slightly lower in the scale-up column and lignin content higher in the liquid fraction. Lower xylan in the residue in addition to higher lignin in the liquid fractions would be an expected combination because lignin is bonded with cellulose and hemicelluloses forming complexes with them. Lignin acts as a shield around the hemicellulose and limits access of the medium to the hemicellulose for the hydrolysis process. Increased removal of lignin into the liquid extracts would allow greater access to the remaining hemicellulose and increase the amount hydrolyzed and extracted by the hydrothermal treatment. One possible cause for the increased lignin extraction in the scale-up column is a higher and more even temperature distribution on start-up when compared to the pilot scale column. The pilot-scale column contained a much larger thermal mass which was difficult to heat before running the unit and may have had a dampening effect on any temperature fluctuations during operation. In addition, the large flanges and caps acted as a large heat sink on the unit. It took approximately 20 min for the pilot scale reaction column to come up to operating temperature once the flow was commenced at the beginning of the run, whereas the scale-up reaction column arrived at the operating temperature within 1 min of the flow commencing. This short term high temperature period in the scale-up column was sufficient to initially solubilize a greater portion of lignin and expose a greater amount of the hemicellulose to hydrolyzation. The larger concentrations of the degradation products HMF and furfural, and the reduced concentration of xylo-oligosaccharides in the scale-up column are also indications of an elevated processing temperature over the other scale systems.

Composition of the solid residue and liquid fractions from the bench-scale system were similar to both the scale-up and pilot-scale systems with a few major differences. Glucan content of the solid residue was nearly 25% less in the bench-scale system because the xylan content was nearly three times greater than in the other units. This is consistent with the concept of incomplete hydrolysis due to the short processing time and is in agreement with the reduction in dissolved mass of the bench scale reaction column (Table 9). Higher acetyl group content in the solid residue of the bench-scale system also points to reduced hydrolytic action during hydrothermal treatment due to decreased generation of acetic acid. The liquid fractions from the bench-scale reaction column also contained more arabino-oligosaccharides and mannose monosaccharides, whereas the concentration of xylose monosaccharides was lower. The structure of arabinan makes it highly susceptible to hydrolysis, so the preservation of arabinan in the solid residue (Table 10) and the preservation of oligosaccharides in the liquid fractions also points to a less severe treatment due to the decreased residence time. This is also evident by the low amount of degradation product furfural in the liquid fractions.

TABLE 10

| Constituents (%) | Reactor* | | |
|---|---|---|---|
| | Bench Scale | Small Scale | Pilot Scale |
| Solid Residue | | | |
| Glucan | 52.96$^b$ | 71.95$^a$ | 66.19$^a$ |
| Xylan | 15.30$^a$ | 5.23$^c$ | 6.44$^b$ |
| Galactan | 0.51$^a$ | 0.43$^a$ | 0.49$^a$ |
| Arabinan | 0.92$^a$ | 0.32$^b$ | 0.36$^b$ |
| Mannan | 0.78$^a$ | 0.29$^b$ | 0.30$^b$ |
| Lignin† | 18.63$^a$ | 18.34$^a$ | 17.89$^a$ |
| Acetyl groups | 1.11$^a$ | 0.35$^b$ | 0.39$^b$ |
| Uronic acid | 0.68$^a$ | 0.19$^a$ | 0.17$^a$ |
| Protein | 3.55$^a$ | 3.84$^a$ | 3.80$^a$ |
| Ash | 4.77$^a$ | 2.74$^b$ | 2.67$^b$ |
| Others (by difference) | 0.78 | +3.67 | 1.33 |
| Liquid Fractions (dissolved mass) | | | |
| Gluco-oligosaccharides | 6.45$^a$ | 5.63$^a$ | 6.29$^a$ |
| Xylo-oligosaccharides | 30.39$^a$ | 26.26$^a$ | 31.07$^a$ |
| Galacto-oligosaccharides | 1.98$^a$ | 1.13$^a$ | 1.27$^a$ |
| Arabino-oligosaccharides | 2.68$^a$ | 0.44$^b$ | 0.84$^b$ |
| Manno-oligosaccharides | 0.27$^a$ | 0.50$^a$ | 0.89$^a$ |
| Glucose | 0.99$^a$ | 1.34$^a$ | 0.81$^a$ |
| Xylose | 1.09$^b$ | 4.90$^a$ | 3.33$^{ab}$ |
| Galactose | 0.42$^b$ | 0.57$^b$ | 1.99$^a$ |
| Arabinose | 2.74$^a$ | 2.48$^a$ | 2.22$^a$ |
| Mannose | 2.24$^a$ | 0.70$^b$ | 0.42$^b$ |
| HMF | 0.03$^b$ | 0.39$^a$ | 0.11$^b$ |
| Furfural | 0.48$^b$ | 3.69$^a$ | 1.63$^{ab}$ |
| Lignin† | 15.26$^b$ | 20.96$^a$ | 14.60$^b$ |
| Acetyl groups | 1.77$^a$ | 1.95$^a$ | 2.01$^a$ |
| Uronic acid | 2.26$^a$ | 1.22$^a$ | 1.61$^a$ |
| Formic acid | 1.00$^a$ | 0.82$^a$ | 0.86$^a$ |
| Levulinic acid | 0.27$^b$ | 0.38$^a$ | 0.25$^b$ |
| Protein | 7.76$^a$ | 6.63$^a$ | 6.38$^a$ |
| Ash | 9.96$^a$ | 9.60$^a$ | 10.53$^a$ |
| Others (by difference) | 11.97 | 10.42 | 12.89 |

*Mean values in a row with different superscript letters are significantly different (p < 0.05).
†Corrected for protein Even with little significant difference in composition between the three scales of reaction column, there still may be differences in composition within a reaction column at the larger scale. Variations in the three main constituents of cellulose, hemicellulose, and lignin with bed depth of the solid residues in the pilot-scale system were measured. Cellulose is reported as the glucan content of the solid residues, and hemicellulose, which is a branched polysaccharide consisting of pentoses (D-xylose and L-arabinose) and hexoses (D-galactose, D-glucose, and D-mannose), was reported as the total sum of the xylan, galactan, arabinan, and mannan content of the solid residues. Cellulose content decreased by nearly 15% from the bottom of the pilot-scale reaction column to the top (FIG. 11(A)). There was no difference in hemicellulose content in the top three sections of the reaction column (FIG. 11(B)). Only in the bottom section of the column was the hemicellulose content lower, although the difference was a little more than 1%. This may be partially attributed to the lower lignin content in the bottom section of the reaction column increasing the accessibility of the hemicellulose to hydrolysis (FIG. 11(C)).

Lignin content of the solid residues almost doubled from the bottom of the pilot-scale reaction column to the top. It is known that lignin solubility is greatly affected by solvent properties. The solvating power of the PLPW would be the greatest at the bottom where it enters the reaction column. Lignin in the straw at the bottom of the reaction column would be readily solubilized before the PLPW became saturated as it travelled upwards through the column. Thus, more lignin would be solubilized in the lower sections of the reaction column than the top. Lignin is being solubilized within the pilot-scale apparatus, but it is being extracted in lower quantities than in the scale-up column, as seen by the lower lignin content in the liquid fractions (Table 10).

Liu et al. (2003, *The Effect of Flow Rate of Compressed Hot Water on Xylan, Lignin, and Total Mass Removal from Corn Stover*. Ind. Eng. Chem. Res. 42:5409-5416) proposed a mechanism for lignin solubilization whereby lignin reacted with itself and other compounds to form larger molecules that may precipitate due to long residence times, or a drop in reaction temperature. It took dissolved material about 3.5 times longer to travel through the pilot-scale reaction column than through the scale-up column at the same superficial velocity. Lignin solubilized from the bottom sections would travel upwards through the column. When the solubilized lignin reacted with other lignin and compounds, it would form larger molecules and precipitate out of the PLPW. These lignin-containing molecules would be deposited in the upper sections before exiting the reaction column, thereby explaining the increased lignin content of the solid residues.

Figure 12:
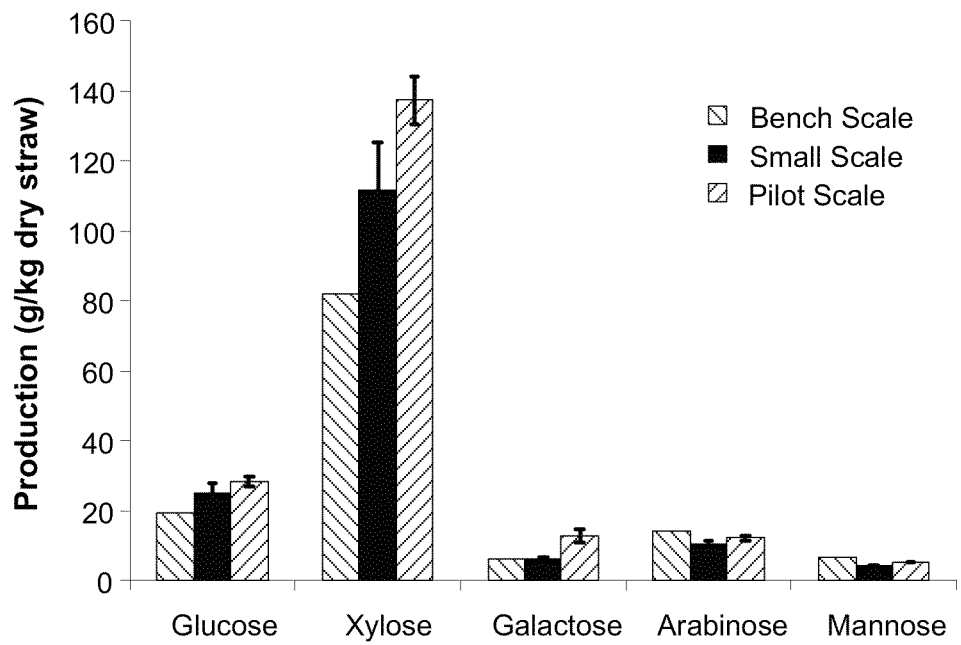
Figure 12:
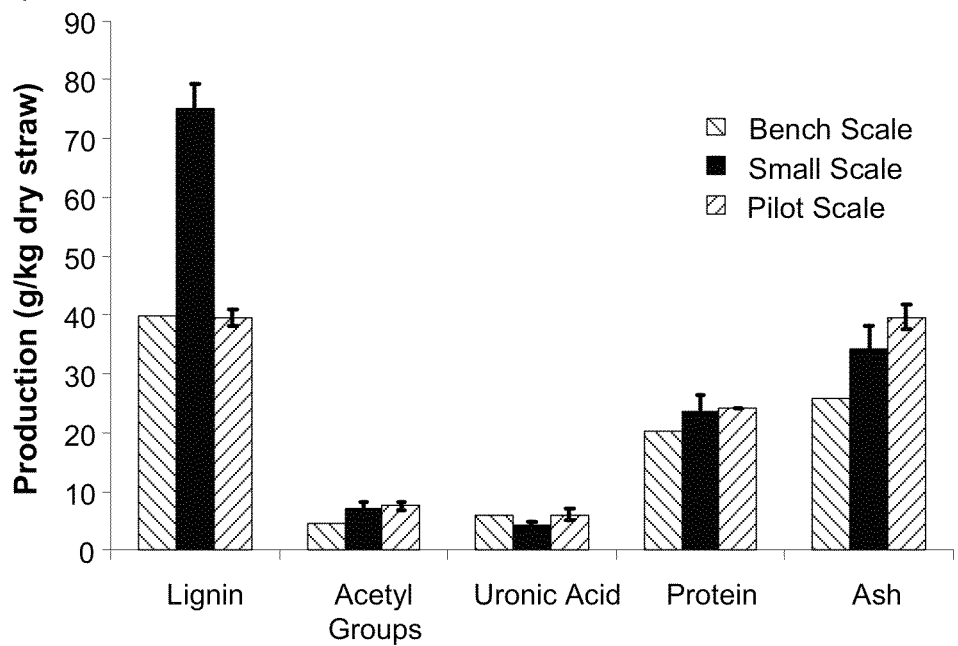

Recovery of Carbohydrate and Non-Carbohydrate Products:

Recovery of carbohydrate and non-carbohydrate products from wheat straw was not greatly affected by scale of the reaction column (FIGS. 12(A), 12(B)). No differences were observed in the recovery of glucose or of the minor hemicellulose carbohydrates galactose, arabinose, and mannose for all column scales (FIG. 12(A)). The pilot-scale apparatus produced approximately 26 g more xylose per kilogram of dry straw than did the scale-up unit (FIG. 12(A)). However, the solid residues from both scales yielded equal amounts of residual xylan. The scale-up column came up to operating temperature much faster than the pilot-scale column, so the difference in xylose production was probably due to the creation of furfural from the higher temperature during the initial stages of hydrothermal treatment. The production of xylose from the bench-scale apparatus was 30 g/kg of dry straw less than the scale-up, and 56 g/kg of dry straw less than the pilot-scale apparatus, with an overall yield of 39% in the liquid fraction. The residual xylan in the solid residue was over three times greater than the other scale reaction columns, and 40% of the potential xylan remained. Hence, the difference was mostly due to incomplete hydrolysis due to insufficient residence time.

Extraction of lignin was almost 50% greater in the scale-up reaction column than in the bench-scale and pilot-scale reaction columns (FIG. 12(B)). Reduced production of lignin in the bench-scale reaction column was likely a byproduct of the incomplete hydrolysis reaction. The lignin remaining within the solid residue was nearly 25% more than in the scale-up reaction column and the pilot-scale reaction column. The difference in lignin production between the scale-up and pilot-scale columns was the result of increased residence time and not due to differences in solubilization, or to flow distribution within the two columns. Lignin modification and reaction with itself or other compounds in the pilot-scale reaction column caused some of the lignin to precipitate before it was removed from the column. This caused an axial gradient of lignin concentration within the column, which also made it difficult to accurately calculate the true lignin content of the all the remaining solids from the hydrothermal treatment. There were few differences due to column scale for the production of the remaining non-carbohydrate components (FIG. 12(B)).

Characterization of the native CPS wheat straw allowed for calculation of the yields achieved from hydrothermal treatment with PLPW. Yields were calculated as the quantity of component collected in the liquid extracts, divided by the potential amount of the component in the native straw and reported as a percentage. Yield curves for cellulose, hemicellulose (sum of the xylose, galactose, arabinose, and mannose) and lignin, the three main constituents of lignocellulosic biomass, for the scale-up and pilot-scale columns are plotted in FIGS. 13(A), 13(B), 13(C). No yield curves were produced for the bench-scale system because there was insufficient material extracted to analyse multiple points during the hydrothermal treatment. This is one of the major drawbacks of very small-scale systems and illustrates why there is a need to scale up these processes so that a better understanding of the kinetics can be determined.

Figure 13:
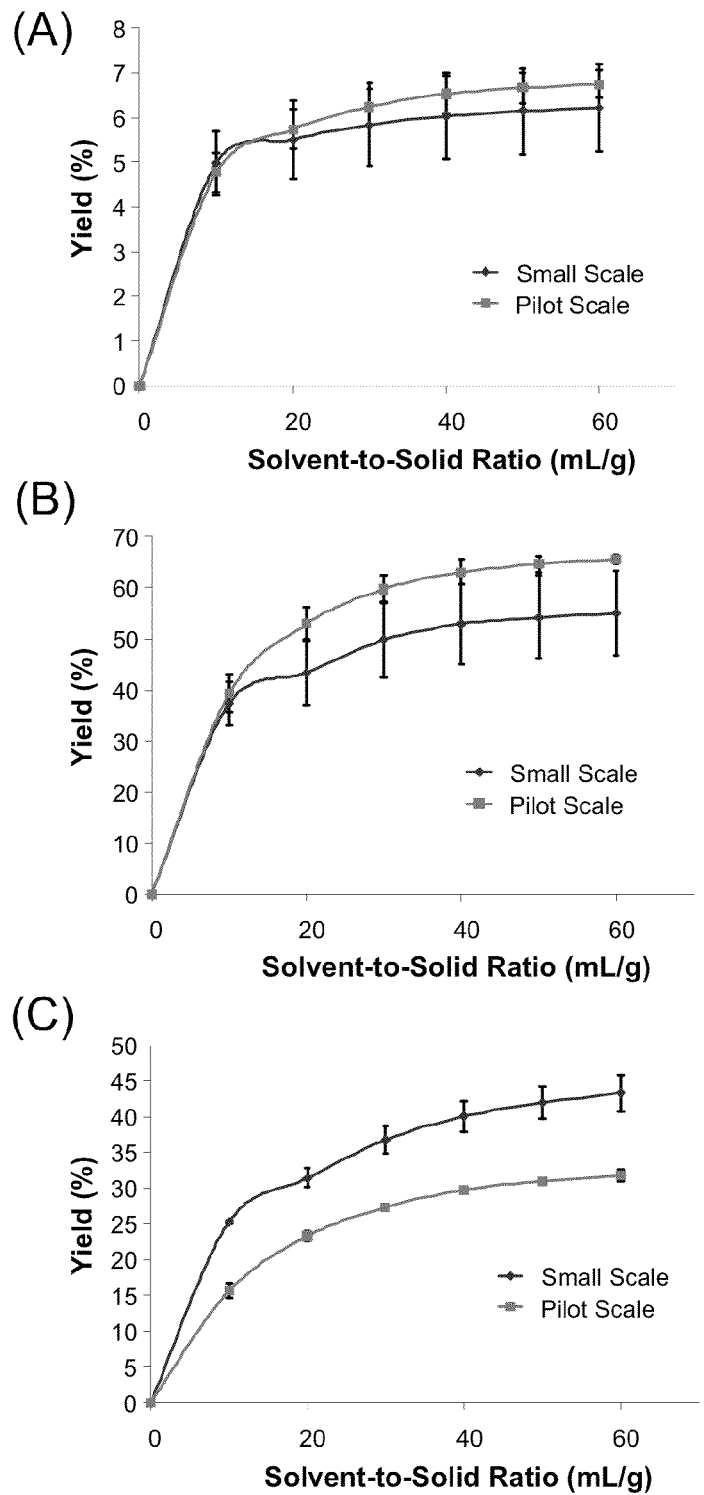
FIGS. 13(A)-13(C) show yields of cellulose (13(A)), hemicelluloses (13(B)), and lignin (13(C)) from PLPW processing using a scale-up reaction column and a pilot-scale reaction column.

There were no differences in yield of glucose due to reaction column scale and the overall yield remained low (FIG. 13(A)). Yield of hemicellulose in the scale-up column was less than from the pilot-scale column although hemicellulose variation in the scale-up column was much larger (FIG. 13(B)). Yields reached 55 and 66% of the potential hemicellulose in the original CPS wheat straw for the scale-up column and the pilotscale column respectively. For almost the first 20% of the hydrothermal treatment, the kinetics of the reaction were equivalent, after which deviation in kinetics and yield began. As discussed above, the residual amount of hemicellulose in the solid residues was the same; hence an equivalent amount of hemicellulose was hydrolysed in both scales of reaction column. The deviation in yields between the different scales was due to degradation of the hemicellulose in the scale-up reaction column. Yield of lignin was very different for the two scales of reaction column (FIG. 13(C)). Overall yield and the initial rate of extraction were much greater for the scale-up reaction column. Lignin yields reached 43 and 32% of the potential lignin in the CPS wheat straw for the scale-up reaction column and the pilot scale reaction column respectively. As with production of lignin, reduced lignin yield in the larger pilot-scale reaction column was the result of the reaction and modification of lignin within the reactor due to increased residence time caused by the scale-up procedures.

In these studies, the successful scale-up of the hydrothermal treatment of CPS wheat straw produced solid residues and liquid fractions which differed only slightly in composition and yield. Most of the differences were in the degree of xylan hydrolysis and amount of lignin extracted. For extraction systems where solubility and mass transfer are the guiding phenomena of the process the key to the scale-up of vessels is the maintenance of equivalent superficial velocity and solvent-to-solid ratio. Hydrothermal treatment of lignocellulosic biomass incorporates aspects of solubility into the process, but is also governed by the kinetics of the chemical reaction. In this experiment the bench scale reaction column produced incomplete hydrolysis of the hemicellulose fractions when compared with the scale-up reaction column and the pilot-scale column. There was incomplete extraction of lignin in the pilot-scale column when compared to the scale-up column, possibly due to lignin precipitation within the reaction column before it was removed. In systems that incorporate aspects of reaction, such as hydrothermal treatment, residence time becomes important. It is imperative during the scaling up of reaction columns, to maintain superficial velocity because internal and external mass transfer plays a secondary role to reaction kinetics, which are dependent on residence time. For the future scale-up of equipment for hydrothermal treatment, the superficial velocity (flow rate) within the column should be adjusted to equalize residence time. Warming the reaction column dry would help to increase the yield of hemicellulose from the straw.

Example 2

PLPW Processing of Concord Grape Pomace

Grape pomace produced from commercial juice processing of Concord grapes during the fall of 2011 was provided by a commercial fruit processing company. Upon receipt of the grape pomace, its moisture content was determined by drying overnight in a forced convection oven (Model 40AF, Quincy Lab Inc., Chicago, Ill., USA) at 75° C. The remainder of the grape pomace was stored in a deep freeze at −20° C. until needed for processing.

Figure 10:
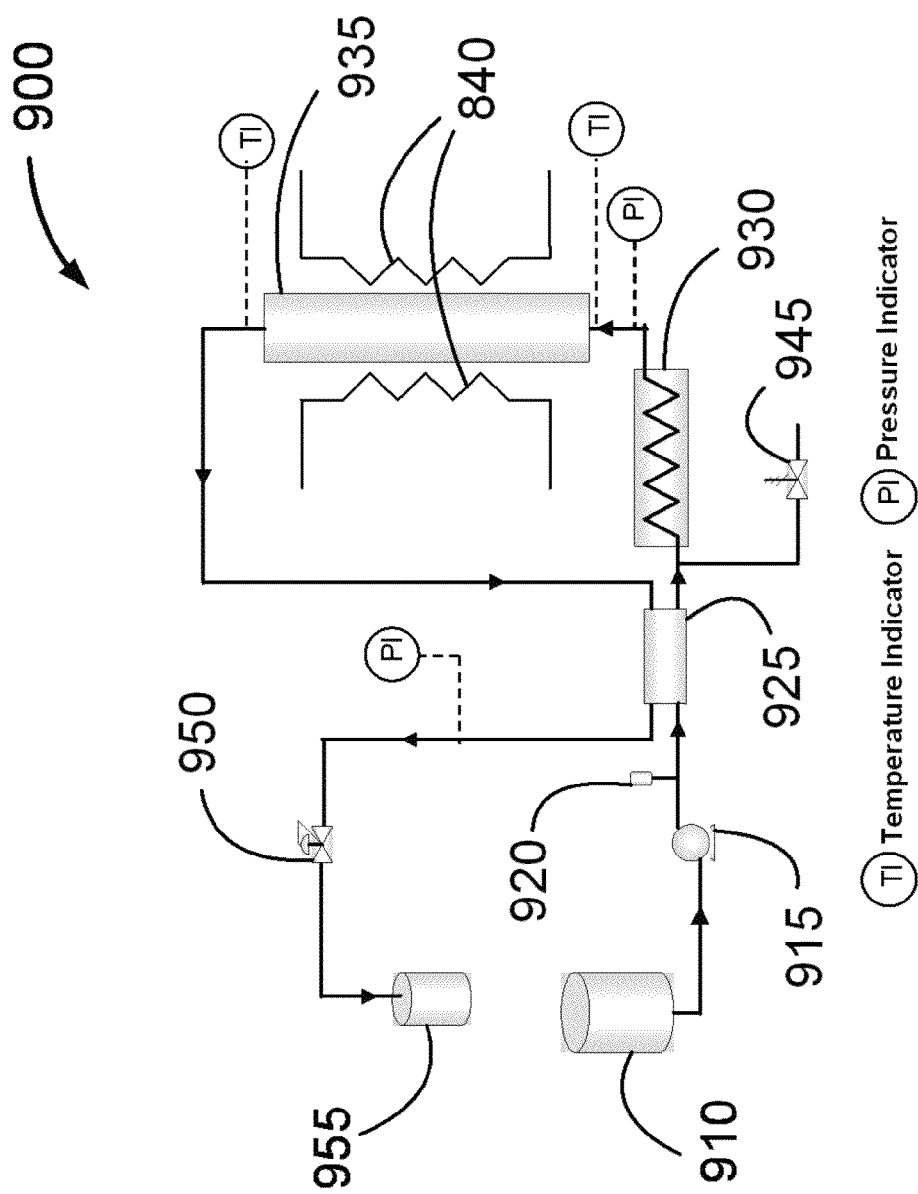
FIG. 10 is a schematic diagram of an exemplary scale-up PLPW system.

Grape pomace was processed with the bench-scale PLPW system (FIG. 9) at five temperatures (85° C., 120° C., 150° C., 175° C.), using a single flow rate of 10 mL/min, and a solvent:solid ratio of 30 mL/g. In addition, a triplicate run was conducted at 120° C. to determine the extent of variability in the extraction process. A total of eight batches of grape pomace were processed with the bench-scale system. The best processing conditions were determined to be 120° C. and 7.5 mL/g solvent:solid ratio, and were used as the operating conditions for processing the grape pomace with the pilot-scale PLPW system (FIG. 10).

Seven batches of grape pomace were processed with the pilot-scale system. Additionally, two batches were processed with a process condition of 22.5 mL/g solvent:solid ratio, plus one more batch and for one run a total of 15 fractions were collected every 5 to 10 minutes to further ascertain the elution of the phenolics and anthocyanins over processing time. A total of nine batches of grape pomace were processed with the pilot-scale system.

Bench-Scale Extractions:

Data collected from the batches processed with the bench-scale system showed there was an increase in extracted dry matter with an increase in processing temperature (Table 7). The dry matter concentration in the liquid extract was more than four times as much at 175° C. than at 85° C. (0.86% vs 0.21% respectively) for the complete run of 30 mL/g. This represented a yield of 23.1% of the available dry matter at 175° C. and 6.2% at 85° C. However, the majority of the dry matter was extracted in the first 7.5 mL/g of the extraction run. Therefore, it is most efficient to only extract for the first 7.5 mL/g whereby the yields are reasonably high and the concentration of product in the liquid extracts is at a maximum level.

Figure 14:
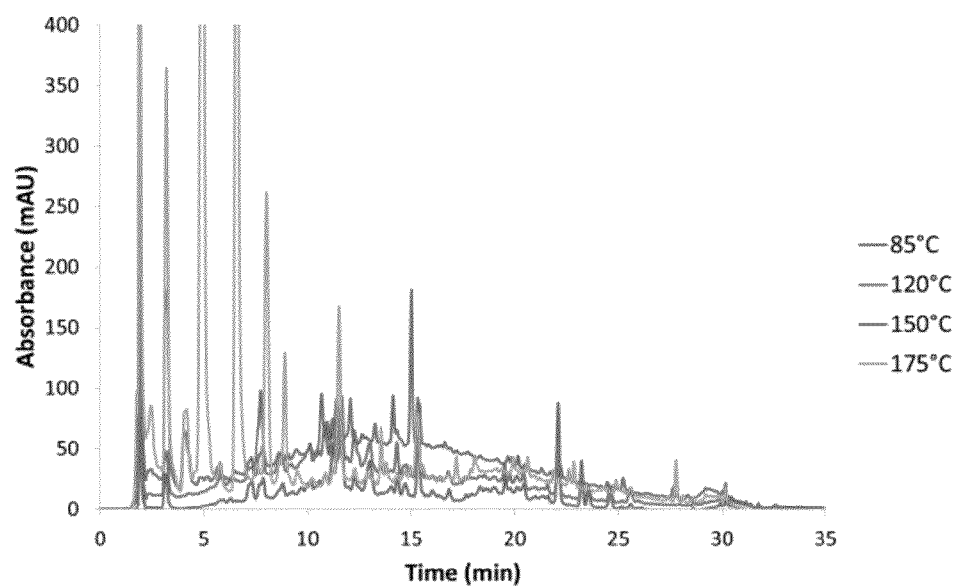
FIGS. 14(A) and 14(B) are chromatograms from processing of Concord grape pomace with the bench-scale PLPW system, at 280 nm (14(A)) and 520 nm (14(B))
Figure 14:
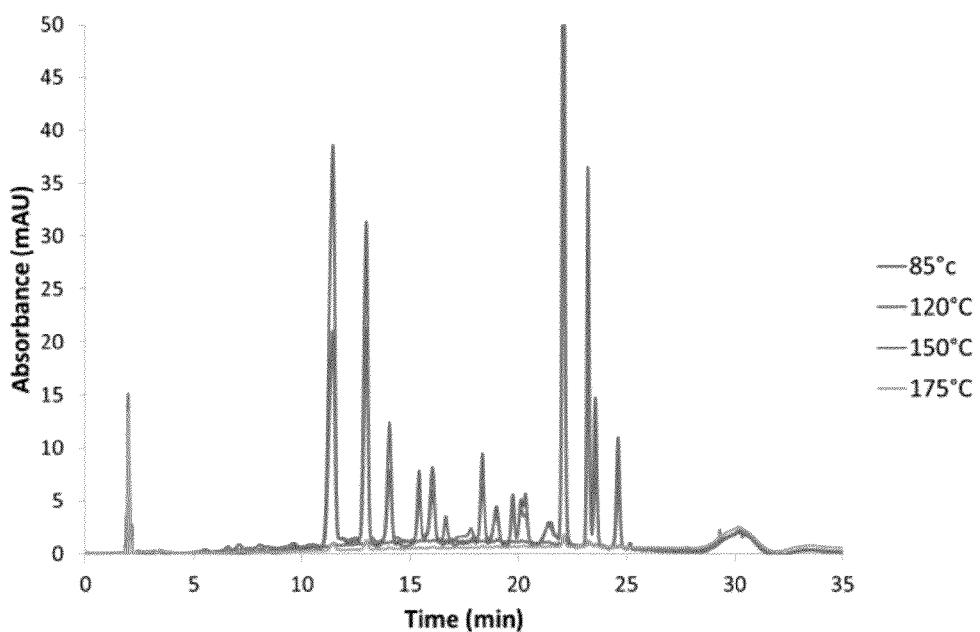
Figure 15A:
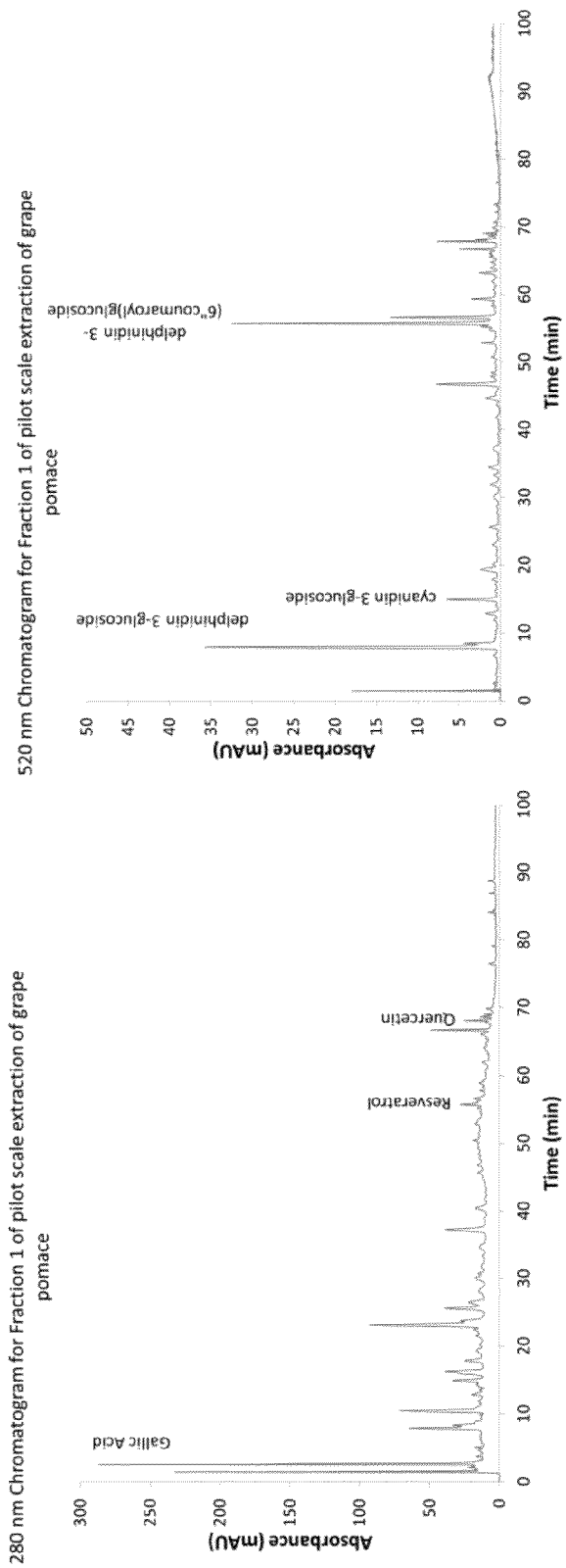
FIG. 15(A) shows a chromatogram at 280 nm (left side) and at 520 nm (right side) from Fraction 1 collected from the "Feb 1st C2 long run" processing Concord grape pomace (refer to Table 12) with the pilot-scale PLPW system.
Figure 15B:
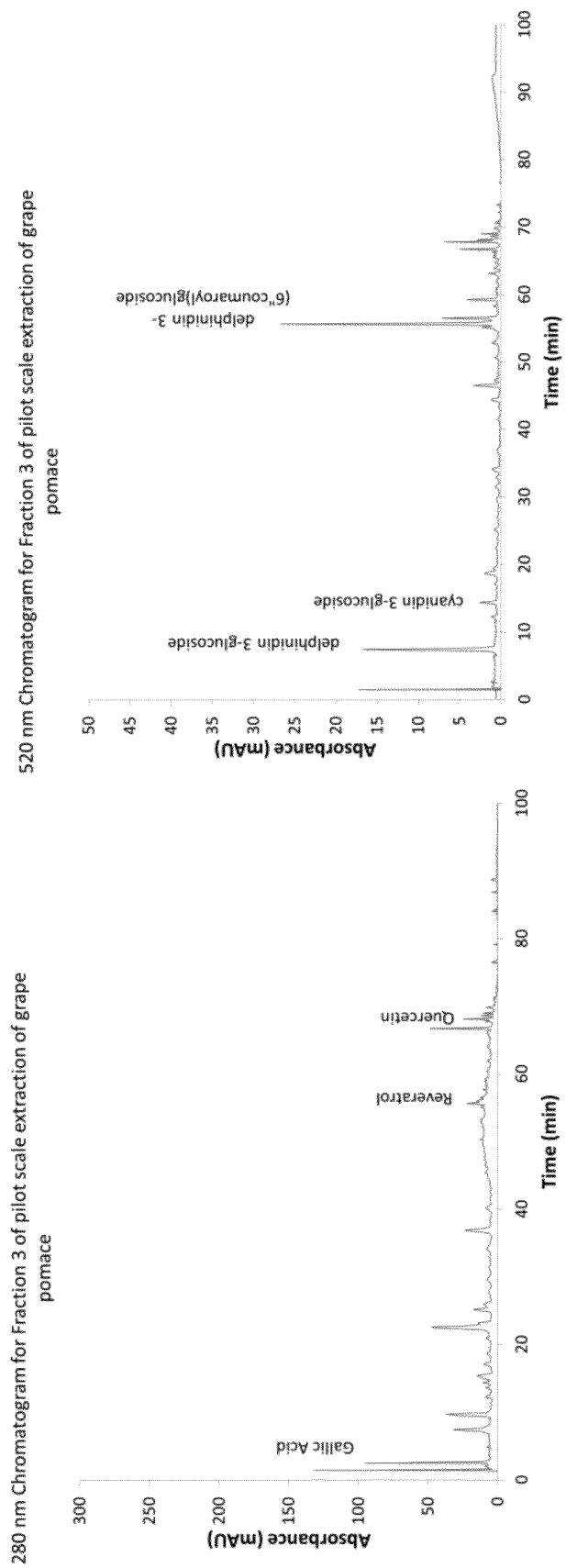
FIG. 15(B) shows a chromatogram at 280 nm (left side) and at 520 nm (right side) from Fraction 3 collected from the "Feb 1st C2 long run" processing Concord grape pomace.
Figure 15C:
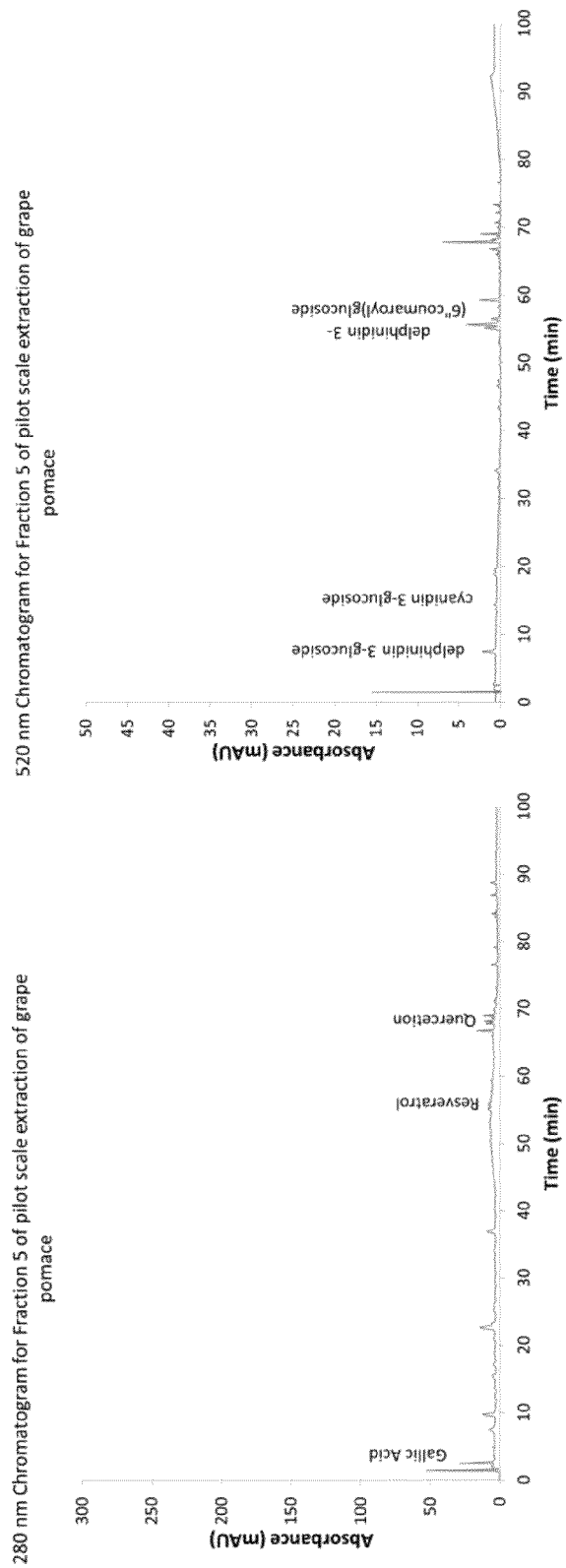
FIG. 15(C) shows a chromatogram at 280 nm (left side) and at 520 nm (right side) from Fraction 5 collected from the "Feb 1st C2 long run" processing Concord grape pomace (refer to Table 12)
Figure 15D:
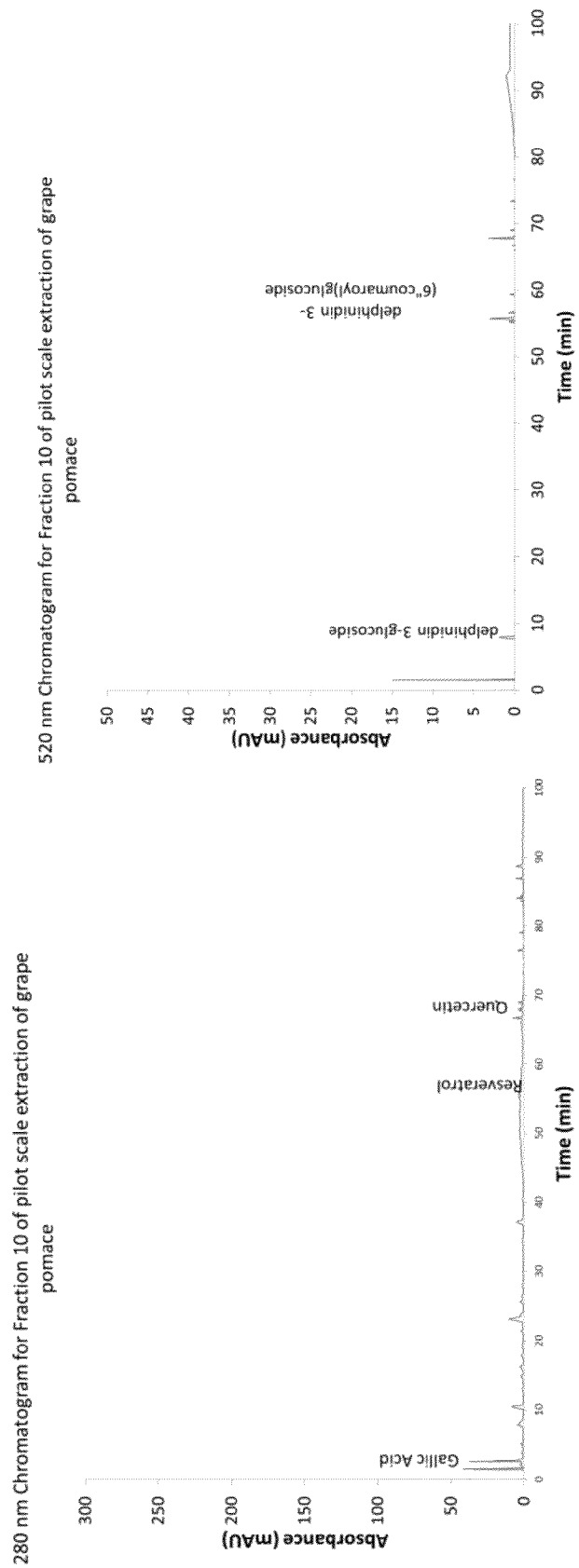
FIG. 15(D) shows a chromatogram at 280 nm (left side) and at 520 nm (right side) from Fraction 10 collected from the "Feb 1st C2 long run" processing Concord grape pomace (refer to Table 12)

At processing temperatures of 150° C. and 175° C., the extracts lost their characteristic purple colour and became noticeably brown with a burnt smell, producing an undesirable product. The phenolic contents of the extracts at 150° C. and 175° C. were high, but the desirable anthocyanins were eliminated from the extracts due to the high temperatures (FIGS. 14(A), 14(B)). For the remaining processing temperatures of 85° C. and 120° C. the maximum yield and total phenolic content was achieved at 120° C. and the maximum yield and anthocyanin content was achieved at 85° C. (Table 11). Overall the best combination of concentration and yield was achieved at 120° C.

From the extractions collected at a processing temperature of 120° C., the concentration of total phenolics in the dried extract for all fractions was 9.05%, representing a yield of 114.6% of the available phenolics in the pomace. Reaction processes of the grape pomace in the PLPW provided more phenolics than were available from the unprocessed pomace. The concentration of anthocyanins in the extract for all fractions from the 120° C. extraction was 0.36%, representing a yield of 19.4%.

TABLE 11

| Run Temp/ Flow / S:S | Fraction | Solvent to Solid Ratio (mL/g) | Extraction Volume (mL) | Dry Matter (g) | Dry Matter Yield (%) | Dry Matter Concentration (%) | Yield of Total Phenolics (wt product/ wt available) (%) |
|---|---|---|---|---|---|---|---|
| 85/10/30 GRP | F1 | 7.5 | 165.00 | 0.97 | 4.78 | 0.654 | 24.67 |
| Oct. 22, 2012 | F2 | 15 | 165.00 | 0.15 | 0.74 | 0.103 | 12.28 |
|  | F3 | 22.5 | 165.00 | 0.08 | 0.39 | 0.054 | 7.86 |
|  | F4 | 30 | 165.00 | 0.06 | 0.28 | 0.039 | 5.48 |
|  | Total |  | 660 | 1.26 | 6.19 | 0.213 | 50.29 |
| 120/10/30 GRP | F1 | 7.5 | 165.00 | 1.90 | 8.66 | 1.145 | 77.58 |
| Dec. 13, 2012 | F2 | 15 | 165.00 | 0.39 | 1.75 | 0.231 | 21.50 |
|  | F3 | 22.5 | 165.00 | 0.23 | 1.05 | 0.138 | 11.34 |
|  | F4 | 30 | 165.00 | 0.19 | 0.86 | 0.114 | 4.18 |
|  | Total |  | 660 | 2.71 | 12.32 | 0.411 | 114.60 |
| 150/10/30 GRP | F1 | 7.5 | 165.00 | 2.63 | 11.95 | 1.597 | 62.71 |
| Dec. 3, 2012 | F2 | 15 | 165.00 | 0.57 | 2.60 | 0.342 | 23.83 |
|  | F3 | 22.5 | 165.00 | 0.43 | 1.95 | 0.258 | 15.02 |
|  | F4 | 30 | 165.00 | 0.33 | 1.50 | 0.198 | 11.34 |
|  | Total |  | 660 | 3.96 | 18.00 | 0.600 | 112.90 |
| 175/10/30 GRP | F1 | 7.5 | 165.00 | 3.13 | 14.24 | 2.138 | 153.28 |
| Nov. 14, 2012 | F2 | 15 | 165.00 | 1.14 | 5.19 | 0.769 | 53.01 |
|  | F3 | 22.5 | 165.00 | 0.48 | 2.20 | 0.329 | 19.93 |
|  | F4 | 30 | 165.00 | 0.32 | 1.48 | 0.220 | 32.17 |
|  | Total |  | 660 | 5.08 | 23.10 | 0.864 | 258.39 |

TABLE 11-continued

| Run Temp/ Flow / S:S | Yield of Tartaric (wt product/wt available) (%) | Yield of Flavonol (wt product/wt available) (%) | Yield of PAC (wt product/wt available) (%) | Phenolic Content of Dried Extract (wt product/wt dry matter) (%) | Tartaric Content of Dried Extract (wt product/wt dry matter) (%) | Flavonol Content of Dried Extract (wt product/wt dry matter) (%) | PAC Content of Dried Extract (wt product/wt dry matter) (%) |
|---|---|---|---|---|---|---|---|
| 85/10/30 GRP Oct. 22, 2012 | 24.47 | 25.56 | 22.55 | 5.03 | 0.96 | 0.63 | 1.08 |
|  | 14.23 | 15.74 | 11.38 | 16.14 | 3.60 | 2.51 | 3.52 |
|  | 6.75 | 7.39 | 5.13 | 19.61 | 3.24 | 2.23 | 3.01 |
|  | 4.89 | 5.35 | 3.38 | 18.74 | 3.22 | 2.21 | 2.71 |
| 120/10/30 GRP Dec. 13, 2012 | 50.36 | 54.04 | 42.44 | 7.91 | 1.52 | 1.03 | 1.57 |
|  | 60.82 | 58.24 | 13.07 | 8.72 | 1.32 | 0.79 | 0.35 |
|  | 15.75 | 15.92 | 3.81 | 11.94 | 1.68 | 1.07 | 0.50 |
|  | 9.02 | 7.39 | 1.48 | 10.53 | 1.61 | 0.83 | 0.32 |
|  | 5.20 | 2.42 | 1.01 | 4.71 | 1.13 | 0.33 | 0.27 |
| 150/10/30 GRP Dec. 3, 2012 | 90.79 | 83.97 | 19.38 | 9.05 | 1.38 | 0.80 | 0.36 |
|  | 84.65 | 46.96 | 12.42 | 5.11 | 1.33 | 0.46 | 0.24 |
|  | 27.25 | 22.56 | 2.73 | 8.93 | 1.96 | 1.02 | 0.24 |
|  | 17.17 | 16.97 | 1.54 | 7.51 | 1.65 | 1.03 | 0.18 |
|  | 14.36 | 14.19 | 1.23 | 7.34 | 1.79 | 1.11 | 0.19 |
| 175/10/30 GRP Nov. 14, 2012 | 143.44 | 100.68 | 17.91 | 6.11 | 1.49 | 0.66 | 0.23 |
|  | 132.55 | 166.55 | 21.50 | 10.48 | 1.74 | 1.38 | 0.35 |
|  | 52.59 | 83.10 | 15.51 | 9.95 | 1.90 | 1.89 | 0.68 |
|  | 22.31 | 35.60 | 6.03 | 8.82 | 1.90 | 1.91 | 0.63 |
|  | 33.76 | 59.45 | 9.52 | 21.21 | 4.28 | 4.75 | 1.48 |
|  | 241.21 | 344.69 | 52.56 | 10.89 | 1.95 | 1.76 | 0.52 |

Pilot-Scale Extractions:

Ten batches of grape pomace were processed with the pilot-scale PLPW system (FIG. 8) at 120° C. to produce 1500 L (400 gal) of extract. Two sets of extractions, the first set being 70 L at maximum extract concentration (7.5 mL/g), the second set being 750 L at maximum yield (22.5 mL/g solvent: solid ratio), were assessed to evaluate the economics of evaporating the liquid extracts.

Results of the pilot-scale PLPW extractions are summarised in Table 12. The average dry matter concentration and yield in the liquid extract at a 7.5 mL/g solvent:solid ratio was 1.0% and 7.6% respectively. The concentration of total phenolics in the dried extract averaged 12.9% and represented a yield of 96.0% of the available phenolics in the grape pomace. The concentration of anthocyanins in the dried extract averaged 1.1% and represented a yield of 33.7% of the available anthocyanins in the grape pomace. One batch produced a lower dry matter content and yield than the other runs because there was some bypassing of the sleeve inside of the column. This was corrected for all future runs. For another batch, the warm up time was reduced from 1 h to 0 h after the jackets were warmed to temperature. There were no changes in dry matter yield or concentration compared to the other runs. The total phenolic yield was slightly lower, but the concentration in the dried extract was the same as the other runs. However, the anthocyanin yield and concentration in the dried extract was 59% and 85% higher respectively. This was probably due to lower degradation of the anthocyanins at the elevated temperature because of the elimination of the warm up phase.

The average dry matter concentration and yield in the liquid extract at a 22.5 mL/g solvent:solid ratio was 0.56% and 12.5% respectively (Table 12). The concentration of total phenolics in the dried extract averaged 11.7% and represented a yield of 108.1% of the available phenolics in the grape pomace. The concentration of anthocyanins in the dried extract averaged 1.07% and represented a yield of 49.9% of the available anthocyanins in the grape pomace. The concentration of total phenolics and anthocyanins in the dried extracts were similar from the short and long runs. However, yields were increased over the extractions at 7.5 mL/g, but at the expense of concentration of dry matter in the liquid extracts.

For the Feb 1st C2 run (ref. Table 12), the yields and concentrations of dry matter, total phenolics, and anthocyanins were greatest in the early stages of the extraction (Table 13). After the 7.5 mL/g sample, it is apparent that the yield of products was vastly diminished in the subsequent fractions (Table 13). Also, there was no shift in the production of compounds being extracted with increase in later fractions (FIGS. 15(A), 15(B), 15(C), 15(D)). Therefore, earlier observations that there is little benefit to extending the extraction beyond a solvent:solid ratio of 7.5 mL/g are correct.

The PLPW extraction of grape pomace at a solvent:solid ratio of 7.5 mL/g yielded 96.0% of the available phenolic compounds at a concentration of 12.9% in the extract and 33.7% of the anthocyanins in the originating materials at a concentration of 1.10% in the extract (Table 12). The batch extraction of grape pomace at a solvent:solid ratio of 12.3 mL/g yielded 62.8% of the available phenolic compounds at a concentration of 8.64% in the extract and 61.4% of the anthocyanins in the originating materials at a concentration of 1.98% in the extract. The PLPW technology obtained 40% more phenolics at 1.5 times the concentration than the batch hot water extraction technique. In addition, the PLPW system used half of the water of the comparable industrial hot water extraction, leading to huge savings on evaporation costs for removal of water to produce a dried extract.

TABLE 13

| Solvent to Solid Ratio (mL/g) | Elution Time (min) | Volume (L) | Dry Matter (g) | Dry Matter Yield (%) | Dry Matter Concentration (%) | Yield of Total Phenolic (wt product/wt available) (%) | Yield of Tartaric (wt product/wt available) (% |
|---|---|---|---|---|---|---|---|
| 1.25 | 5 | 20 | 447.80 | 2.80 | 2.24 | 22.06 | 17.13 |
| 2.5 | 10 | 20 | 320.47 | 2.00 | 1.60 | 22.46 | 16.84 |
| 3.75 | 15 | 20 | 174.13 | 1.09 | 0.87 | 15.99 | 11.38 |
| 5 | 20 | 20 | 117.08 | 0.73 | 0.59 | 12.44 | 6.61 |
| 6.25 | 25 | 20 | 82.59 | 0.52 | 0.41 | 7.64 | 4.43 |
| 7.5 | 30 | 20 | 68.63 | 0.43 | 0.34 | 6.18 | 3.78 |
| 8.75 | 35 | 20 | 54.97 | 0.34 | 0.27 | 4.52 | 2.73 |
| 10 | 40 | 20 | 54.74 | 0.34 | 0.27 | 3.43 | 2.29 |
| 11.25 | 45 | 20 | 72.72 | 0.45 | 0.36 | 5.40 | 3.26 |
| 12.5 | 50 | 20 | 54.16 | 0.34 | 0.27 | 3.75 | 2.28 |
| 13.75 | 55 | 20 | 39.78 | 0.25 | 0.20 | 2.77 | 1.64 |
| 15 | 60 | 20 | 35.24 | 0.22 | 0.18 | 2.30 | 1.48 |
| 17.5 | 70 | 40 | 68.00 | 0.43 | 0.17 | 4.12 | 2.57 |
| 20 | 80 | 40 | 39.78 | 0.25 | 0.10 | 2.63 | 1.60 |
| 22.5 | 90 | 40 | 43.69 | 0.27 | 0.11 | 2.46 | 1.68 |

| Solvent to Solid Ratio (mL/g) | Yield of Flavonol (wt product/wt) available) (%) | Yield of Anthocyanin (wt product/wt available) (%) | Phenolics Content of Dried Extract (wt product/wt dry matter) (%) | Tartaric Content of Dried Extract (wt product/wt dry matter) (%) | Flavonols Content of Dried Extract (wt product/wt dry matter) (%) | Anthocyanins Content of Dried Extract (wt product/wt dry matter) (%) |
|---|---|---|---|---|---|---|
| 1.25 | 13.09 | 5.30 | 9.81 | 1.43 | 0.79 | 0.49 |
| 2.5 | 12.71 | 8.09 | 13.95 | 1.97 | 1.08 | 1.05 |
| 3.75 | 8.06 | 5.01 | 18.28 | 2.45 | 1.26 | 1.20 |
| 5 | 5.28 | 2.93 | 21.14 | 2.11 | 1.23 | 1.04 |
| 6.25 | 3.67 | 1.69 | 18.41 | 2.01 | 1.21 | 0.85 |
| 7.5 | 3.03 | 1.20 | 17.91 | 2.06 | 1.20 | 0.73 |
| 8.75 | 2.27 | 0.84 | 16.36 | 1.86 | 1.12 | 0.63 |
| 10 | 1.95 | 0.73 | 12.47 | 1.57 | 0.97 | 0.55 |
| 11.25 | 2.51 | 0.94 | 14.78 | 1.68 | 0.94 | 0.54 |
| 12.5 | 1.83 | 0.55 | 13.76 | 1.57 | 0.92 | 0.42 |
| 13.75 | 1.45 | 0.41 | 13.86 | 1.54 | 0.99 | 0.43 |
| 15 | 1.41 | 0.00 | 12.98 | 1.58 | 1.09 | 0.00 |
| 17.5 | 2.44 | 0.01 | 12.06 | 1.41 | 0.98 | 0.00 |
| 20 | 1.58 | 0.01 | 13.15 | 1.51 | 1.08 | 0.01 |
| 22.5 | 1.75 | 0.01 | 11.22 | 1.44 | 1.09 | 0.01 |

TABLE 12

| Run | Solvent to Solid Ratio (mL/g) | Volume (L) | Dry Matter (g) | Dry Matter Yield (%) | Dry Matter Concentration (%) | Yield of Total Phenolic (wt product/wt available) (%) | Yield of Tartaric (wt product/wt available) (% |
|---|---|---|---|---|---|---|---|
| Jan. 28th, C1 | 7.5 | 120 | 1305 | 8.16 | 1.09 | 90.35 | 46.68 |
| Jan. 28th, C2 | 7.5 | 120 | 912 | 5.70 | 0.76 | 42.03 | 29.73 |
| Jan. 29 C1 | 7.5 | 120 | 1251 | 7.82 | 1.02 | 120.54 | N/D |
| Jan. 29th, C2 | 7.5 | 120 | 1392 | 8.70 | 1.15 | 128.38 | 78.04 |
| Jan. 30th, C2 | 7.5 | 120 | 1246 | 7.79 | 1.03 | 125.45 | 76.77 |
| Feb. 4th, C2 | 7.5 | 120 | 1223 | 7.65 | 1.01 | 86.91 | 52.22 |
| Feb. 5th, C2 | 7.5 | 120 | 1250 | 7.81 | 1.04 | 79.62 | 63.28 |
| Feb. ft, C2 | 22.5 | 360 | 1738 | 10.86 | 0.48 | 110.57 | 64.80 |
| Feb. ft, C1 | 22.5 | 360 | 2277 | 14.23 | 0.63 | 105.56 | 69.33 |
| 85° C Batch Extraction | 12.3 | 0.14 | 0.71 | 6.28 | 0.51 | 62.83 | 47.38 |

| Run | Yield of Flavonol (wt product/wt available) (%) | Yield of Anthocyanin (wt product/wt available) (%) | Phenolics Content of Dried Extract (wt product/wt dry matter) (%) | Tartaric Esters Content of Dried Extract (wt product/wt dry matter) (%) | Flavonols Content of Dried Extract (wt product/wt dry matter) (%) | Anthocyanins Content of Dried Extract (wt product/wt dry matter) (%) |
|---|---|---|---|---|---|---|
| Jan. 28th, C1 | 39.91 | 26.05 | 15.39 | 1.44 | 0.78 | 1.03 |
| Jan. 28th, C2 | 25.19 | 19.46 | 10.25 | 1.31 | 0.71 | 1.11 |
| Jan. 29 C1 | N/D | N/D | 13.32 | N/D | N/D | N/D |
| Jan. 29th, C2 | 60.00 | 37.68 | 12.75 | 1.57 | 0.86 | 0.88 |
| Jan. 30th, C2 | 59.22 | 37.64 | 13.91 | 1.73 | 0.95 | 0.98 |
| Feb. 4th, C2 | 46.44 | 29.24 | 11.07 | 1.28 | 0.72 | 0.88 |
| Feb. 5th, C2 | 48.86 | 51.67 | 13.68 | 1.80 | 0.96 | 1.74 |
| Feb. ft, C2 | 72.09 | 39.73 | 14.16 | 1.50 | 1.06 | 1.19 |

TABLE 12-continued

| | | | | | | |
|---|---|---|---|---|---|---|
| Feb. ft, C1 | 67.54 | 52.03 | 9.23 | 1.14 | 0.81 | 0.95 |
| 85° C Batch Extraction | 59.60 | 61.42 | 8.64 | 1.32 | 1.19 | 1.98 |

Effects of Scale:

The bench-scale PLPW system (FIG. 9) was scaled up by increasing the column diameter from 2.2 cm to 20.3 cm (FIG. 8). The rest of the column and extraction system parameters were appropriately scaled up on the basis of a 9 times scale-up while keeping the sample bulk density and residence times equal for both extractors (Table 14).

The majority of all dry matter and polyphenols were extracted in the first 30% (7.5 mL/g solvent:solid ratio) of the extraction, representing 76% and 72% of the total dry matter in the bench and pilot scale systems respectively (Table 15). At the same time there was a concentration of phenolics in the extracted dry matter. The original Concord grape pomace had a total phenolic content of 0.94% and this was concentrated to between 8.98 and 14.26% in the dried extracts from the bench and pilot-scale systems (Table 15).

There were no significant differences ($p \geq 0.05$) in the amount of material that was extracted from the bench-scale or pilot-scale systems. In theory, if a unit is properly scaled, there should not be a difference in extraction due to reactor size. However, with PLPW extraction, not only are solubilization and extraction phenomena occurring, there are also chemical reactions occurring related to temperature and time, that combine to break down the biomass in the PLPW systems. As such, there were significant differences ($p \leq 0.05$) in the total phenolic concentration of the liquid extracts related to scale. Tartaric esters and flavonol concentrations were not different ($p \geq 0.05$), but there was a significant difference ($p \leq 0.05$) in the anthocyanin concentration from the different PLPW extraction systems. The pilot-scale PLPW system produced twice the amount of anthocyanins as did the bench-scale PLPW system. This was probably due to the differences

TABLE 14

| Characteristic | Bench Scale | Pilot Scale | Pilot with sleeve |
|---|---|---|---|
| Inner Diameter | 2.2 cm | 20.3 cm | 19.5 cm |
| Length | 22 cm | 203 cm | 203 cm |
| Column Volume | 83.6 cm$^3$ | 65701 cm$^3$ | 60625 cm$^3$ |
| Sample Mass (dry matter) | 22.09 g | 17303 g | 16000 g |
| Bed Depth | 17.6 cm | 162 cm | 162 cm |
| Sample Volume | 66.9 cm$^3$ | 52400 cm$^3$ | 48380 cm$^3$ |
| Sample Bulk Density | 0.33 g/cm$^3$ | 0.33 g/cm$^3$ | 0.33 g/cm$^3$ |
| Length to Diameter Ratio[b] | 8:1 | 8:1 | 8.3:1 |
| Solvent-to-Solid Ratio | 30 mL/g | 30 mL/g | 30 mL/g |
| Volume Collected | 662.7 mL | 519077 mL | 480000 mL |
| Flow Rate | 10.3 mL/min | 8059 mL/min | 8000 mL/min |
| Superficial Velocity | 2.71 cm/min | 24.9 cm/min | 24.9 cm/min |
| Residence Time | 6.5 min | 6.5 min | 6.5 min |
| Extraction Time | 64.3 min | 64.3 min | 64.3 min |

[b]Where length is the bed depth
Residence time = bed depth/superficial velocity
Extraction Time = volume collected/flow rate

TABLE 15

| | Solvent to Solid Ratio (mL/g) | Elution Time (min) | Volume (L) | Dry Matter (g) | Dry Matter Yield (%) | Dry Matter Concentration (%) | Yield of Total Phenolic (wt product/wt available) (%) | Yield of Tartaric (wt product/wt available) (% |
|---|---|---|---|---|---|---|---|---|
| Pilot Scale | 7.5 | 30 | 120 | 1210.71 | 7.57 | 1.01 | 86.76 | 60.17 |
| | 15 | 60 | 120 | 311.60 | 1.95 | 0.26 | 22.16 | 13.69 |
| | 22.5 | 90 | 120 | 151.48 | 0.95 | 0.13 | 9.21 | 5.85 |
| Bench Scale | 7.5 | 16.5 | 0.165 | 1.95 | 8.85 | 1.18 | 63.75 | 50.07 |
| | 15 | 16.5 | 0.165 | 0.38 | 1.73 | 0.23 | 17.15 | 14.44 |
| | 22.5 | 16.5 | 0.165 | 0.23 | 1.03 | 0.14 | 9.79 | 7.88 |

| | Yield of Flavonol (wt product/wt) available) (%) | Yield of Anthocyanin (wt product/wt available) (%) | Phenolics Content of Dried Extract (wt product/wt dry matter) (%) | Tartaric Esters Content of Dried Extract (wt product/wt dry matter) (%) | Flavonols Content of Dried Extract (wt product/wt dry matter) (%) | Anthocyanins Content of Dried Extract (wt product/wt dry matter) (%) |
|---|---|---|---|---|---|---|
| Pilot Scale | 45.82 | 24.21 | 14.26 | 1.86 | 1.03 | 0.83 |
| | 11.41 | 3.46 | 14.16 | 1.64 | 1.00 | 0.46 |
| | 5.78 | 0.02 | 12.10 | 1.45 | 1.04 | 0.00 |
| Bench Scale | 42.43 | 12.98 | 8.98 | 1.31 | 0.81 | 0.38 |
| | 10.61 | 2.95 | 12.41 | 1.94 | 1.03 | 0.44 |
| | 5.70 | 1.34 | 11.84 | 1.77 | 0.93 | 0.34 | in the sizes of the reaction columns and the warm-up procedures. In the bench-scale PLPW system, the column was flooded with warm water and the column was warmed in the oven for a period of 45 min to ensure the feedstock and column were at the extraction temperature. In the pilot-scale PLPW system, the column was flooded with warm water and the jackets were brought up to the extraction temperature, then the system was allowed to warm up for 60 min.

Even though the warming time was longer in the pilot-scale PLPW system due to the larger diameter of the column, it took longer for the material at the center of the column to warm. Therefore, the material at the centre of the pilot-scale column warmed much more slowly, and to a lesser degree than the material in the much smaller bench-scale column. Anthocyanins are known to be sensitive to temperature (Mazza and E. Miniata (Eds.), 1993, *Anthocyanins in Fruits, Vegetables, and Grains*; p. 1-362, IN G. Mazza and E. Miniata (Eds.), CRC Press: Boca Raton, Fla., p. 1-362), and therefore, they are more likely to break down and disappear in the bench-scale column due to the residence time at high temperatures.

Example 3

PLPW Processing of Cranberry Pomace

Cranberry pomace produced from commercial juice processing during the fall of 2012 was provided by a commercial fruit processing company. Upon receipt of the cranberry pomace, its moisture content was determined by drying overnight in a forced convection oven (Model 40AF, Quincy Lab Inc., Chicago, Ill.) at 75° C. The remainder of the cranberry pomace was stored in a deep freeze at −20° C. until needed for processing.

Cranberry pomace was processed with the bench-scale PLPW system (FIG. 9) at six extraction temperatures (85° C., 110° C., 120° C., 130° C., 140° C., 150° C.). The most efficient solvent:solid ratio determined for Concord grape pomace in Example 2 was determined to 7.5 mL/g, and therefore, the same solvent:solid ratio was used for the cranberry pomace extraction. The warm-up time was set at 15 min to prevent breakdown and loss of phytochemicals in the extract.

Previous studies with other types of biomass feedstocks using the pilot-scale system (FIG. 8) designed to maintain a residence time in the pilot-scale reactor column equivalent to the residence time in the bench-scale reactor column (bench-scale flow rate of 10 L/min), the flow rate in the pilot-scale reactor column of 8 mL/min was great enough that the biomass resistance to flow due to the depth of the cranberry pomace in the column was sufficient to cause the bed to collapse, thereby causing the column to plug. It was found that plugging was not an issue if the flow rate was reduced to 4 L/min in the pilot-scale PLPW system, which corresponds to a flow rate of 5 mL/min in the bench-scale system. To determine the effects of flow rate on the extraction process, two flow rates of 5 mL/min and 10 mL/min were run at 85° C. and 120° C. on the bench system.

Several test runs through the pilot-scale PLPW system (FIG. 8) determined that the best extraction temperature was 120° C. Due to the high dry matter concentration in the liquid extracts from the bench scale runs, the solvent:solid ratio was increased to 8.5 mL/g on the pilot system. Subsequently, seven batches of cranberry pomace were processed with the pilot-scale PLPW system.

A modified version of the method taught by Glories (1978, *Reserches sur la matière colorante des vins rouges*. These de Doctorate es Sciences, Universite de Bordeaux) was used to measure the phenolic contents of the cranberry pomace and dried extracts were determined as follows. Samples were diluted 2-fold with 3% formic acid in methanol and then diluted between 5 and 50 fold with 50% dilute acidified methanol (50% MeOH, 1.5% Formic Acid, 48.5% water).

Each solution was vortexed and allowed to sit for approximately 15 min before reading its absorbance at 280 nm, 320 nm, 360 nm, and 520 nm with a spectrophotometer (DU-65, Beckman Instruments Inc., Fullerton, Calif.). The absorbance (A) at 280 nm was used to estimate total phenolic content, A320 nm was used to estimate tartaric esters, A360 nm was used to estimate flavonols, and A520 nm was used to estimate anthocyanins. Standards used were gallic acid for total phenolics, caffeic acid for tartaric esters, quercetin for flavonols, and kuromanin chloride for anthocyanins. All standards were made up in dilute acidified methanol. All standards were obtained from Sigma-Aldrich (Oakville, ON).

The acid butanol assay was used for the determination of proanthocyanidin contents in raw cranberry pomace and dried extracts as taught by Porter et al. (1985, *The conversion of procyanidins and prodelphinidins to cyanidin and delphinidin*. Phytochem. 25:223-230). Samples of powdered extract were dissolved in 30 mL of 70% methanol. To this were added 15 mL of concentrated HCL and 10 mL of water. Each solution was refluxed for 80 mL, then cooled and diluted to 250 mL with 70% methanol. 50 mL of the solution was evaporated in a rotary evaporator (Rotovapor-R, Büchi, Switzerland) to approximately 3 mL and the contents transferred to a separating funnel and the flask rinsed with water and added to the funnel. Butanol was added to the separating funnel and the contents shaken to separate the organic layers. The proanthocyanidin fractions were collected and adjusted to 100 mL with butanol. The absorbance at 545 nm was measured with a spectrophotometer (DU-65, Beckman Instruments Inc., Fullerton, Calif.) and the proanthocyanidin content expressed as cyaniding chloride.

The moisture content of the cranberry pomace was greater than the grape pomace (64% vs 46% respectively). The elevated moisture content made it difficult to pack as much cranberry pomace material into the columns, resulting in lower volumes of extract produced per run when compared to grape pomace. There were no problems in running the cranberry pomace samples through the bench-scale PLPW system. However, the cranberry pomace was more prone to plugging than the grape pomace in the pilot-scale PLPW system, so the flow rates had to be closely monitored.

Bench-Scale Extractions:

Flow rates had significant effects on the processing of cranberry pomace (Table 16). Dry matter and proanthocyanidin yields and concentrations were both lower at the higher flow rate of 10 mL/min compared to the 5 mL/min flow rate. However, total phenolic yields and concentrations were lower at a flow rate of 5 mL/min. By changing the flow rate in the system, the residence time of the extract in the column was also affected. At the 5 mL/min flow rate, the residence time was doubled over a flow rate of 10 mL/min. An increase in residence time allows for increased time for reactions to occur within the PLPW in the column before the extract exits and is cooled. In the case of proanthocyanidins, the increased residence time will allow the larger insoluble oligomeric and polymeric molecules to break down into smaller more soluble forms. However, longer residence times will allow other heat sensitive phenolics to break down. Thus, proanthocyanidin yield can increase at the lower flow rate, while the total phenolic yield can decrease due to degradation reactions.

There was an increase in extracted dry matter with an increase in processing temperature in the bench-scale PLPW system (Table 11). The dry matter concentration in the liquid extract was more than two times as much at 150° C. than at 85° C. (2.00% vs 0.78% respectively). This represents yields of 15.38% of the available dry matter at 150° C. and 5.88% at 85° C.

Figure 16:
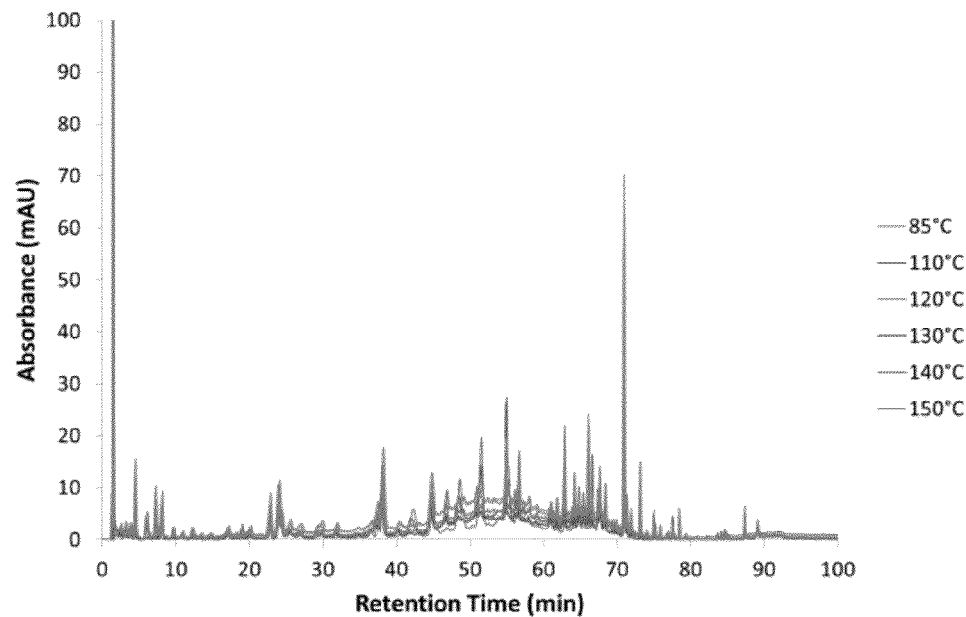
FIGS. 16(A) and 16(B) are chromatograms from processing of cranberry pomace with the bench-scale PLPW system, at 280 nm (16(A)) and 520 nm (16(B))
Figure 16:
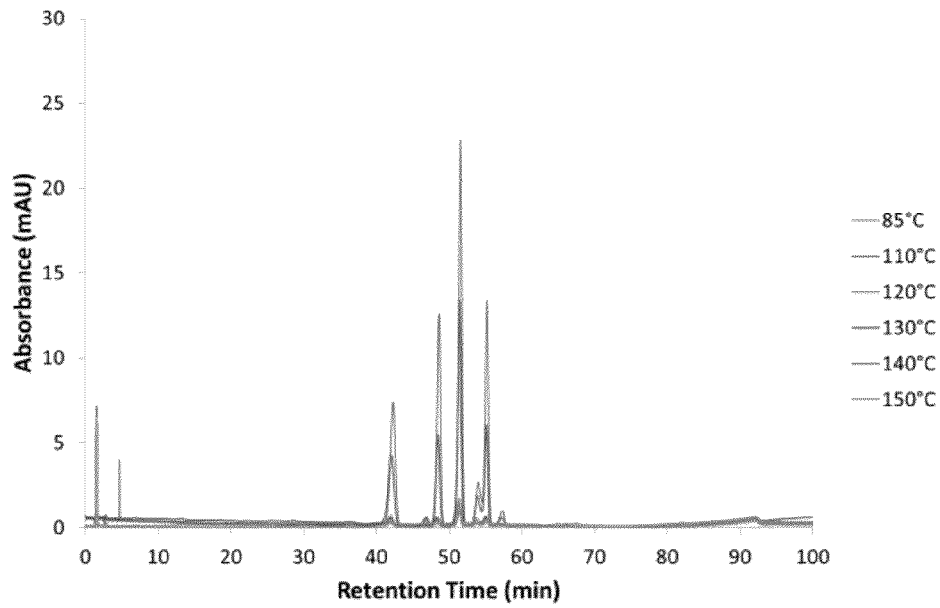
Figure 17:
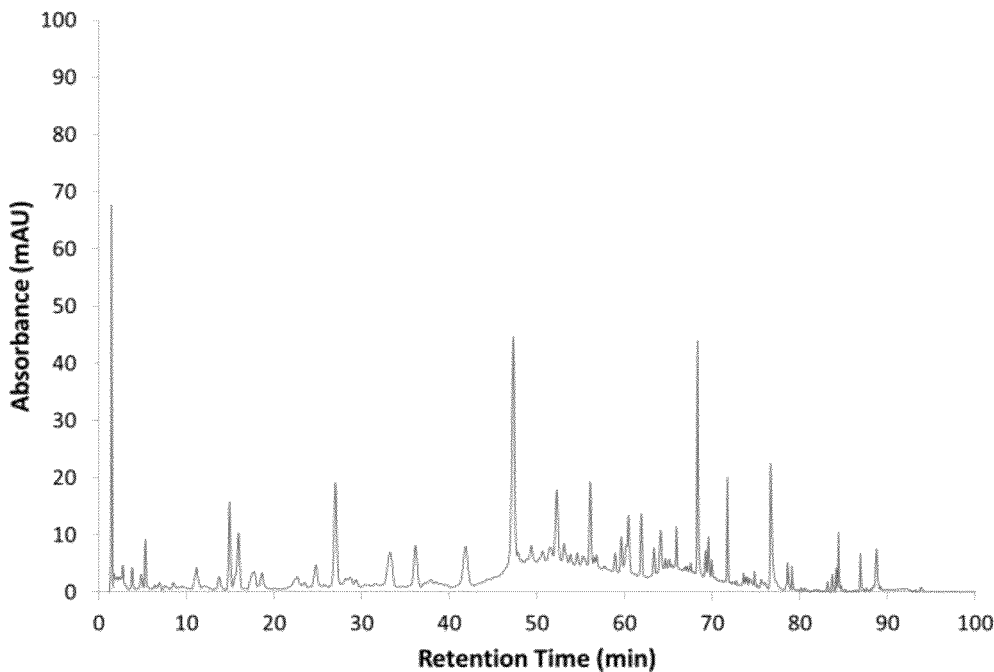
FIGS. 17(A) and 17(B) are chromatograms from processing of cranberry pomace with the pilot-scale PLPW system 280 nm (16(A)) and 520 nm (16(B))
Figure 17:
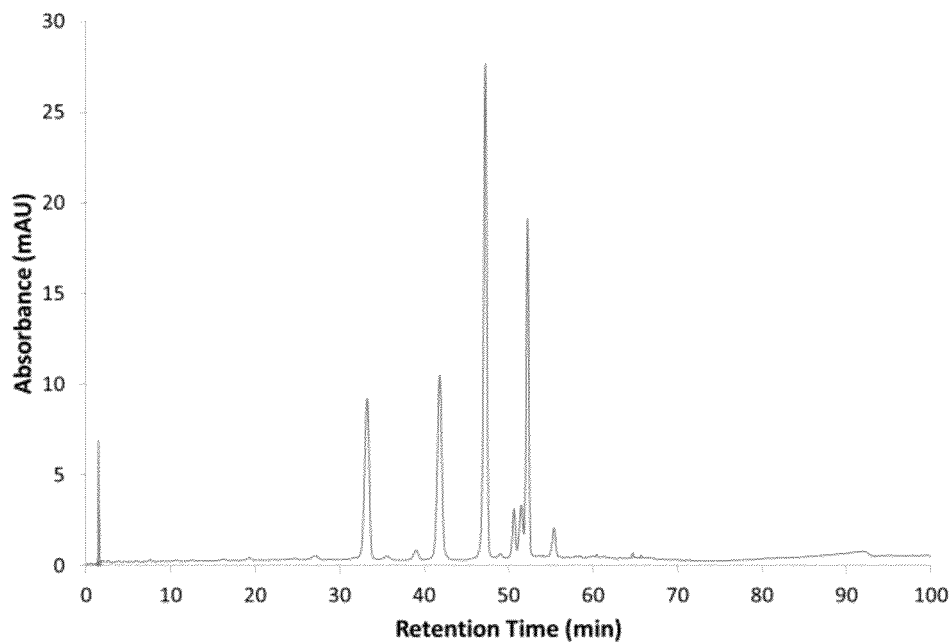

Results indicated that increasing the flow rate from 5 mL/min to 10 mL/min reduced the yield of dry matter and proanthocyanidins by 10 to 20%. The phenolic concentration of the extracts was highest at 120° C. and 130° C. (Table 16), but the desirable anthocyanins were eliminated from the extracts at temperatures above 110° C. (FIGS. 16(A), 16(B)). Total phenolic yields above 100% were due to reaction processes of the cranberry pomace in the PLPW, which provided more phenolics that were available from the unprocessed pomace. The maximum concentration of proanthocyanidins in the dried extract was at a processing temperature of 120° C. The concentration of proanthocyanidins in the dried extract at 120° C. was 2.88%, representing a yield of 31.55% of the available proanthocyanidins in the cranberry pomace. Overall, the best combination of concentration and yield of phenolics and proanthocyanidins was achieved at a processing temperature of 120° C.

purposes. The average dry matter concentration in the liquid extract was 1.26%, yielding 10.9% of the available dry matter, which was the same as the bench-scale system (1.21% and 9.2% concentration and yield respectively). The extracts from the pilot-scale PLPW system were of better quality than those recovered with the bench-scale PLPW system. Chromatograms at 520 nm from the bench-scale PLPW system show that anthocyanins were largely eliminated from the dried extracts at temperatures above 110° C. (FIGS. 17(A), 17(B)). The pilot-scale PLPW system run at 120° C. produced dried extracts with anthocyanin contents similar to the bench-scale PLPW system at 85° C. and 110° C. The concentration of proanthocyanidins in the dried extract from the pilot-scale PLPW system averaged 3.50% and represented a yield of

TABLE 16

| Run Temp/ Flow / S:S | Solvent to Solid Ratio (mL/g) | Extraction Volume (mL) | Dry Matter (g) | Dry Matter Yield (%) | Dry Matter Concentration (%) | Yield of Total Phenolics (wt product/wt available) (%) | Yield of Tartaric (wt product/wt available) (%) |
|---|---|---|---|---|---|---|---|
| 85/10/30 | 7.5 | 130 | 0.81 | 4.69 | 0.62 | 86.94 | 53.82 |
| 120/10/30 | 7.5 | 130 | 1.44 | 8.33 | 1.10 | 161.12 | 39.93 |
| 85/5/30 | 7.5 | 130 | 1.02 | 5.88 | 0.78 | 68.13 | 49.91 |
| 110/5/30 | 7.5 | 130 | 1.50 | 8.68 | 1.14 | 103.51 | 71.76 |
| 120/5/30 | 7.5 | 130 | 1.59 | 9.20 | 1.21 | 133.63 | 91.44 |
| 130/5/30 | 7.5 | 130 | 1.96 | 11.34 | 1.49 | 156.07 | 109.19 |
| 140/5/30 | 7.5 | 130 | 2.22 | 12.85 | 1.68 | 151.43 | 106.72 |
| 150/5/30 | 7.5 | 130 | 2.66 | 15.38 | 2.00 | 172.84 | 114.54 |
| Batch | 22 | 206 | 1.27 | 13.53 | 0.59 | 110.27 | 77.18 |

| Run Temp/ Flow / S:S | Yield of Flavonol (wt product/wt available) (%) | Yield of PAC (wt product/wt available) (%) | Phenolic Content of Dried Extract (wt product/wt dry matter) (%) | Tartaric Content of Dried Extract (wt product/wt dry matter) (%) | Flavonol Content of Dried Extract (wt product/wt dry matter) (%) | PAC Content of Dried Extract (wt product/wt dry matter) (%) |
|---|---|---|---|---|---|---|
| 85/10/30 | 38.97 | 19.42 | 7.10 | 1.00 | 1.09 | 3.48 |
| 120/10/30 | 30.09 | 26.29 | 8.50 | 0.48 | 0.54 | 2.65 |
| 85/5/30 | 38.55 | 21.84 | 5.10 | 0.85 | 0.98 | 3.12 |
| 110/5/30 | 51.70 | 27.59 | 5.20 | 0.83 | 0.89 | 2.67 |
| 120/5/30 | 65.97 | 31.55 | 6.39 | 1.00 | 1.08 | 2.88 |
| 130/5/30 | 71.49 | 33.35 | 6.05 | 0.96 | 0.95 | 2.47 |
| 140/5/30 | 71.15 | 31.35 | 4.50 | 0.72 | 0.72 | 2.05 |
| 150/5/30 | 75.39 | 43.38 | 4.95 | 0.75 | 0.74 | 2.37 |
| Batch | 62.9 | 19.49 | 3.57 | 0.57 | 0.70 | 1.21 |

Pilot-Scale Extractions:

Seven batches of cranberry pomace were processed with the pilot-scale PLPW system (FIG. 8) using optimized conditions to produce 630 L of extract (Table 17). Overall the variability between runs on the large system was low except for Run 3. There was a problem with the flow bypassing the sleeve in Run 3, but the results are shown for comparison 45.5% of the available proanthocyanidins in the cranberry pomace, which was significantly better that recovered with the bench-scale PLPW system that had a concentration and yield of proanthocyanidins of 2.88% and 31.55%, respectively (Table 16). Total phenolic contents and yields were similar for the two systems.

TABLE 17

| Run | Solvent to Solid Ratio (mL/g) | Extraction Volume (L) | Dry Matter (kg) | Dry Matter Yield (%) | Dry Matter Concentration (%) | Yield of Total Phenolics (wt product/wt available) (%) | Yield of Tartaric (wt product/wt available) (%) |
|---|---|---|---|---|---|---|---|
| Run 1 | 8.5 | 92 | 1.15 | 10.75 | 1.25 | 149.6 | 103.0 |
| Run 2 | 8.5 | 93 | 1.16 | 10.90 | 1.26 | 127.9 | 84.1 |
| Run 3 | 8.5 | 93 | 0.85 | 7.98 | 0.92 | 95.4 | 65.6 |
| Run 4 | 8.5 | 93 | 1.12 | 10.48 | 1.21 | 123.7 | 88.7 |
| Run 5 | 8.5 | 93 | 1.12 | 10.47 | 1.21 | 130.0 | 84.6 |
| Run 6 | 8.5 | 93 | 1.39 | 13.01 | 1.49 | 147.2 | 98.8 |
| Run 7 | 8.5 | 93 | 1.34 | 12.61 | 1.46 | 145.3 | 98.6 |

TABLE 17-continued

| Run | Yield of Flavonol (wt product/wt available) (%) | Yield of PAC (wt product/wt available) (%) | Phenolic Content of Dried Extract (wt product/wt dry matter) (%) | Tartaric Content of Dried Extract (wt product/wt dry matter) (%) | Flavonol Content of Dried Extract (wt product/wt dry matter) (%) | PAC Content of Dried Extract (wt product/wt dry matter) (%) |
|---|---|---|---|---|---|---|
| Run 1 | 83.0 | 41.6 | 6.1 | 1.0 | 1.2 | 3.25 |
| Run 2 | 61.0 | 47.8 | 5.2 | 0.8 | 0.9 | 3.68 |
| Run 3 | 48.8 | 36.1 | 3.8 | 0.6 | 0.7 | 3.80 |
| Run 4 | 60.8 | 38.8 | 3.1 | 0.8 | 0.8 | 3.11 |
| Run 5 | 62.1 | 48.1 | 5.3 | 0.8 | 0.9 | 3.86 |
| Run 6 | 70.9 | 49.1 | 6.0 | 0.9 | 1.0 | 3.17 |
| Run 7 | 67.6 | 57.1 | 5.9 | 0.9 | 0.9 | 3.80 |

Pilot-scale PLPW extraction of cranberry pomace yielded 45.5% of the available proanthocyanidins at a concentration of 3.50% in the extract (Table 17). Batch hot-water extraction only yielded 19.5% of the available proanthocyanidins at a concentration of 1.21% in the dried extract (Table 16). The PLPW technology obtained 133% more proanthocyanidins at almost three times the concentration in the dried extract than the batch hot water extraction technique. In addition, the pilot-scale PLPW system would use less than half of the water of the batch hot water extraction to process an equivalent amount of pomace. It is expensive to remove water from the extracts and the process represents one of the largest costs associated with the production of dried extracts. This reduction in water consumption with the PLPW extraction technology would represent a large cost savings to industry when trying to produce a dried extract.

A lower flow rate and increased residence time was beneficial for the extraction of proanthocyanidins from the cranberry pomace. The maximum yield and concentration of proanthocyanidins occurred at a temperature of 120° C. with a more concentrated liquid extract than the previous work done with Concord grape pomace. Therefore, the pilot-scale PLPW system was operated at a temperature of 120° C., flow rate of 4 L/min (5 mL/min equivalent on the bench system) and a longer solvent:solid ratio of 8.5 mL/g.

Example 4

PLPW Processing of Hemp Meal

Coarse ground hemp meal was supplied by a commercial producer of hemp oil. Samples were ground into a uniform powder with larger particle size. Moisture content of the hemp meal was determined by drying overnight in a forced convection oven (Model 40AF, Quincy Lab Inc., Chicago, Ill.) at 75° C. The rest of the hemp meal was stored in a deep freeze at −20° C. until needed for testing.

Two extraction runs were done with the bench-scale PLPW system (FIG. 9). Subsequently, two additional runs were conducted under different sets of conditions. In both cases the bench-scale column was loaded with hemp meal and flooded with water at 35° C.

In the first constant temperature run, after the column was flooded, the temperature was ramped up to 70° C. for 10 min without stopping the flow. The rest of the extraction proceeded as described in the previous examples (Table 18). The flow rate of the bench-scale PLPW extraction system was kept at 5 mL/min and a total solvent:solid ratio of 30 mL/g was used including for the temperature ramping fractions.

TABLE 18

| Fraction | Temperature (° C.) | Extraction Volume (mL) | Fraction Solvent to Solid Ratio (mL/g) | Cumulative Solvent to Solid Ratio (mL/g) | Time (min) |
|---|---|---|---|---|---|
| 1 | 35 to 70° C. Ramp | 50 | 2.7 | 2.7 | 10 |
| 2 | 70° C. Constant | 75 | 4.1 | 6.8 | 15 |
| 3 | 70° C. Constant | 75 | 4.1 | 10.9 | 15 |
| 4 | 70° C. Constant | 75 | 4.1 | 15.0 | 15 |
| 5 | 70° C. Constant | 75 | 4.1 | 19.1 | 15 |
| 6 | 70° C. Constant | 75 | 4.1 | 23.2 | 15 |
| 7 | 70° C. Constant | 125 | 6.8 | 30.0 | 25 |

A two-temperature run was done to extract more material and to either (i) gain more protein in the extracts or (ii) to purify the residue to increase its protein content (Table 19). After the column was flooded, the temperature was ramped up to 70° C. for 10 min without stopping the flow. Two fractions were collected at 70° C. before ramping up the temperature from 70° C. to 120° C. for 10 min. The rest of the fractions were collected at a constant 120° C. extraction temperature (Table 19). The flow rate of the bench-scale PLPW extraction system was kept at 5 mL/min and a total solvent:solid ratio of 30 mL/g was used including the temperature ramping fractions.

TABLE 19

| Fraction | Temperature (° C.) | Extraction Volume (mL) | Fraction Solvent to Solid Ratio (mL/g) | Cumulative Solvent to Solid Ratio (mL/g) | Time (min) |
|---|---|---|---|---|---|
| 1 | 35 to 7° C. Ramp | 50 | 2.7 | 2.7 | 10 |
| 2 | 70° C. Constant | 75 | 4.1 | 6.8 | 15 |
| 3 | 70° C. Constant | 75 | 4.1 | 10.9 | 15 |
| 4 | 70 to 120° C. Ramp | 50 | 2.7 | 13.6 | 10 |
| 5 | 120° C. Constant | 75 | 4.1 | 17.7 | 15 |
| 6 | 120° C. Constant | 75 | 4.1 | 21.8 | 15 |
| 7 | 120° C. Constant | 150 | 8.2 | 30 | 30 |

The coarsely ground hemp meal had a starting protein content of approximately 35% and 10% lipids with the balance of the dry matter comprising carbohydrates and inorganics.

Protein analysis of the freeze-dried extracts was sent out for independent third party analysis. The fractions were grouped as follows:

It was noted that at temperatures of 80° C. or higher, the protein in the hemp meal would cook like egg whites, forming a solid mass in the extraction column and subsequently plugging the system. Through experimentation, it was determined that (i) if flow was maintained after the column flooded and (ii) the extraction temperature was maintained below 80° C., then the protein could be extracted without coagulating, and the column would not plug.

TABLE 20

| Temperature | Fraction | Solvent to Solid Ratio (mL/g) | Extraction Volume (mL) | Dry Matter (g) | Dry Matter Yield (%) | Dry Matter Concentration (%) | Yield of Protein[a] (wt product/wt available) (%) | Protein Content of Dried Extract (wt product/wt dry matter) (%) |
|---|---|---|---|---|---|---|---|---|
| 70° C. Constant | 1 | 2.7 | 50 | 0.83 | 4.51 | 1.48 | 3.73 | 28.83 |
| | 2 | 6.8 | 75 | 1.11 | 6.03 | 1.34 | 27.8[b] | 77.74[b] |
| | 3 | 10.9 | 75 | 1.20 | 6.52 | 1.46 | | |
| | 4 | 15.0 | 75 | 0.33 | 1.79 | 0.40 | | |
| | 5 | 19.1 | 75 | 0.11 | 0.60 | 0.14 | 4.66[c] | 54.59[c] |
| | 6 | 23.2 | 75 | 0.07 | 0.38 | 0.08 | | |
| | 7 | 30.0 | 125 | 0.05 | 0.27 | 0.06 | | |
| | Residue | | | 14.69 | | | 58.38 | 25.58 |
| 70° C./120° C. Two Stage | 1 | 2.7 | 50 | 0.86 | 4.67 | 1.71 | ND | ND |
| | 2 | 6.8 | 75 | 0.90 | 4.89 | 1.20 | ND | ND |
| | 3 | 10.9 | 75 | 1.31 | 7.12 | 1.77 | | |
| | 4 | 13.6 | 50 | 0.32 | 1.74 | 0.63 | 11.65[c] | 46.47[c] |
| | 5 | 17.7 | 75 | 0.32 | 1.68 | 0.41 | | |
| | 6 | 21.8 | 75 | 0.40 | 2.17 | 0.54 | | |
| | 7 | 30 | 150 | 0.59 | 3.21 | 0.40 | | |
| | Residue | | | 13.80 | | | 48.91 | 22.86 |

[a]Assuming 35% protein in original dry starting material
[b]Average of Fractions 2 and 3
[c]Average of Fractions 4, 5, 6, and 7

Run 1 (Constant 70° C.):
Residue (70/05/30 GCHM 2013/06/06 Residue)
Fraction 1 (70/05/30 GCHM 2013/06/06 F1)
Fraction 2 and 3 combined (70/05/30 GCHM 2013/06/06 F2; 70/05/30 GCHM 2013/06/06 F3)
Fraction 4, 5, 6, and 7 combined (70/05/30 GCHM 2013/06/06 F4; 70/05/30 GCHM 2013/06/06 F5; 70/05/30 GCHM 2013/06/06 F6; 70/05/30 GCHM 2013/06/06 F7)
Run 2 (Two stage 70° C./120° C.):
Residue (70-120/05/30 GCHM 2013/06/06 Residue)
Fraction 1 (70-120/05/30 GCHM 2013/06/06 F1)
Fraction 2 and 3 combined (70-120/05/30 GCHM 2013/06/06 F2; 70-120/05/30 GCHM 2013/06/06 F3)
Fraction 4, 5, 6, and 7 combined (70-120/05/30 GCHM 2013/06/06 F4; 70-120/05/30 GCHM 2013/06/06 F5; 70-120/05/30 GCHM 2013/06/06 F6; 70-120/05/30 GCHM 2013/06/06 F7)

The extraction performance indicated that the protein was being solubilized and removed from the biomass due to the milky white appearance of the extracts for Fractions 2 to 4. The PLPW extraction yielded 20.1% of the starting material in the liquid extract for the constant temperature run and it yielded 25.5% of the starting material in the liquid extract for the two stage run (Table 20).

In the constant 70° C. temperature extraction, the greatest protein concentration and yield occurred in Fractions 2 and 3 (Table 20). In the two-stage 70° C./120° C. extraction, the first three fractions were not analysed because the extraction protocols were the same as the constant temperature run. The last four fractions were analysed to determine the effect of increasing the temperature over the last part of the PLPW extraction when the majority of water soluble proteins had been extracted. The protein yield in Fractions 4 to 7 of the two stage extraction was higher at 11.65%, but the concentration in the dried extracts was lower at 46.47%.

These results suggest that hemp meal may contain significant amounts of water soluble proteins that were extracted by the PLPW. A successful run at a constant 70° C. yielded 36% of the proteins at a maximum concentration of 77.74% in the dried extracts. Later, a two-stage run was completed whereby the processing temperature was raised to 120° C. after most of the easily solubilized material was extracted from the hemp meal. This resulted in a better yield of protein in the dried extracts, but there was still close to 49% of the original protein left in the residues. Even though a large amount of protein was left in the residue, this protein is probably much different than the extracted protein.

Example 5

PLPW Processing of Parsley for Extraction of Apiin (Apigenin-7-(2-O-apiosylglucoside)

Dehydrated parsley flakes were sourced from a commercial supplier in the US. Upon receipt of the material, its moisture content was determined by drying overnight in a forced convection oven (Model 40AF, Quincy Lab Inc., Chicago, Ill.) at 75° C. The remainder of the parsley flakes was stored in a deep freeze at −20° C. until needed for processing.

The dehydrated parsley flakes were processed with the bench-scale PLPW system (FIG. 9). Dehydrated parsley (18.5 g, dry weight and unground) was packed into a stainless steel extraction column (22 cm long×2.2 cm ID) with frits at both ends. The extraction process was started by pumping water at flow rate of 5 mL/min into the bench-scale PLPW system to bring the pressure up to 300 psi. After warming the column for 15 min, water was pumped through the system at 110° C., 120° C., and 130° C. Four fractions of parsley extract (F1, F2, F3 and F4) were collected at each temperature and were freeze-dried. Freeze-dried samples were extracted with MeOH—H2O (2:1, v/v) for the phenolic compound analysis using the methods taught by Luthria (2006).

For compositional analyses, parsley flakes were ground and passed through a standard sieve (425 μm) to prepare fine particles. About 0.250 mg of ground sample was extracted with 10 mL of MeOH—H$_2$O (2:1, v/v) in a sonicator for 30 min. After extraction, the sample was centrifuged (10,000 rpm) for 15 min and the supernatant collected into a 25-mL volumetric flask. The residue was re-suspended with an additional 10 mL of MeOH solution and re-extracted. The supernatant was combined with the first extract and total volume was made up to 25 mL. An aliquot of the combined extract (1 mL) of was re-centrifuged at 9,000 rpm for 15 min to remove any remaining particles and was used for phenolic content analysis by the Folin-Ciocalteus (FC) method and HPLC methods following the teaching of Luthria et al. (2006, *A systematic approach for extraction of phenolic compounds using parsley (Petroselinum crispum) flakes as a model substrate*. J. Sci. Food Agric. 86:1350-1358). HPLC analyses of the parsley extracts were carried out using an Agilent HP 1100 series HPLC (Agilent Technologies, Waldbronn, Germany) coupled with CHEMSTATION® software, binary high-pressure pump, a vacuum degasser, and a photodiode array detector. All the chromatographic separation was carried out on a Luna RP C-18 (100 Å, 150×3 mm) column and with a PHENOMENEX® guard column (C-18, 4×2 mm) (PHENOMENEX is a registered trademark of Phenomenex, Torrance, Calif., USA). The column oven temperature was 30° C. The gradient system was consisted of 5% formic acid (A) and methanol (B): isocratic 30% MeOH for 5 min, then increasing to 100% MeOH over 21 min, held at 100% of MeOH for 5 min. Diode array detector was used to detect apiin (at 270 nm).

Pure standard of apiin (≥93.9%) was purchased from ChromaDex (Santa Ana, Calif., USA). Five milligrams of standard were dissolved in 10 mL of methanol-water (2:1, stock solution); further dilutions were prepared diluting the stock solution in methanol-water. The regression equations and coefficients (R2) for apiin (at 270 nm) were y=47515x−149.19 ($R^2$=0.9999, from 0.23 to 0.02 mg/mL).

Figure 18:
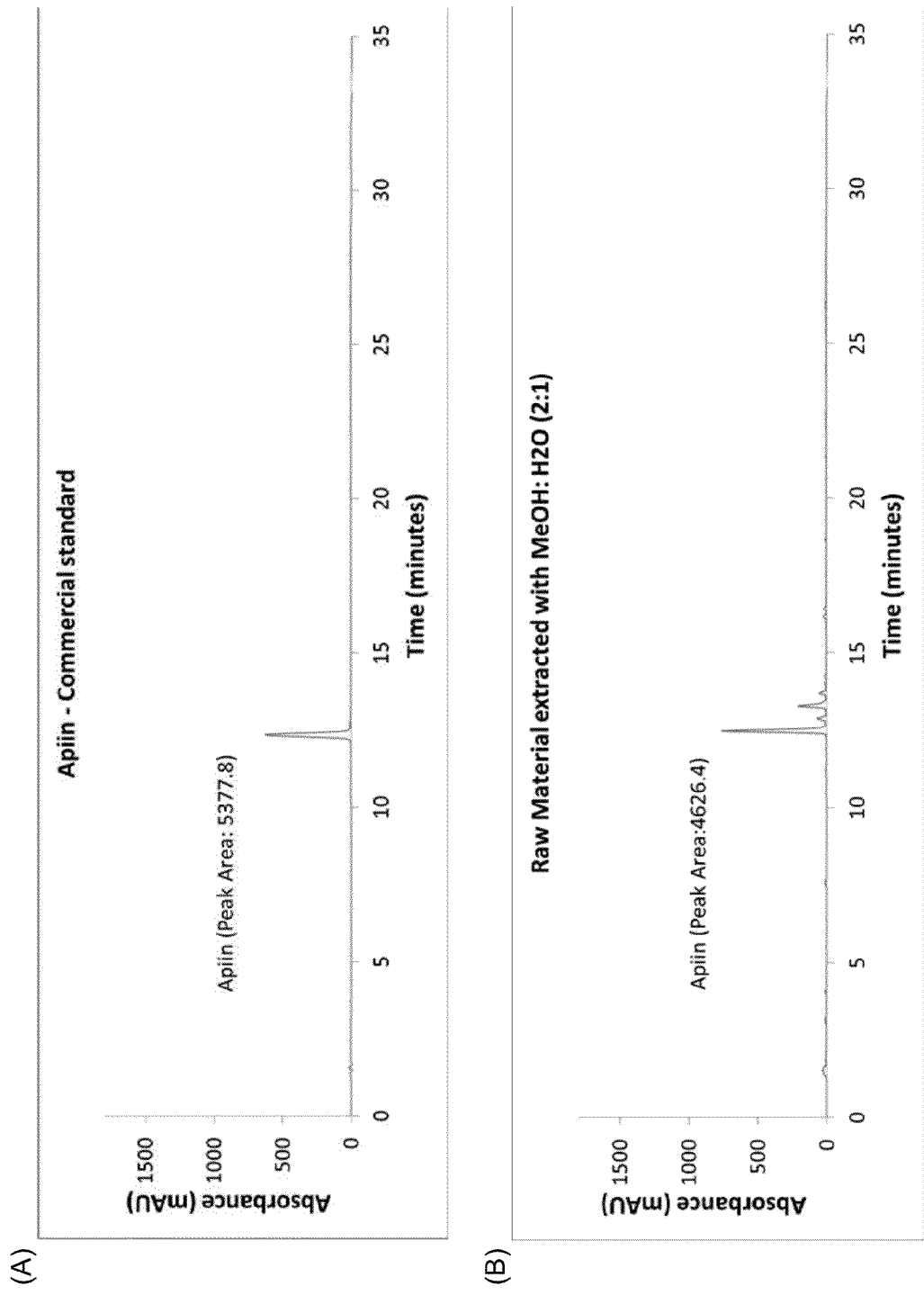
FIGS. 18(A) and 18(B) are chromatograms at 270 nm of a commercial apiin standard (18(A)) and from ground parsley extracted with MeOH-water (18(B))

The moisture content of the original dehydrated parsley was 5.5%. A solvent consisting of MeOH-water (2:1) was used successfully for the extraction of apiin from ground parsley flakes and PLPW extracts. The presence of apiin in the extract of parsley was identified and estimated using a pure external standard. A representative chromatogram of the pure apiin standard is shown in FIG. 18(A) while a respective chromatogram of an extract from dried parsley is shown in FIG. 18(B). The main peak identified in the parsley extract was apiin and its retention time (12.4 min) and UV-spectra correlated with the commercial standard confirming the identity and the purity of the peak. The apiin concentration in the sample was estimated by plotting a linear regression line for the pure apiin standard (concentration on x-axis and peak area on y-axis). The regression equation for apiin at 270 nm was y=47515x−149.19 ($R^2$=0.9999). The apiin content and TP in the raw material extract of parsley was 2.65 and 1.78%, respectively.

Figure 19:
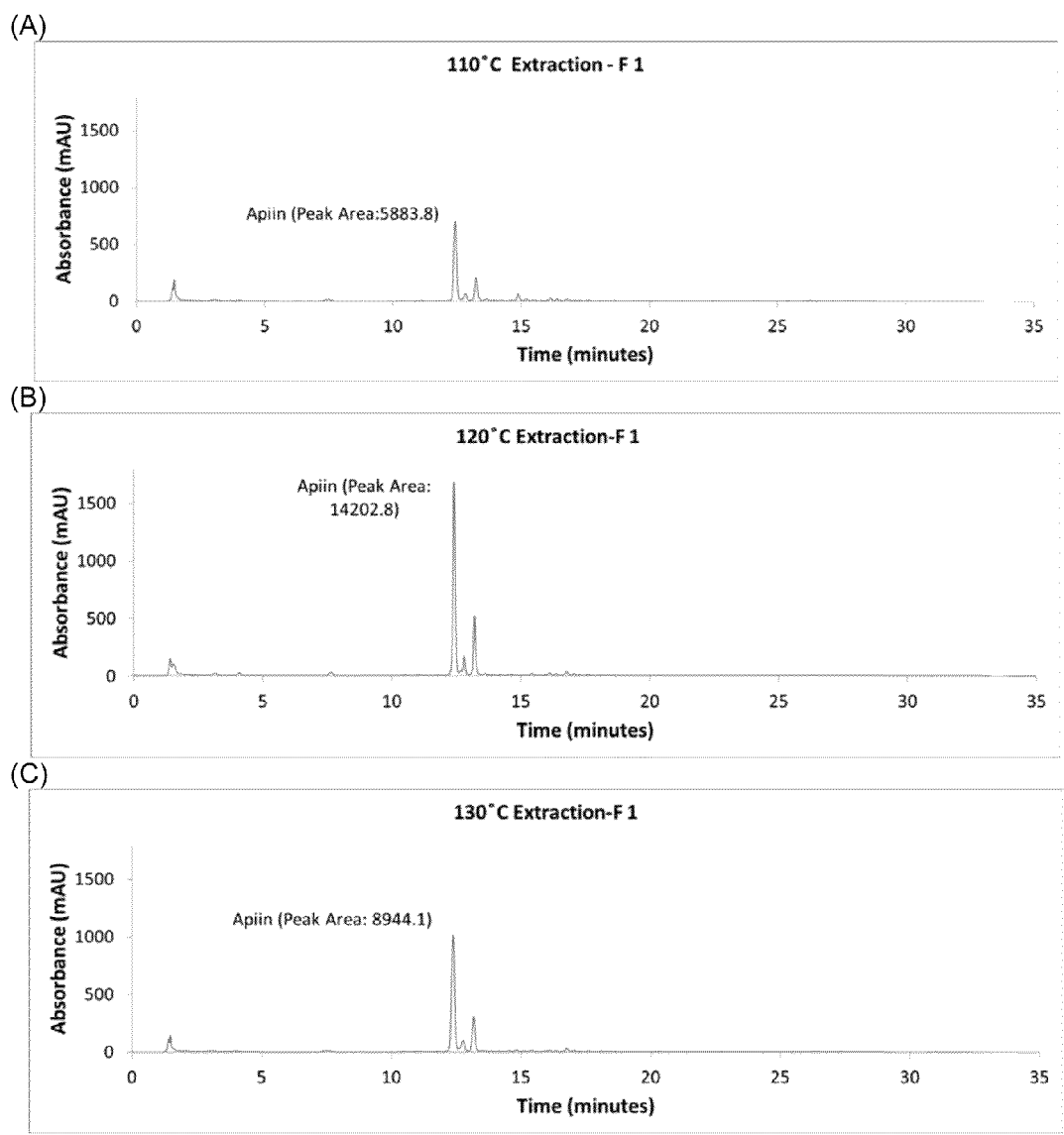
FIGS. 19(A)-19(C) are chromatograms of HPLC analysis of PLPW extracts of parsley at 110° C.

Parsley was extracted by PLPW at three different temperature settings (110° C., 120° C., and 130° C.) and at constant liquid:solid ratio (30 mL/g), flow rate (5 mL/min), pressure (300 psi), and extraction time (111 min). The data including extraction conditions, dry matter yields and phenolic composition for parsley by PLPW are summarized in Table 21. The PLPW extraction system performed very well for parsley extraction without plugging or column bleeding at constant pump pressure. The colors of the first fractions of PLPW extracts were bright yellow and were likely due to beta-carotene and zeaxanthin present in parsley. A higher amount of dry matter was obtained in the first 7.5 mL/g of solvent:solid ratio. The highest amount of total dry matter of 11.6 g recovered from 120° C. processing temperature. The main peak identified from the PLPW extract of parsley was apiin. The compound was identified by spiking the parsley extracts with a pure apiin standard, comparing the UV-spectra and retention times with published technical reports. The first fraction of 120° C. temperature setting (FIG. 19(B)) yielded the highest amount of apiin (7.7%) and TP (3.3%) with 9.96 g of dry matter content. Based on these results, processing temperature influences the extraction of dry matter from parsley. At 110° C., polarity (FIG. 19(A)), solvent diffusivity to sample matrix, thermal reaction may have an effect for the lower extractability of apiin, while at 130° C. (FIG. 19(C)), a portion of apiin was degraded due to the higher temperature.

TABLE 21

| Temperature (° C.) | PLPW Fraction | Extraction volume (mL) | Solvent:solid ratio (mL/g) | Dry matter content (g) | Dry matter content (%) | Apiin content of dried extract (%)[a] | TP content of adried extract (%)[b] | Apiin yield (%)[c] | TP yield (%)[c] |
|---|---|---|---|---|---|---|---|---|---|
| 110 | F1 | 138 | 7.5 | 8.42 | 5.88 | 2.85 | 3.50 | 48.70 | 89.48 |
|  | F2 | 138 | 7.5 | 1.26 | 0.91 | 5.37 | 3.19 | 13.80 | 12.20 |
|  | F3 | 138 | 7.5 | 0.42 | 0.30 | 4.43 | 2.52 | 3.80 | 3.19 |
|  | F4 | 138 | 7.5 | 0.22 | 0.16 | 4.09 | 2.86 | 1.80 | 1.91 |
|  | Total | 552 | 30 | 10.32 | 1.87 | 3.24 | 3.41 | 68.27 | 106.78 |
| 120 | F1 | 138 | 7.5 | 9.96 | 6.88 | 7.69 | 3.60 | 156.20 | 109.10 |
|  | F2 | 138 | 7.5 | 1.14 | 0.79 | 5.60 | 3.30 | 13.00 | 11.40 |
|  | F3 | 138 | 7.5 | 0.32 | 0.24 | 3.87 | 2.90 | 2.50 | 2.90 |
|  | F4 | 138 | 7.5 | 0.22 | 0.15 | 3.79 | 3.10 | 1.70 | 2.10 |
|  | Total | 552 | 30 | 11.64 | 2.11 | 7.31 | 3.55 | 173.40 | 94.59 |
| 130 | F1 | 138 | 7.5 | 10.15 | 7.09 | 6.80 | 3.90 | 141.20 | 119.00 |
|  | F2 | 138 | 7.5 | 0.77 | 0.52 | 3.90 | 2.80 | 6.20 | 6.50 |
|  | F3 | 138 | 7.5 | 0.36 | 0.25 | 2.10 | 2.80 | 1.50 | 3.10 |
|  | F4 | 138 | 7.5 | 0.24 | 0.19 | 1.50 | 2.80 | 0.70 | 2.00 |
|  | Total | 552 | 30 | 11.52 | 2.09 | 6.35 | 3.74 | 149.60 | 105.42 |
| Parsley (ground) |  |  |  |  |  | 26.5 mg/g (2.65%) | 17.8 mg/g (1.78%) |  |  |

[a]Apiin (apiin equivalents at 270 nm by HPLC)
[b]Total phenolics (gallic acid equivalents FC by assay at 755 nm)
[c]weight of product/weight of available (%); moisture content of the samples standardized to 5.5%

Example 6

PLPW Processing of *Rhodiola rosea* Roots

Dried *Rhodiola rosea* roots were supplied by Advanced Orthomolecular Research Inc. (Calgary, AB, CA). Samples were fairly coarse with varied particle distribution and chunks, but no grinding or chopping was done before extraction. The moisture content of the *Rhodiola rosea* roots was determined by drying overnight in a forced convection oven (Model 40AF, Quincy Lab Inc., Chicago, Ill.) at 75° C. The moisture content of the *Rhodiola rosea* biomass was determined to be 3.4%. The remainder of the *Rhodiola rosea* was stored −20° C. until needed for testing.

Three extraction temperatures (110° C., 130° C., 150° C.) were tested for processing of the *Rhodiola rosea* roots with the bench-scale PLPW system. A solvent:solid ratio of 30 mL/g was used and each volume of extracts was split into 4 fractions of 7.5 mL/g solvent:solid ratio. The flow rate was kept at 5 mL/min and the warm-up time was set at 15 min to prevent breakdown and loss of phytochemicals in the extracts. The extraction column was packed with 15 g of material.

Analysis of Extracts and Raw Material:

Samples of the *Rhodiola rosea* dried extracts were thoroughly dissolved at a concentration of 10 mg/mL in 70% methanol. The samples were clarified by centrifugation and 20 µL of the supernatant was injected onto an LC/MS apparatus. The samples were run in duplicates. For comparison, one extract sample was assessed by dissolving 2 g in 40 mL of 70% methanol and diluted 1:5 with 70% methanol (10 mg root/mL). Signals were identified by retention time and molecular weight for salidroside, rhodioloside, rosarin, rosavin, rosin and rosidrin were obtained using a gradient HPLC separation coupled to DAD absorbance detection and confirmed by positive mode electrospray mass spectroscopy. The amounts of salidroside, rosarin, rosavin and rosin were estimated by comparison with pure standards obtained from ChromaDex (Santa Ana, Calif., USA).

A method was developed for the analysis of salidroside and rosavin, comprising the following steps. To determine the initial levels of salidroside and rosavin in the original root material, a representative sample of *Rhodiola rosea* roots was finely ground using a coffee grinder, and then extracted with 25 mL of 80% aqueous methanol (20:80, methanol:water) by sonication for 25 min. The extracts were centrifuged at 9000 rpm for 15 min at room temperature, and 10 µL of supernatants were injected for the HPLC analysis for salidroside and rosavin content analysis following the methods taught by Mao et al. (2007, *Simultaneous determination of salidroside and tyrosol in extracts of Rhodiola L. by microwave assisted extraction and high-performance liquid chromatography*. J. Pharm. Biomed. Anal. 45:510-515; Ganzera et al., 2001, *Analysis of the Marker Compounds of Rhodiola rosea L. (Golden Root)by Reversed Phase High Performance Liquid Chromatography*. Chem Pharm Bull. 49:465-467). Standards of salidroside and rosavin were purchased from Sigma-Aldrich (Sigma-Aldrich, St Louis, Mo., USA). 2.5 mg of each standard was dissolved in 10 mL of 80% aqueous methanol (stock solution). Further dilutions were prepared by diluting the stock solution in 80% aqueous methanol. The regression equations and coefficients ($R^2$) for salidroside (at 278 nm) and rosavin (at 250 nm) were y=2693.1x−11.727 ($R^2$=0.9983, from to 0.023 mg/mL) and y=82174x−89.367 ($R^2$=0.9995, from 0.035 to 0.0125 mg/mL).

Freeze-dried PLPW *Rhodiola rosea* root extract samples were extracted with 25 mL of 80% aqueous methanol for the HPLC analysis as described above. Compound analysis was carried out using an Agilent HP 1100 series HPLC (Agilent Technologies, Waldbronn, Germany) coupled with CHEM-STATION® software (CHEMSTATION is a registered trademark of Agilent Technologies Inc. Santa Clara, Calif., USA), binary high-pressure pump, a vacuum degasser, and a photodiode array detector. All the chromatographic separation was carried out on a Luna RP C-18 (100 Å, 150×3 mm) column and with a PHENOMENEX® guard column (C-18, 4×2 mm) (PHENOMENEX is a registered trademark of Phenomenex Inc., Torrance, Calif., USA). The column oven temperature was 30° C. The gradient system was consisted of water (A) and methanol (B): isocratic 20% A for 25 min, then increasing to 90% A over 15 min, held at 90% A for 10 min. A diode array detector was used to detect salidroside (at 278 nm) and rosavin (at 250 nm). Peaks were identified by spiking the *rhodiola* extracts with standard compounds, comparison of the UV-spectra and retention times.

The extraction yielded 48% of the starting material at a concentration of 1.7% in the liquid extract at 110° C. (FIG.

Figure 20:
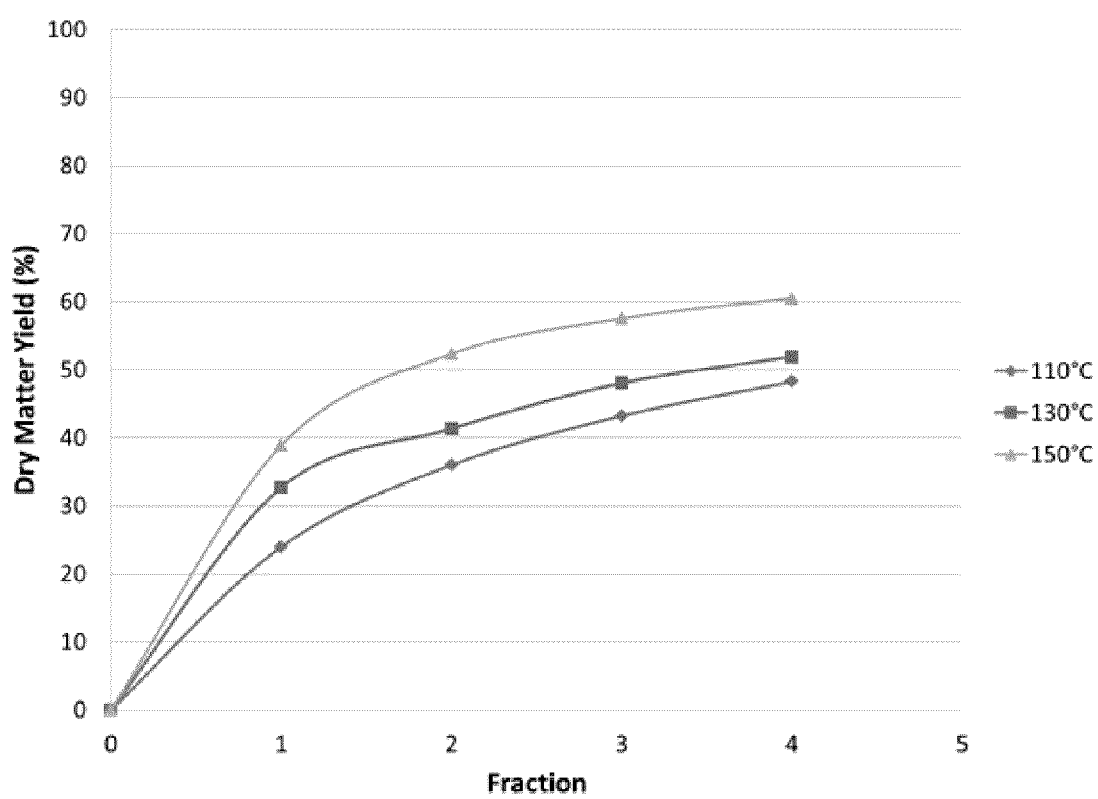
FIG. 20 is a chart showing the cumulative dry matter yield extracted from *Rhodiola rosea* root biomass (14.49 g of dry starting material) in a PLPW systems using a solvent:solid ratio of 30 mL/g.

20). At 130° C., the yield was 52% of the starting material at a concentration of 1.7% in the liquid extract (FIG. 20). At 150° C., the yield was 60% of the starting material at a concentration of 2.1% in the liquid extract (FIG. 20). The first two collected ractions, representing a 15 mL/g solvent:solid ratio, contained the richest yield of dry matter.

Figure 21:
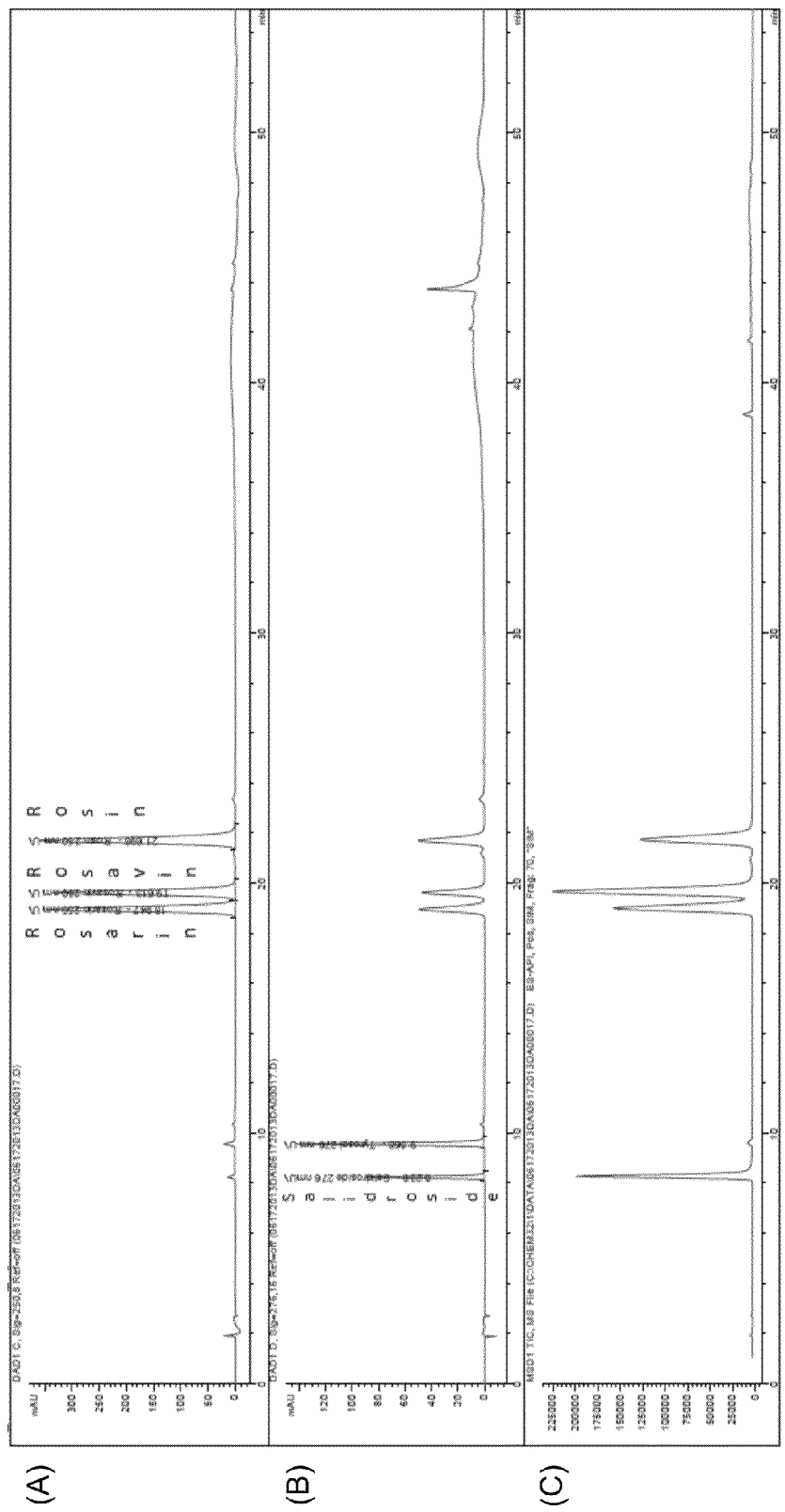
FIGS. 21(A)-21(C) are representative chromatograms of 100 μg/mL standards of rosarin, rosavin, rosin, and salidroside at 250 nm FIG. 21(A)), 276 nm (FIG. 21(B)), and SIM positive mode electrospray mass spectroscopy (FIG. 21(C))
Figure 22:
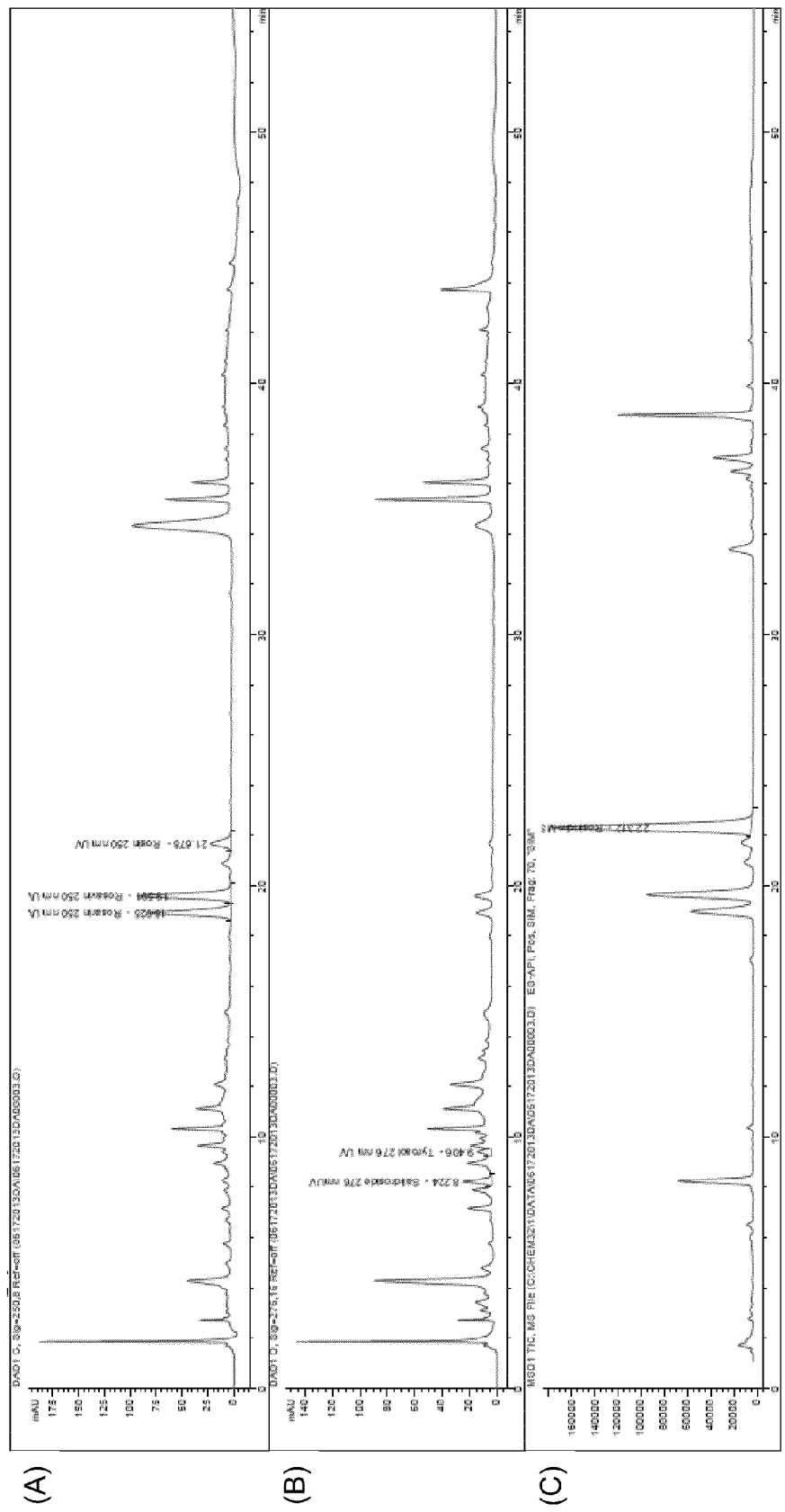
FIGS. 22(A)-22(C) are representative chromatograms of 10 mg/mL (70% methanol) solutions of dried PLPW *Rhodiola rosea* extracts, 110° C. temperature Fraction 1 at 250 nm (FIG. 22(A)), 276 nm (FIG. 22(B)), and SIM positive mode electrospray mass spectroscopy (FIG. 22(C))
Figure 23:
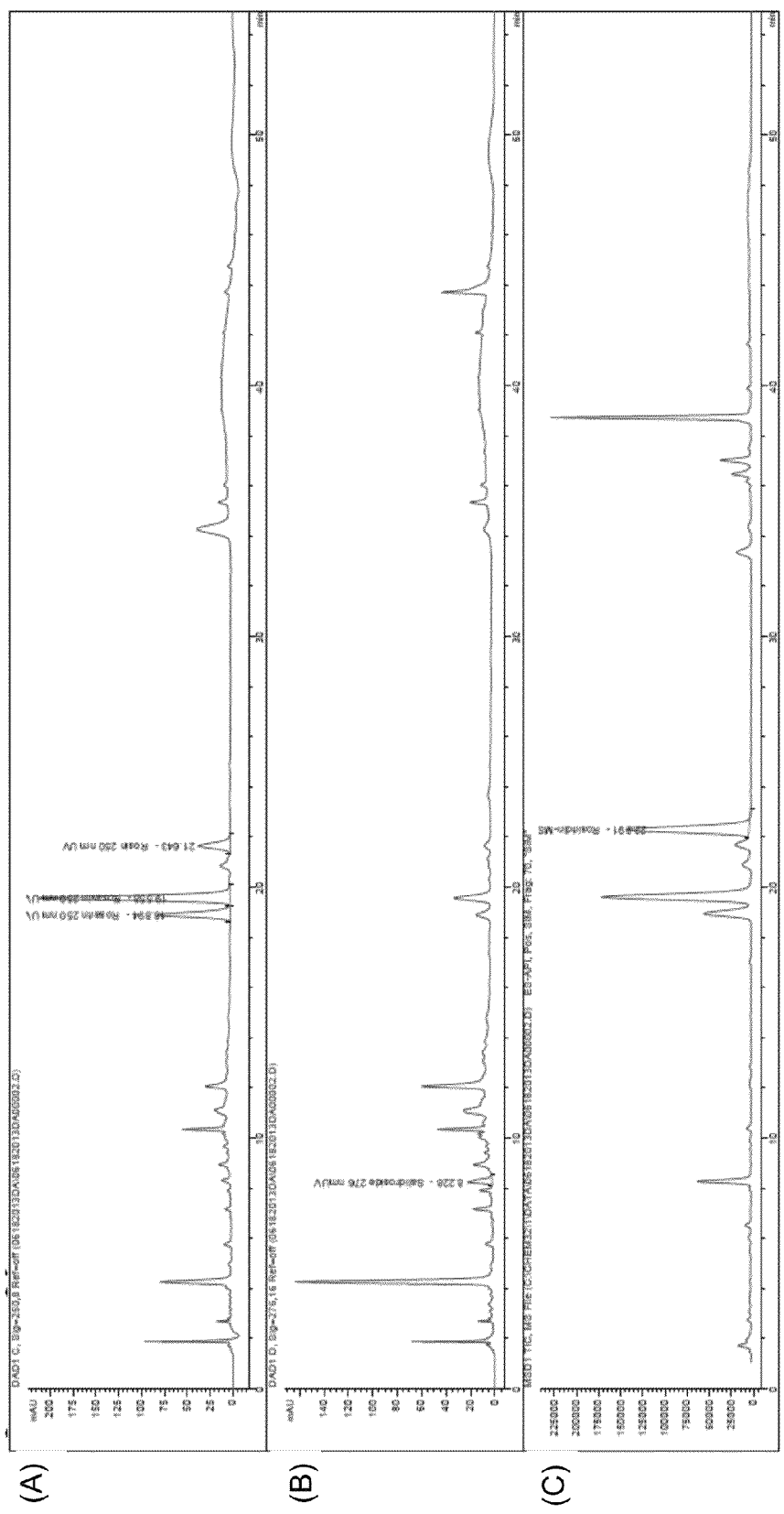
FIGS. 23(A)-23(C) are representative chromatograms of 10 mg/mL (70% methanol) of reference *Rhodiola rosea* root biomass extract at 250 nm (FIG. 23(A), 276 nm (FIG. 23(B)), and SIM positive mode electrospray mass spectroscopy FIG. 23(C)).

Results from the HPLC/DAD analyses showed that the concentrations of rosavin (sum of rosarin, rosavin, and rosin) and salidroside were greatest at the 130° C. processing temperature and represented 0.79% and 0.62% of the extracts respectively (Table 22). Peaks for rosarin, rosavin, rosin, and salidroside are identified in FIGS. 21(A)-21(C). Content of these compounds was lower in the dried PLPW extracts (FIGS. 22(A)-22(C)) than in the methanol extract of the starting *Rhodiola rosea* root material (FIGS. 23(A)-23(C)). The low salidroside and rosavin content of the PLPW extracts is probably due to the large amount of material that is solubilized and extracted. The samples were completely soluble in water but contained a considerable amount of material that was insoluble in 70% methanol. This insoluble fraction was probably the saccharides, which would not be effectively extracted in a hydro-alcoholic extraction, but are extracted in the PLPW system. Theses saccharides are probably responsible for lowering the concentration of salidroside and rosavin in the PLPW extracts.

TABLE 22

| Sample | Replicate | Salidroside Content of Dried Extract (% by weight) | Rosarin Content of Dried Extract (% by weight) | Rosavin Content of Dried Extract (% by weight) | Rosin Content of Dried Extract (% by weight) |
|---|---|---|---|---|---|
| 110° C., Fraction 1 | 1 | 0.41 | 0.23 | 0.28 | 0.056 |
|  | 2 | 0.41 | 0.23 | 0.28 | 0.056 |
| 110° C., Fraction 2 | 1 | 0.40 | 0.23 | 0.36 | 0.056 |
|  | 2 | 0.41 | 0.23 | 0.36 | 0.056 |
| 130° C., Fraction 1 | 1 | 0.58 | 0.21 | 0.56 | 0.052 |
|  | 2 | 0.66 | 0.21 | 0.56 | 0.053 |
| 130° C., Fraction 2 | 1 | 0.65 | 0.19 | 0.53 | 0.052 |
|  | 2 | 0.58 | 0.19 | 0.53 | 0.052 |
| 150° C., Fraction 1 | 1 | 0.48 | 0.18 | 0.39 | 0.072 |
|  | 2 | 0.49 | 0.18 | 0.40 | 0.072 |
| 150° C., Fraction 2 | 1 | 0.47 | 0.13 | 0.36 | 0.092 |
|  | 2 | 0.48 | 0.13 | 0.37 | 0.092 |

The original *Rhodiola rosea* root biomass and the dried PLPW extracts were analysed following the methods taught by Mao et al. (2007) so that yields could be calculated (Table 24). Results for rosavin were comparable to those obtained from an independent commercial laboratory, but the salidroside content was twice that reported by the commercial laboratory. The data in Table 23 were confirmed with a standard addition test. The Mao et al. (2007) method is specific for salidroside and is more sensitive to the compound than the method used by the commercial laboratory. The PLPW extraction achieved the greatest concentration and yield of salidroside and rosavin over the first two fractions at an extraction temperature of 130° C. The yield of salidroside was nearly 100% in the first two fractions and the concentration in the dried extracts was 1.5%, which exceeded the specifications for *Rhodiola rosea* root extracts. The yield of rosavin was nearly 85% in the first two fractions, but the concentration in the dried extracts was only 0.65%, which was below the 3% specified for *Rhodiola rosea* root extracts. Therefore, the PLPW is effective at extracting the available salidroside and rosavin in *Rhodiola rosea*, but it is a non-selective extraction, and the concentration in the dried extracts is low. Yields of salidroside and rosavin decreased at an extraction temperature of 150° C. even though the dry matter yield increased because of degradation of the compounds due to the higher temperature.

TABLE 23

| Temperature | Fraction | Solvent to Solid Ratio (mL/g) | Extraction Volume (mL) | Dry Matter (g) | Dry Matter Yield (%) | Dry Matter Concentration (%) | Yield of Salidroside (wt product/wt available) (%) | Yield of Rosavin (wt product/wt available) (%) | Salidroside Content of Dried Extract (wt product/wt dry matter) (%) | Rosavin Content of Dried Extract (wt product/wt dry matter) (%) |
|---|---|---|---|---|---|---|---|---|---|---|
| 110° C. | 1 | 7.5 | 109 | 3.47 | 23.94 | 3.30 | 35.2 | 28.6 | 0.92 | 0.36 |
|  | 2 | 15 | 109 | 1.74 | 12.03 | 1.60 | 15.0 | 16.9 | 0.81 | 0.42 |
| 130° C. | 1 | 7.5 | 109 | 4.73 | 32.67 | 4.46 | 79.3 | 67.4 | 1.51 | 0.62 |
|  | 2 | 15 | 109 | 1.26 | 8.67 | 1.17 | 17.0 | 17.2 | 1.22 | 0.59 |

TABLE 23-continued

| Temperature | Fraction | Solvent to Solid Ratio (mL/g) | Extraction Volume (mL) | Dry Matter (g) | Dry Matter Yield (%) | Dry Matter Concentration (%) | Yield of Salidroside (wt product/wt available) (%) | Yield of Rosavin (wt product/wt available) (%) | Salidroside Content of Dried Extract (wt product/wt dry matter) (%) | Rosavin Content of Dried Extract (wt product/wt dry matter) (%) |
|---|---|---|---|---|---|---|---|---|---|---|
| 150° C. | 1 | 7.5 | 109 | 5.63 | 38.88 | 5.45 | 56.8 | 60.4 | 0.91 | 0.47 |
|  | 2 | 15 | 109 | 1.95 | 13.44 | 1.77 | 13.2 | 23.9 | 0.62 | 0.54 |
| 130° C. with wash | Wash | 7.5 | 109 | 1.01 | 6.99 | 1.99 | 9.8 | 8.7 | 0.87 | 0.38 |
|  | 1 | 7.5 | 109 | 3.83 | 26.42 | 3.57 | 29.4 | 35.5 | 0.69 | 0.40 |
|  | 2 | 15 | 109 | 1.84 | 12.71 | 1.78 | 20.9 | 9.1 | 1.03 | 0.21 |
| Raw Material |  |  |  |  |  |  |  |  | 0.66 | 0.30 |

The invention claimed is:

1. An apparatus for extracting and recovering components from a biomass feedstock with pressurized low polarity water, comprising:
two or more reaction columns, each column separately communicating with: (i) a supply of heated water, (ii) a supply of heated pressurized water, and (iii) a supply of cooled pressurized water, each column having an outlet for egressing a liquids product flow;
a pump for pressurizing each of said reaction columns;
a plurality of valves cooperating with each of said reaction columns and said pumps to: (iv) pressurize each of said reaction columns to a selected pressure, (v) to maintain the selected pressure in each of said reaction columns for a selected time period, and (vi) to release pressure in each of said pressurized reaction columns;
a collection vessel for receiving the liquids product flow from each of said columns during a period of time when each of said columns is pressurized; and
additionally comprising a vessel for receiving a waste water flow egressing from each of said reaction columns after each of said columns has been de-pressurized.

2. The apparatus of claim 1, additionally comprising one or more water treatment apparatus for receiving and purifying therein the waste water flow.

3. The apparatus of claim 2, additionally comprising an apparatus for processing the purified water by one or more of heating and pH adjustment.

4. The apparatus of claim 3, additionally comprising a reservoir for storing a portion of the purified water.

5. The apparatus of claim 1, additionally comprising a reservoir for storing a portion of the waste water flow.

6. The apparatus of claim 1, additionally comprising one or more collection vessels for sequentially receiving therein the liquids product flow from each of said columns during a period of time when each of said columns is pressurized.

7. The apparatus of claim 1, wherein the supply of heated water comprises a piping infrastructure communicating with a source of water, at least one heat exchanger, at least one heater, and a back pressure regulator for flooding each of said reaction columns with hot water and generating pressurized low polarity water.

8. The apparatus of claim 1, wherein the supply of heated water comprises a piping infrastructure communicating with a source of water, at least one heat exchanger, at least one heater, and a back pressure regulator for warming each of said reaction columns to a selected temperature.

9. The apparatus of claim 1, wherein the supply of heated pressurized water supply comprises a piping infrastructure communicating with a source of water, at least one heat exchanger, at least one heater, and a back pressure regulator for continuously flowing hot pressurized low polarity water through each of said reaction columns, said third piping infrastructure additionally communicating with said collection vessel.

10. The apparatus of claim 1, wherein the supply of cooled pressurized water comprises a piping infrastructure communicating with a source of water, at least one heat exchanger, at least one heater, and a back pressure regulator for cooling each of said reaction columns to a selected temperature.

11. The apparatus of claim 1, additionally comprising an automated control system communicating with the two or more reaction columns, the supply of heated water, the supply of heated pressurized water, the supply of cooled pressurized water, the pumps for pressurizing each of said reaction columns, and the plurality of valves for controllably sequentially directing the flow of water into (i) a first piping infrastructure communicating with a source of water, at least one heat exchanger, at least one heater, and a back pressure regulator for flooding each of said reaction columns with hot water and generating pressurized low polarity water, (ii) a second piping infrastructure communicating with a source of water, at least one heat exchanger, at least one heater, and a back pressure regulator for warming each of said reaction columns to a selected temperature, (iii) a third piping infrastructure communicating with a source of water, at least one heat exchanger, at least one heater, and a back pressure regulator for continuously flowing hot pressurized low polarity water through each of said reaction columns, said third piping infrastructure additionally communicating with said collection vessel, and (iv) a fourth piping infrastructure communicating with a source of water, at least one heat exchanger, at least one heater, and a back pressure regulator for cooling each of said reaction columns to a selected temperature.

12. The apparatus of claim 11, wherein the automated control system is programmable.

13. The apparatus of claim 11, wherein the automated control system can be manually operated.

14. The apparatus of claim 11, additionally comprising a manual control system communicating with the two or more reaction columns, the supply of heated water, the supply of heated pressurized water, the supply of cooled pressurized water, the pumps for pressurizing each of said reaction columns, and the plurality of valves for controllably sequentially directing the flow of water into the first piping infrastructure, the second piping infrastructure, the third piping infrastructure, and the fourth piping infrastructure.

* * * * *